US010874064B2

(12) United States Patent
Anderson et al.

(10) Patent No.: US 10,874,064 B2
(45) Date of Patent: Dec. 29, 2020

(54) GROW BOARD AND METHOD

(71) Applicant: Living Greens Farm, Inc., Faribault, MN (US)

(72) Inventors: Dana Anderson, Minneapolis, MN (US); Raymond L. Carriere, Farmington, MN (US); Richard Stoner, Berthoud, CO (US); Daniel Lagro, Northfield, MN (US)

(73) Assignee: LIVING GREENS FARM, INC., Faribault, MN (US)

( * ) Notice: Subject to any disclaimer, the term of this patent is extended or adjusted under 35 U.S.C. 154(b) by 159 days.

(21) Appl. No.: 15/913,566

(22) Filed: Mar. 6, 2018

(65) Prior Publication Data

US 2018/0255720 A1    Sep. 13, 2018

Related U.S. Application Data

(63) Continuation of application No. 14/752,462, filed on Jun. 26, 2015, now abandoned.

(60) Provisional application No. 62/063,158, filed on Oct. 13, 2014, provisional application No. 62/018,452, filed on Jun. 27, 2014, provisional application No. 62/017,574, filed on Jun. 26, 2014.

(51) Int. Cl.
    *A01G 31/02*    (2006.01)
(52) U.S. Cl.
    CPC ............ *A01G 31/02* (2013.01); *Y02P 60/216* (2015.11)
(58) Field of Classification Search
    CPC ............................. A01G 31/02; Y02P 60/216
    See application file for complete search history.

(56) References Cited

U.S. PATENT DOCUMENTS

| 3,172,234 A | 3/1965 | Eavis |
| 3,181,273 A | 5/1965 | West et al. |
| 3,667,157 A | 6/1972 | Longhini |

(Continued)

FOREIGN PATENT DOCUMENTS

| JP | 05146231 | 6/1993 |
| JP | 07034696 B2 | 4/1995 |

(Continued)

OTHER PUBLICATIONS

Search Report Written Opinion for PCT/US2013/045003, dated Oct. 28, 2013.

(Continued)

*Primary Examiner* — Joshua D Huson
(74) *Attorney, Agent, or Firm* — Hamilton IP Law, PC; Jay R. Hamilton; Charles A. Damschen

(57) ABSTRACT

An illustrative embodiment of a grow board may include an outer member that may be engaged with an inner member such that a grow media may be positioned therebetween, secured, and/or tightened by the engagement between the inner and outer members. The outer member may have one or more slots formed therein to allow a plant to grow from the grow media through the slots, wherein the root of the plant may be positioned adjacent the inner member. The inner member may be configured with risers along the periphery and interior to provide a sufficient gap between stacked grow boards to allow for improved penetration of light and air into the seeded and stacked grow boards to aid in seed germination.

5 Claims, 48 Drawing Sheets

(56) References Cited

U.S. PATENT DOCUMENTS

| | | | |
|---|---|---|---|
| 3,708,009 A | 1/1973 | Viol et al. |
| 3,729,016 A | 4/1973 | Von Linsowe |
| 3,729,141 A | 4/1973 | Cornelius |
| 3,749,319 A | 7/1973 | Fischer |
| 3,868,787 A | 3/1975 | Wong |
| 3,874,721 A | 4/1975 | Tuggle |
| 3,877,172 A | 4/1975 | Schwab et al. |
| 3,888,041 A | 6/1975 | Bundy et al. |
| 4,006,559 A | 2/1977 | Carlyon, Jr. |
| 4,035,950 A | 7/1977 | Anselm |
| 4,047,327 A | 9/1977 | Tesch |
| 4,052,196 A | 10/1977 | Namy et al. |
| 4,059,922 A | 11/1977 | DiGiacinto |
| 4,099,669 A | 7/1978 | Cortopassi |
| 4,118,891 A | 10/1978 | Kehl et al. |
| 4,163,342 A | 8/1979 | Fogg et al. |
| 4,244,145 A | 1/1981 | Polacsek |
| 4,255,896 A | 3/1981 | Carl |
| 4,295,607 A | 10/1981 | Noble |
| 4,309,844 A | 1/1982 | King et al. |
| 4,332,105 A | 6/1982 | Nir |
| 4,352,460 A | 10/1982 | Purtell |
| 4,356,664 A * | 11/1982 | Ruthner | A01G 31/042 47/17 |
| 4,419,843 A | 12/1983 | Johnson, Sr. |
| 4,505,068 A | 3/1985 | Kaneko |
| 4,569,150 A | 2/1986 | Carlson et al. |
| 4,584,791 A | 4/1986 | Wolf |
| 4,603,077 A | 7/1986 | Fujimoto et al. |
| 4,658,878 A | 4/1987 | Williams |
| 4,713,909 A | 12/1987 | Roper et al. |
| 4,813,176 A | 3/1989 | Takayasu |
| 4,844,109 A | 7/1989 | Navarro |
| 4,869,019 A | 9/1989 | Ehrlich |
| 4,924,623 A | 5/1990 | van Rens |
| 4,965,962 A | 10/1990 | Akagi |
| 4,982,526 A | 1/1991 | Miyachi |
| 5,042,196 A | 8/1991 | Lukawski |
| 5,076,008 A | 12/1991 | Arroyo |
| 5,077,935 A | 1/1992 | Stoever et al. |
| 5,226,255 A | 7/1993 | Robertson |
| 5,317,834 A | 6/1994 | Anderson |
| 5,394,647 A | 3/1995 | Blackford |
| 5,397,056 A | 3/1995 | Sakatani et al. |
| 5,417,010 A | 5/1995 | Ecer |
| 5,435,098 A | 7/1995 | Koide et al. |
| 5,560,415 A | 10/1996 | Geissler |
| 5,592,775 A | 1/1997 | Dew |
| 5,724,768 A | 3/1998 | Ammann |
| 5,862,628 A | 1/1999 | Takashima |
| 5,918,416 A | 7/1999 | Ammann |
| 5,937,575 A | 8/1999 | Zobel et al. |
| 6,006,471 A | 12/1999 | Sun |
| 6,021,602 A | 2/2000 | Orsi |
| 6,061,957 A | 5/2000 | Takashima |
| 6,070,358 A | 6/2000 | Meikle et al. |
| 6,082,044 A | 7/2000 | Sherfield |
| 6,105,309 A | 8/2000 | Takayanagi |
| 6,127,027 A | 10/2000 | Nogami et al. |
| 6,131,832 A | 10/2000 | Murphy |
| 6,173,529 B1 * | 1/2001 | Kertz | A01G 31/045 47/65.8 |
| 6,219,965 B1 | 4/2001 | Ishikawa et al. |
| 6,237,282 B1 | 5/2001 | Pitts |
| 6,312,139 B1 | 11/2001 | Baker et al. |
| 6,360,482 B1 | 3/2002 | Boyes |
| 6,360,483 B1 | 3/2002 | Sherfield |
| 6,446,386 B1 | 9/2002 | Holloway |
| 6,508,033 B2 | 1/2003 | Hessel et al. |
| 6,578,319 B1 | 6/2003 | Cole et al. |
| 6,612,069 B2 | 9/2003 | Locke et al. |
| 6,615,542 B2 | 9/2003 | Ware |
| 6,698,668 B2 | 3/2004 | Stehling |
| 6,729,807 B1 | 5/2004 | Spittle |
| 6,793,438 B2 | 9/2004 | Anderson |
| 6,807,770 B2 | 10/2004 | Wainwright et al. |
| 6,811,653 B2 | 11/2004 | Huang |
| 7,426,802 B2 | 9/2008 | Umbaugh |
| 8,181,391 B1 | 5/2012 | Giacomantonio |
| 8,234,814 B2 * | 8/2012 | Kertz | A01G 9/024 47/67 |
| 8,533,992 B2 | 9/2013 | Harwood |
| 8,726,568 B2 | 5/2014 | Wilson et al. |
| D713,284 S | 9/2014 | Prinster et al. |
| 8,984,808 B2 | 3/2015 | Daniels et al. |
| D729,115 S | 5/2015 | Prinster et al. |
| 2002/0088175 A1 | 7/2002 | Locke et al. |
| 2002/0174598 A1 | 11/2002 | Locke et al. |
| 2003/0006323 A1 | 1/2003 | Reid |
| 2003/0089037 A1 | 5/2003 | Ware |
| 2003/0121362 A1 | 7/2003 | Goellner |
| 2003/0150160 A1 | 8/2003 | Anderson |
| 2003/0188477 A1 | 10/2003 | Pasternak et al. |
| 2006/0032128 A1 | 2/2006 | Bryan |
| 2006/0053691 A1 | 3/2006 | Harwood et al. |
| 2006/0156624 A1 | 7/2006 | Roy et al. |
| 2008/0110086 A1 | 5/2008 | Julia |
| 2008/0295400 A1 | 12/2008 | Harwood et al. |
| 2010/0095584 A1 | 4/2010 | Huet et al. |
| 2010/0095586 A1 | 4/2010 | Sichello |
| 2011/0107667 A1 | 5/2011 | Laurence et al. |
| 2011/0146146 A1 | 6/2011 | Harwood |
| 2011/0258925 A1 | 10/2011 | Baker |
| 2011/0283614 A1 | 11/2011 | Jaensch |
| 2011/0289839 A1 | 12/2011 | Cronk et al. |
| 2012/0005957 A1 | 1/2012 | Downs |
| 2012/0085026 A1 | 4/2012 | Morris |
| 2012/0227320 A1 | 9/2012 | Santos |
| 2014/0096446 A1 | 4/2014 | Daniels et al. |
| 2014/0137472 A1 | 5/2014 | Anderson et al. |
| 2015/0102137 A1 | 4/2015 | Anderson et al. |

FOREIGN PATENT DOCUMENTS

| | | |
|---|---|---|
| JP | 07327520 A | 12/1995 |
| JP | 409154417 | 6/1997 |
| TW | M450203 U1 | 4/2013 |
| WO | 2009059620 A1 | 5/2009 |
| WO | 2013177701 A1 | 12/2013 |

OTHER PUBLICATIONS

Search Report and Written Opinion for PCT/US2013/032492, dated May 30, 2013.

PCT/US2015038124_International_Search_Report_and_Written_Opinion, dated Sep. 30, 2015.

\* cited by examiner

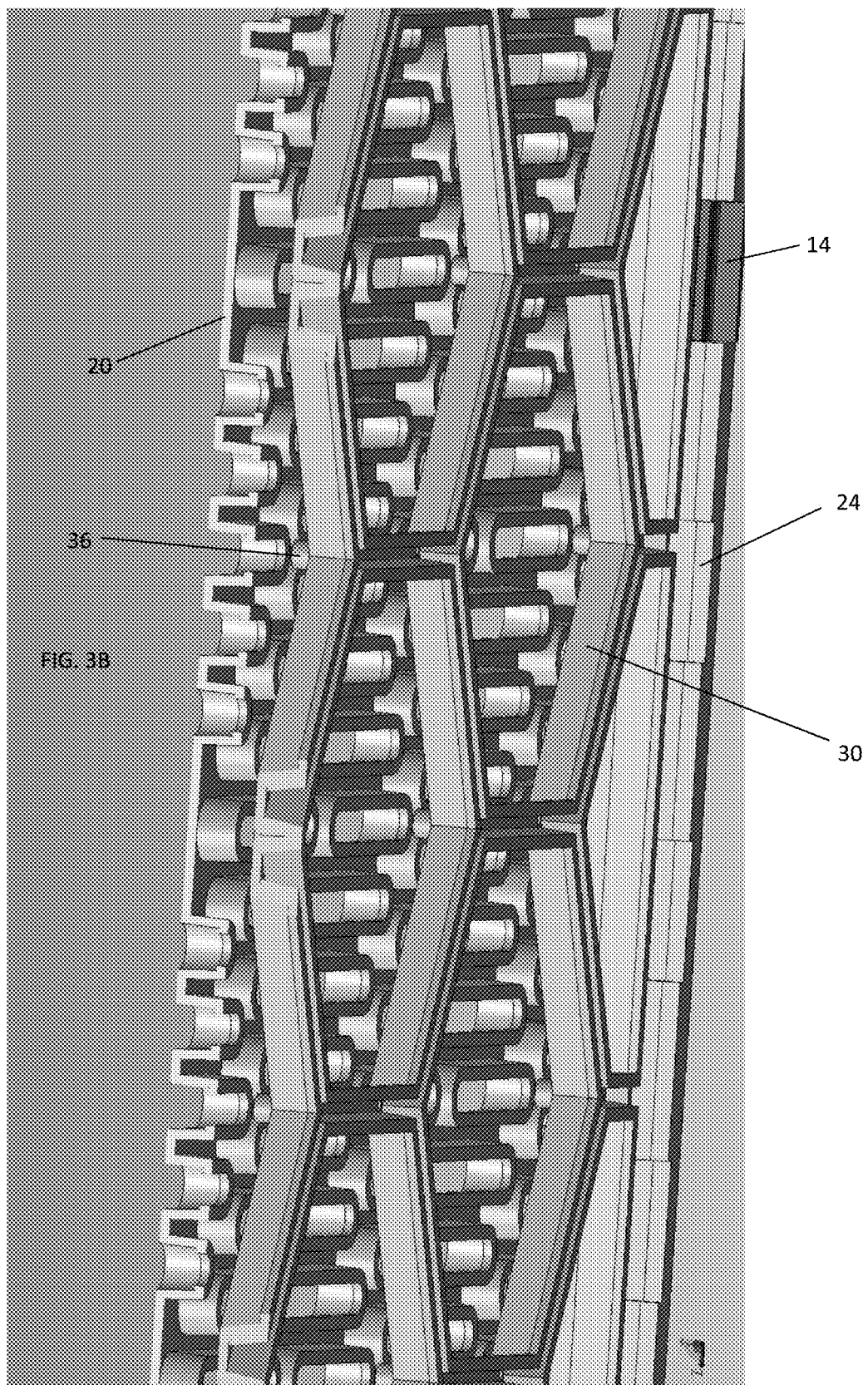

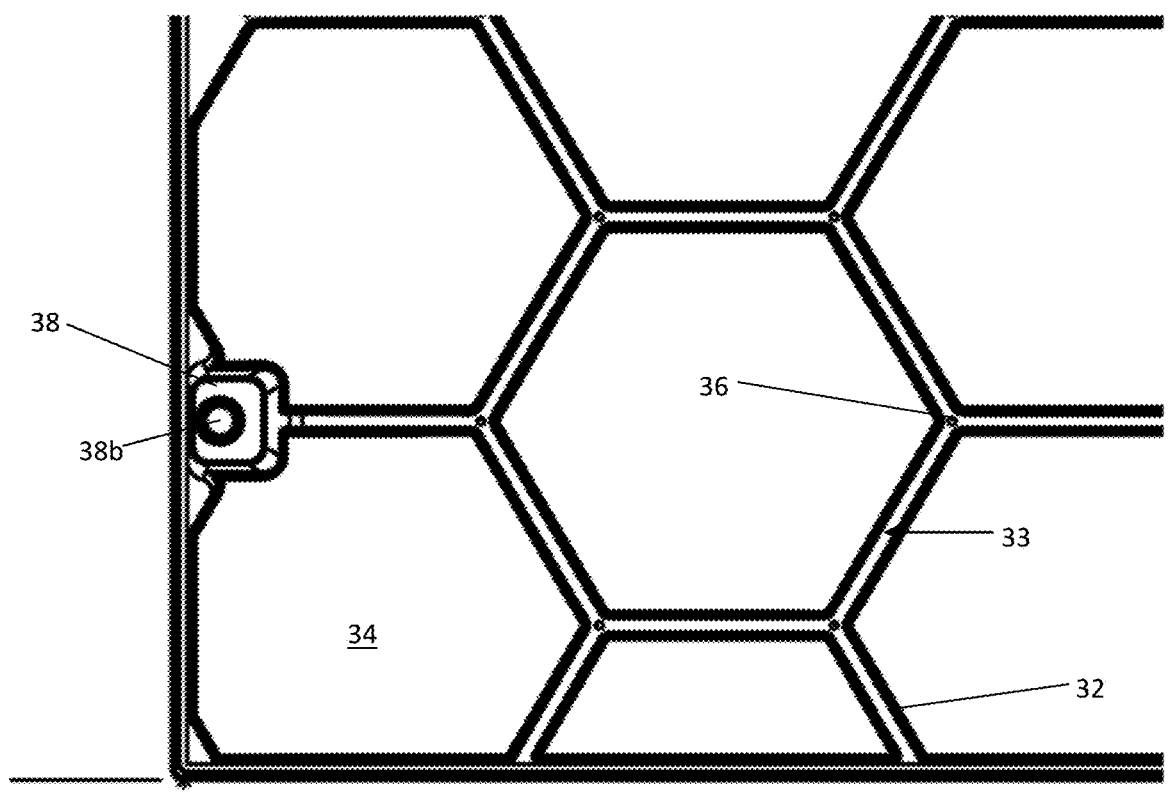
FIG. 8BB
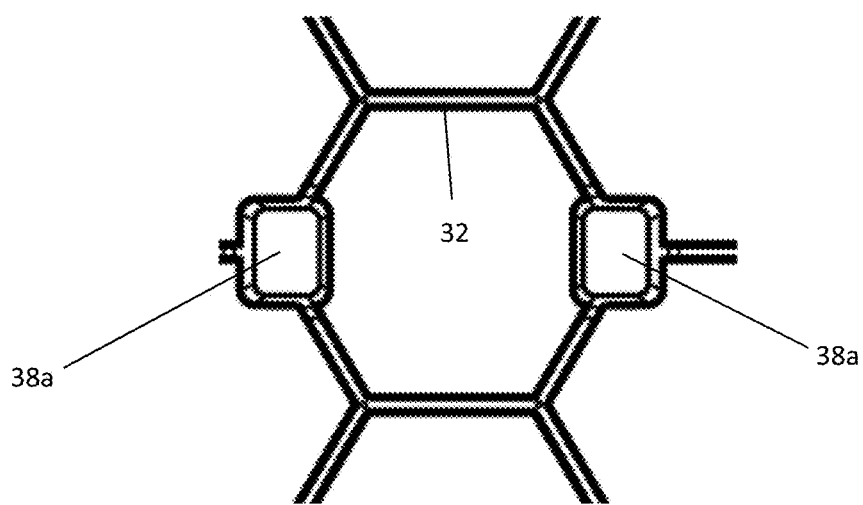
FIG. 8BBB

GROW BOARD AND METHOD

CROSS REFERENCE TO RELATED APPLICATIONS

This non-provisional utility patent application is a continuation of and claims benefit from utility non-provisional patent application Ser. No. 14/752,462 filed on Jun. 26, 2015 which claimed priority from provisional U.S. Pat. App. Nos. 62/017,574 filed on Jun. 26, 2014; 62/018,452 filed on Jun. 27, 2014; and 62/063,158 filed on Oct. 13, 2014, all of which are incorporated by reference herein in their entireties.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

FIELD OF INVENTION

The present invention relates generally to agriculture, and more specifically to hydroponic and/or aeroponic methods and apparatuses.

BRIEF DESCRIPTION OF DRAWINGS

The accompanying drawings, which are incorporated in and constitute a part of this specification, illustrate embodiments and together with the description, serve to explain the principles of the methods and systems.

FIG. 3B provides a cross-sectional view of the embodiment of a grow board shown in FIGS. 1A, 1B, and 3A.

FIG. 8BB provides a detailed view of one portion of the inner surface of the inner member of FIGS. 8A-8D.

FIG. 8BBB provides a detailed view of another portion of the inner surface of the inner member of FIGS. 8A-8D.

FIG. 8CC provides a detailed end view of a portion of the embodiment of an inner member shown in FIGS. 8A-8D.

Figure 1A:
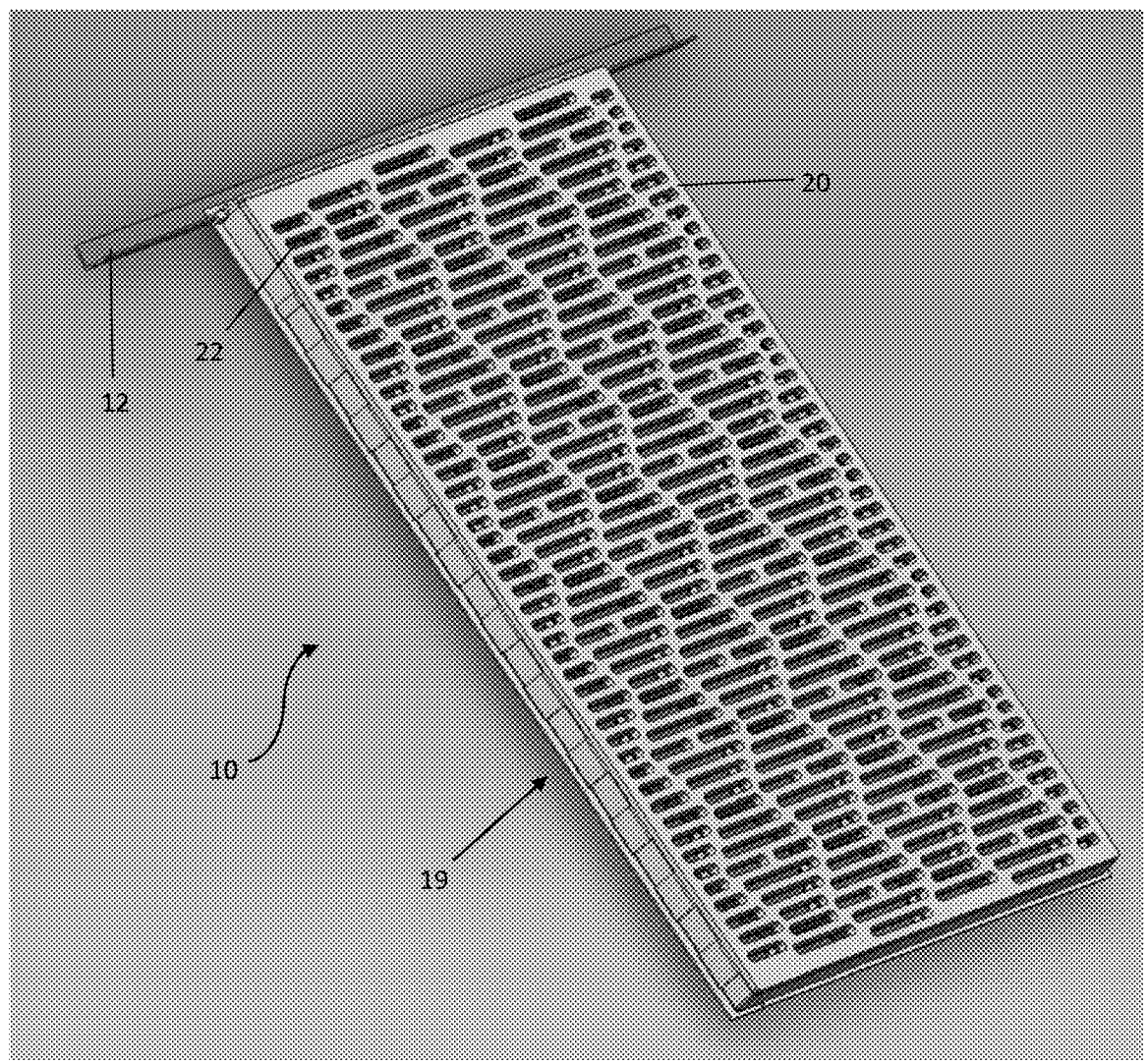
FIG. 1A provides an exterior perspective view of the illustrative embodiment of a grow board engaged with a rail.

| DESCRIPTION OF INVENTION-Table of Elements | |
|---|---|
| Element Description | Element Number |
| Grow board | 10 |
| Rail | 12 |
| Connector | 14 |
| Grow media | 16 |
| Periphery | 18 |
| Interior area | 19 |
| Outer member | 20 |
| Slot | 22 |
| Peripheral wall | 24 |
| Engagement channel | 24a |
| Indent | 25 |
| Lip | 26 |
| Divot | 28 |
| Inner member | 30 |
| Frame | 31 |
| Leg | 32 |
| Channel | 33 |
| Opening | 34 |
| Protrusion | 36 |
| Riser | 38 |
| Inner Riser | 38a |
| Tip | 38b |
| Connection point | 114 |
| Outer member | 120 |
| Support | 121 |
| Main trough | 121a |
| Side trough | 121b |
| Shelf | 122 |
| Slot | 123 |
| Peripheral wall | 124 |
| Indent | 125 |
| Filler | 125a |
| Arm | 126 |
| Chamber | 127 |
| Backing member | 128 |
| Recess | 128a |
| Inner member | 130 |
| Beam | 132 |
| Top portion | 133 |
| Bottom portion | 134 |
| Void | 136 |
| Right side | 140 |
| Right flange | 142 |
| Ridge | 142a |
| Left side | 150 |
| Left flange | 152 |
| Lip | 152a |

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

A first illustrative embodiment of a grow board 10 is shown in perspective in FIG. 1, wherein a portion of the grow board 10 is engaged with a rail 12. It is anticipated that grow boards 10 disclosed and claimed herein may be used in agriculture. For example, various illustrative embodiments disclosed herein may be incorporated with various hydroponic and/or aeroponic agriculture systems, including but not limited to the various apparatuses and methods disclosed in U.S. patent application Ser. No. 13/914,243, which is incorporated by reference herein in its entirety. Accordingly, a rail 12 or other support structure may be engaged with a portion of the grow board 10 to facilitate placement of multiple grow boards 10 adjacent one another and/or a framework for supporting the grow board(s) 10.

One or more rails 12 (or any other support structure that is suitable for the particular application of the grow board 10) may be configured such that a plurality of grow boards 10 may be placed adjacent one another in a generally horizontal row, and multiple rows of grow boards 10 may be placed adjacent one another in a generally vertical manner. In one aspect, the grow board 10 may be configured such that a portion of the weight of the grow board 10 is distributed on the rail 12. The grow board 10 may be configured to accommodate a rail 12 at any end of the grow board 10. In the illustrative embodiment shown in FIG. 1A, it is contemplated that the rail 12 may be engaged optimally with the grow board 10 at the top edge of the grow board 10, such that the grow board 10 may hang down from the rail 12, and such that another portion of the grow board 10 positioned below the rail 12 may rest upon another structure (e.g., a portion of the support structure) such that the grow board 10 may be angled with respect to the vertical dimension. Alternatively, the grow board 10 may be configured such that a rail 12 may be engaged optimally with the grow board 10 at a bottom edge of the grow board 10, such that another portion of the grow board 10 positioned above the rail 12 may rest upon another structure (e.g., a portion of the support structure) such that the grow board 10 may be angled with respect to the vertical dimension.

The spacing between rails 12 and/or other components of the support structure used to support the grow boards 10 may be fixed such that any grow board 10 having specific dimensions and/or a specific configuration on a portion of the grow board 10 may be engaged with that support structure. In this manner, aspects of the interior area 19 configuration of a grow board 10 may be infinitely varied for different conditions (e.g., the plant species that is grown on the grow board 10, the environment in which the grow board 10 is employed, etc.) and aspects of the periphery 18 of the grow board 10 may be standardized. Accordingly, different grow boards 10 having nearly any interior area 19 configuration may be used with a single support structure without need to change aspects of the support structure as long as various aspects of the periphery 18 of the grow board 10 remain constant. Providing this type of modularity for a support structure and the types of grow boards 10 that may be used with a single support structure may greatly reduce the costs (e.g., less labor, equipment, downtime, footprint required for support structure, etc.) associated with growing different plant species on a single support structure. The modularity provided by the present grow board 10 and method will be more apparent in light of the various illustrative embodiments of grow boards 10 disclosed herein. In an aspect it is contemplated that the grow board 10 may be generally rectangular in shape. Further, the grow board 10 may be 32 inches wide and 48 inches high, without limitation unless so indicated in the following claims.

Figure 1B:
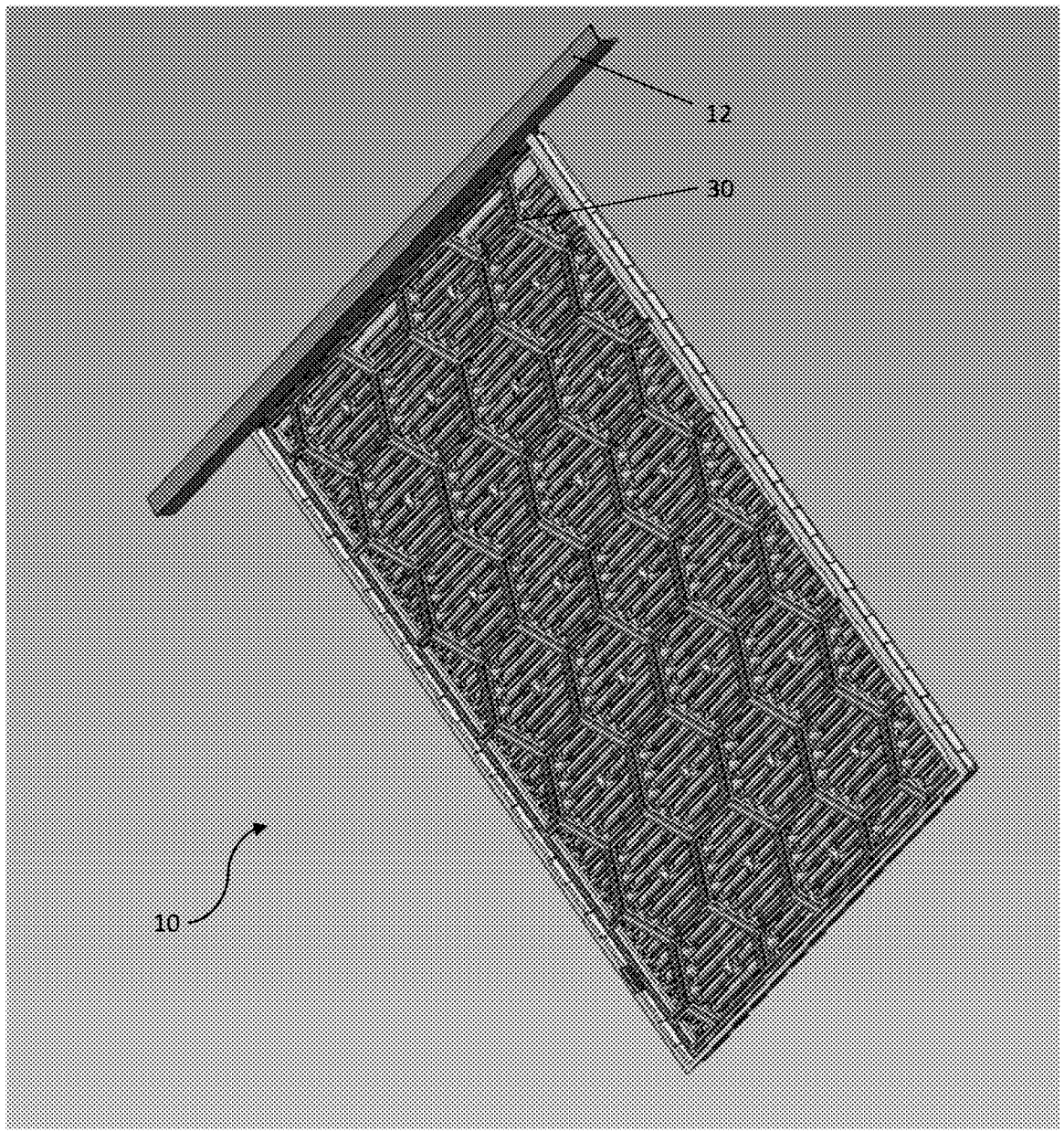
FIG. 1B provides an interior perspective view of the embodiment of a grow board shown in FIG. 1A.

It is contemplated that for the first illustrative embodiment of a grow board 10, the portion of a plant (which plant is grown using the grow board 10) that would normally constitute the upper portion of the plant (i.e., the portion of a plant other than the roots) may protrude from the grow media 16 out from the various slots 22 shown in FIG. 1A, which slots 22 may be formed in an outer member 20. Such a situation is depicted in FIG. 6B. Similarly, it is contemplated that for the first illustrative embodiment the portion of a plant that would normally constitute the lower portion of the plant (i.e., the root portion) may protrude out from the surface shown in FIG. 1B (and/or outward from grow media 16 positioned adjacent thereto), which surface may constitute an inner surface and be positioned adjacent to a nutrient supply for the plants on the grow board 10 in many applications thereof. Such a situation is depicted in FIG. 6C, wherein a plurality of roots are shown extending away from the grow media 16 in a direction that is also generally away from the outer member 20. Other orientations and/or configurations of plants, upper and/or lower portions thereof, and/or delivery of nutrient supply may be used with the grow board 10 without limitation. Generally, as used herein, the "inner surface" of a grow board 10 or component thereof as shown in FIGS. 1-8D may constitute the surface generally facing the root portion of a plant and the term "outer surface" of a grow board 10 or component thereof may constitute the surface generally facing the portion of the plant other than the roots thereof. In many applications the inner surface of a grow board 10 or component thereof may be oriented toward a nutrient supply and an outer surface of a grow board 10 or component thereof may be oriented away from a nutrient supply.

Figure 6A:
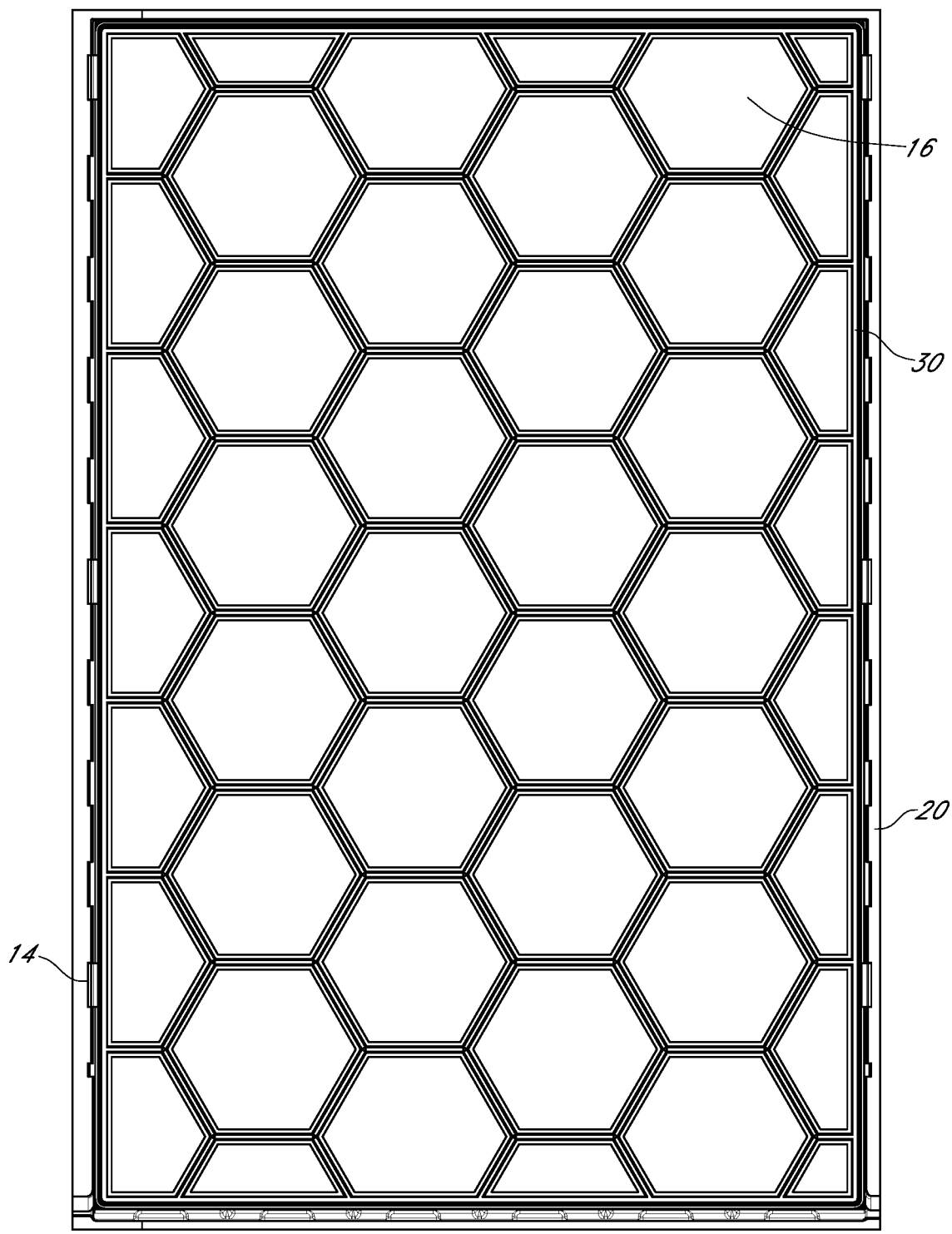
FIG. 6A provides a perspective view of an illustrative embodiment of a grow board with growth media positioned between the inner and outer members.

Generally, the first illustrative embodiment of a grow board 10 may be configured such that a grow media 16 may be positioned between an outer member 20 and an inner member 30. One embodiment of such a grow media 16 is shown in FIG. 6A. The optimal grow media 16 may vary at least from one plant to the next. Accordingly, any grow media 16 currently known or later developed may be used with the grow board 10 without limitation, including but not limited to synthetic foam, burlap, cotton, wood chips (which may be engaged with a netting, such as a polymer net) polymer fabrics, polymers, plastics, cloth, composite materials, rock wool, perlite, other natural materials, other synthetic materials, and/or combinations thereof.

In the first illustrative embodiment of a grow board 10, the outer member 20 may be comprised of a synthetic material that reflects a large portion of light to increase the efficiency of light absorbed by plants grown using the grow board 10 (such as white colored, food-grade ABS plastic). However, the scope of the present disclosure is in no way limited by the materials used to construct any portion of the grow board 10, including but not limited to the outer member 20 and inner member 30, unless so indicated in the following claims.

Figure 2A:
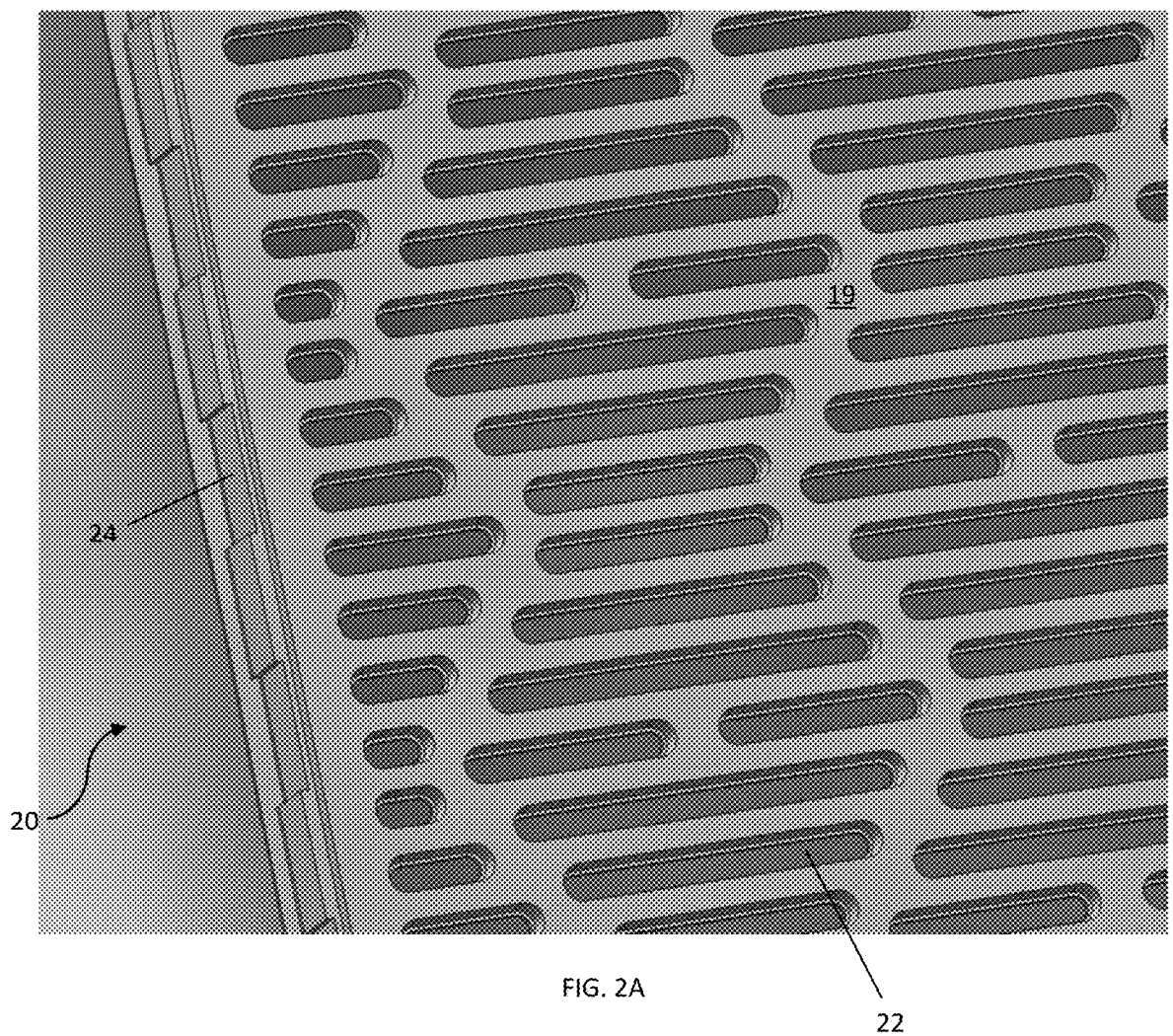
FIG. 2A provides a detailed view of a portion of the outer surface of an illustrative embodiment of an outer member that may be used with the illustrative embodiment of a grow board.
Figure 2B:
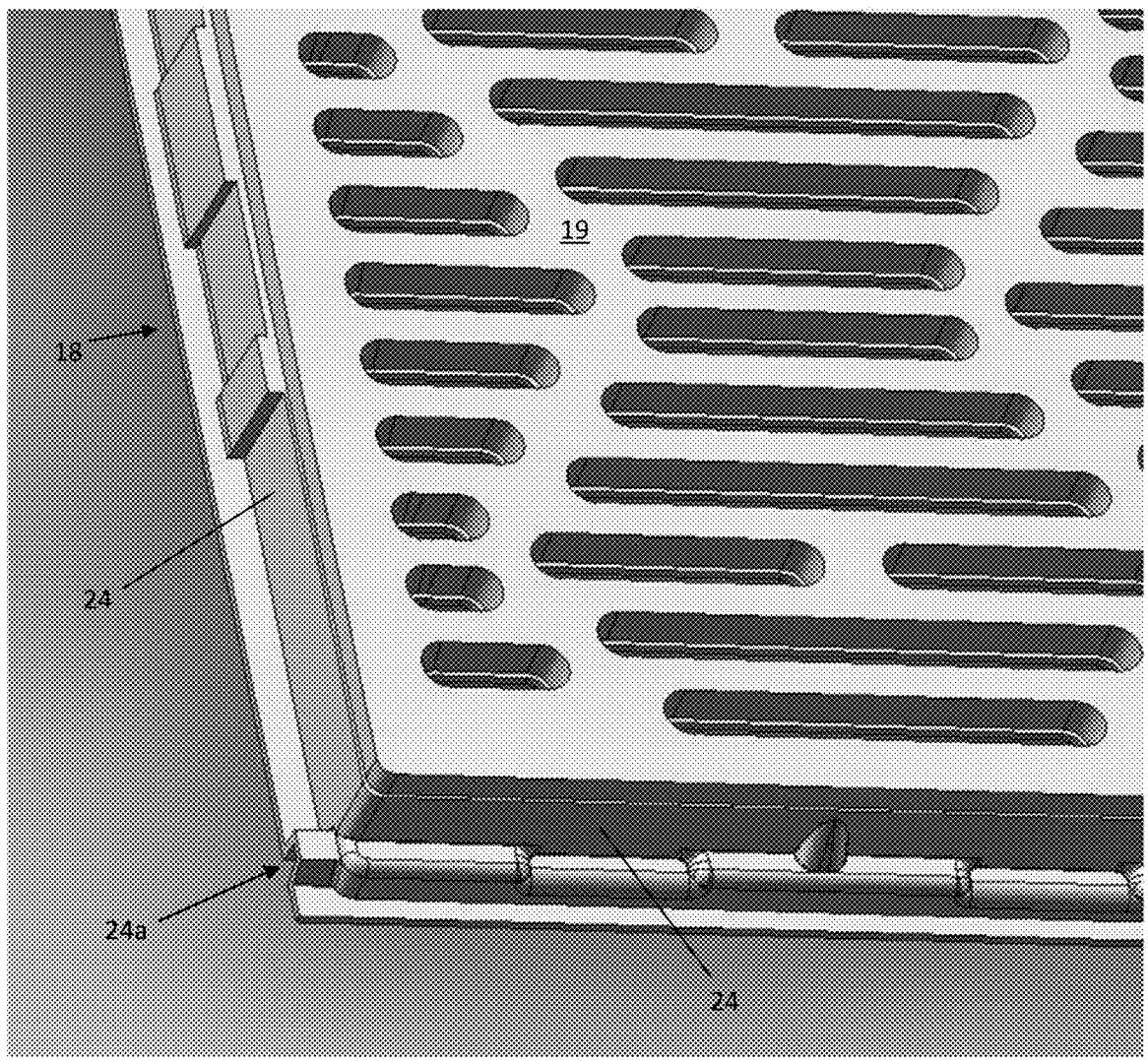
FIG. 2B provides a detailed view of another portion of the outer surface of the embodiment of an outer member shown in FIG. 2A.

A detailed view of a portion of the outer surface of the first illustrative embodiment of an outer member 20 is shown in FIG. 2A. It is contemplated that the upper portion of the plant may be positioned adjacent this surface of the outer member 20, whereas the lower portion of the plant may be positioned adjacent the inner surface of the outer member 20, which is shown clearly at least in FIGS. 2C and 2D. As shown, the outer surface of the outer member 20 may be configured such that it is generally smooth and planar, wherein a plurality of slots 22 may be formed in the outer member 20 and pass from the outer surface to the inner surface thereof. As shown in FIG. 6B, in some applications it is contemplated that plants may be positioned in one or more slots 22 during use of the grow board 10. In the first illustrative embodiment, it is contemplated that the slots 22 may be from 0.1 to 6.5 inches from top to bottom (i.e., the distance between the two linear sides), and between 0.5 and 32 inches long, without limitation unless so indicated in the following claims. Additionally, it is contemplated that the first illustrative embodiment of a grow board 10 may be generally rectangular in shape. In one embodiment, the grow board 10 may be 32 inches wide and 48 inches high, without limitation unless so indicated in the following claims. The optimal number, spacing, dimensions, shape, and/or configuration of the slots 22 may vary from one application of the grow board 10 to the next, and those considerations are therefore in no way limiting to the scope of the present disclosure unless so indicated in the following claims. Furthermore, the optimal number, spacing, dimensions, and/or shape of the grow board(s) 10 may vary from one application of the grow board 10 to the next, and those considerations are therefore in no way limiting to the scope of the present disclosure unless so indicated in the following claims.

The outer member 20 may be configured with a peripheral wall 24, which may constitute an element of the periphery 18. The peripheral wall 24 may extend inward away from the outer surface toward the inner member 30. The peripheral wall 24 may be configured to provide support, rigidity, structural integrity, and/or any other consideration needed and/or beneficial for the specific application of the grow board 10. In an aspect, the peripheral wall 24 (and/or other portions of the outer member 30) may be formed with various angles, surfaces, corners, etc. to provide the desired rigidity, load-bearing capacity, structural integrity, and/or any other consideration needed and/or beneficial for the particular application of the grow board 10 The specific configuration of the peripheral wall 24 and/or aspects thereof (thickness, length, etc.) may be standardized in accordance with the standardization of the periphery 18 of the grow board 10 as previously described above to facilitate a modular aspect of the grow board 10.

One or more peripheral walls 24 may be configured with a indent 25, which indent 25 may be configured to provide an engagement area between the outer member 20 (and/or grow board 10) and a rail 12 (and/or other support structure). In an aspect, the indent 25 may extend along the length of a peripheral wall 24 on one full side of the grow board 10 and may facilitate an aspect of the modularity of the grow board 10. The indent 25 may be configured with sufficient depth such that a portion of the rail 12 or other support structure may adequately engage the grow board 10 via the indent 25 such that certain unwanted movements (e.g., downward and/or lateral movement of the grow board 10 in a direction other than that parallel to the length of the rail 12) of the grow board 10 are prevented and/or mitigated via engagement between the grow board 10 and the rail 12 or other support structure via the indent 25. One or more peripheral walls 24 may be configured with an engagement channel 24a, which engagement channel 24 may be configured to provide an engagement area between a portion of the inner member 30 and the outer member 20, which is shown in detail for the illustrative embodiment of a grow board 10 in FIG. 3C and described in further detail below.

Figure 2C:
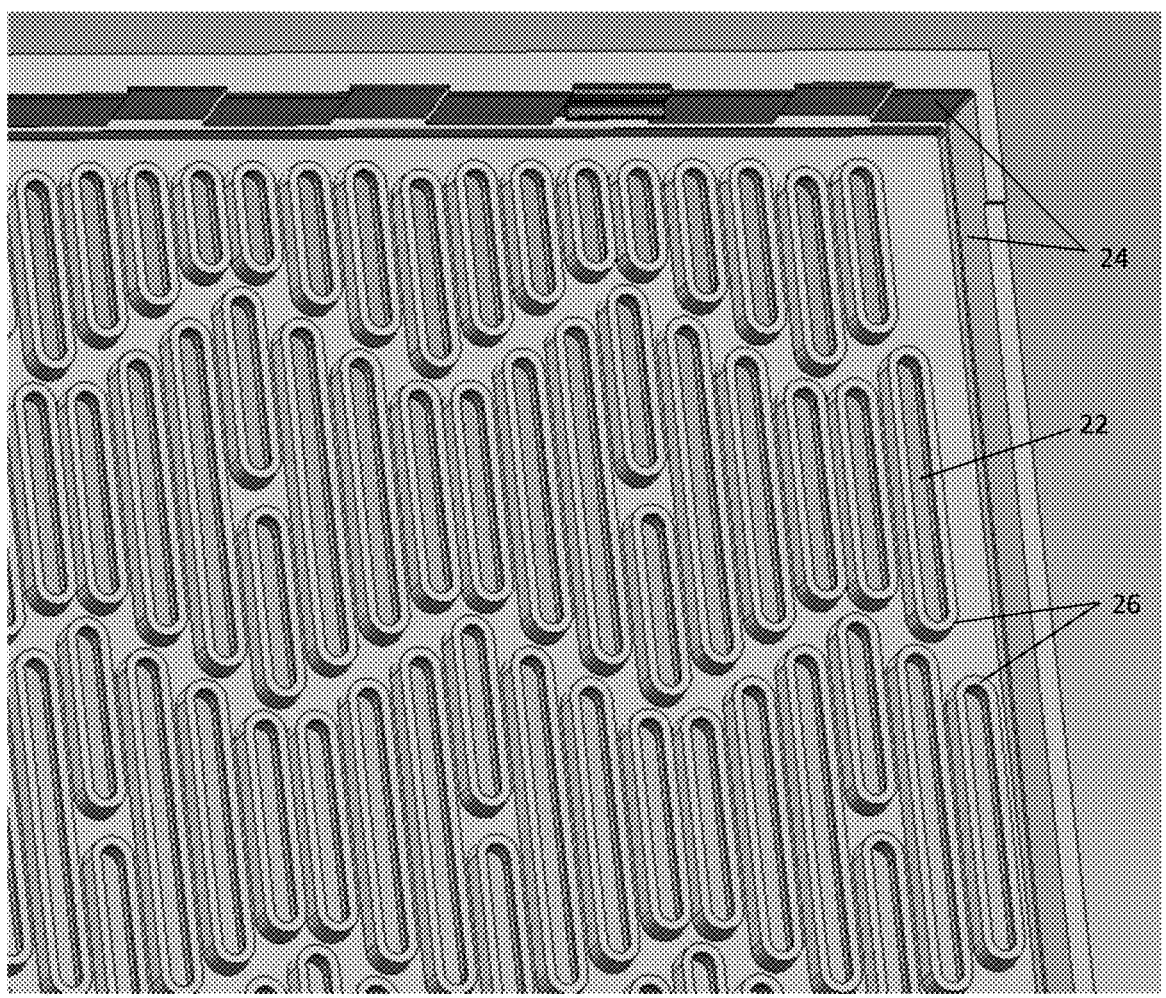
FIG. 2C provides a detailed view of a portion of the interior surface of the illustrative embodiment of an outer member shown in FIGS. 2A & 2B.
Figure 2D:
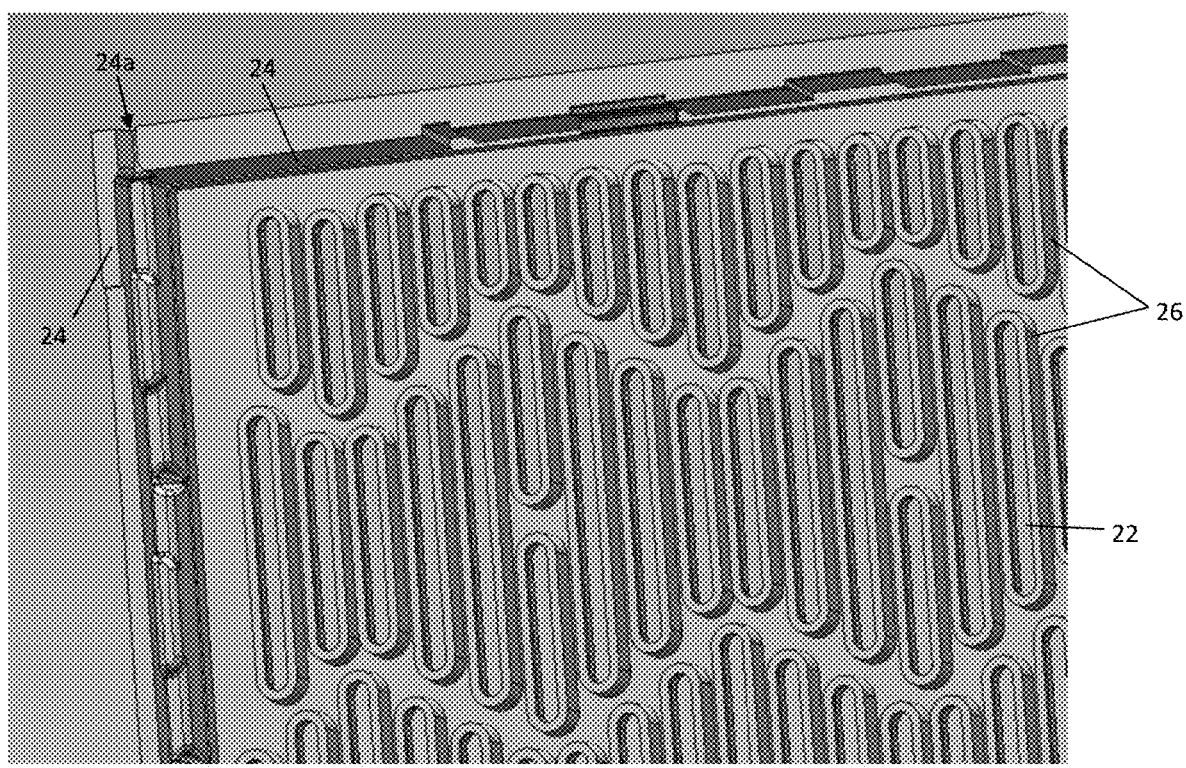
FIG. 2D provides a detailed view of another portion of the interior surface of the embodiment of an outer member shown in FIGS. 2A-2C.
Figure 3A:
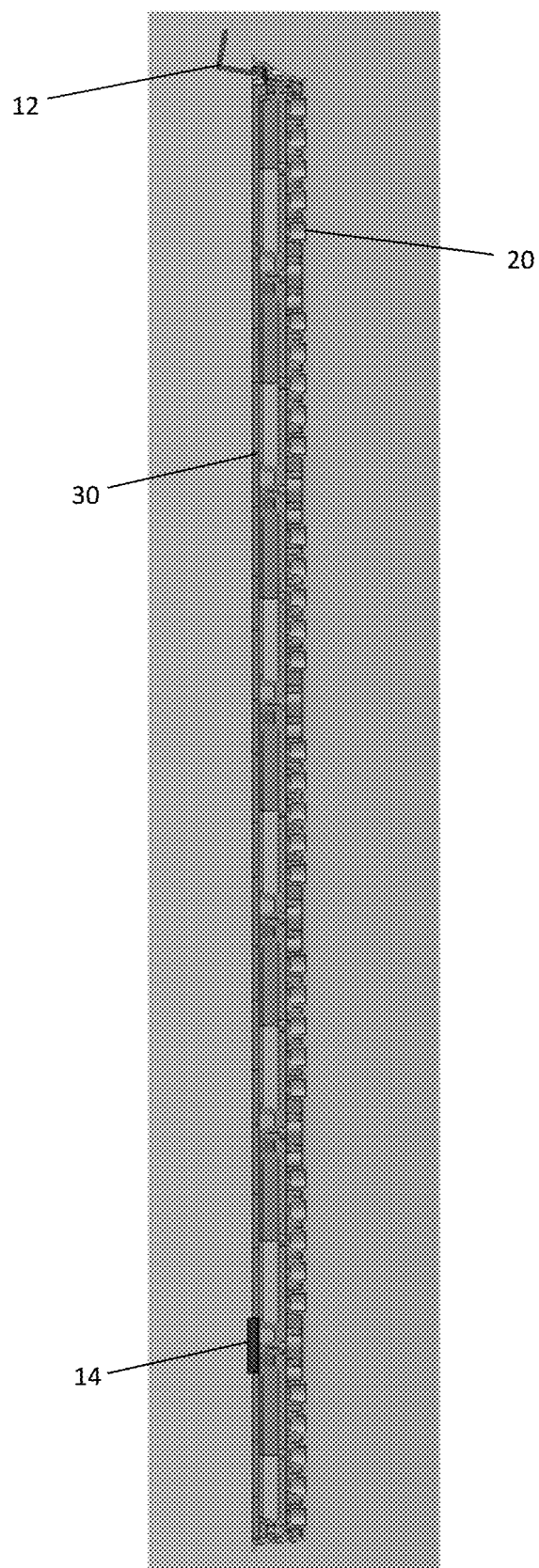
FIG. 3A provides a cross-sectional view of the embodiment of a grow board shown in FIGS. 1A & 1B.
Figure 3C:
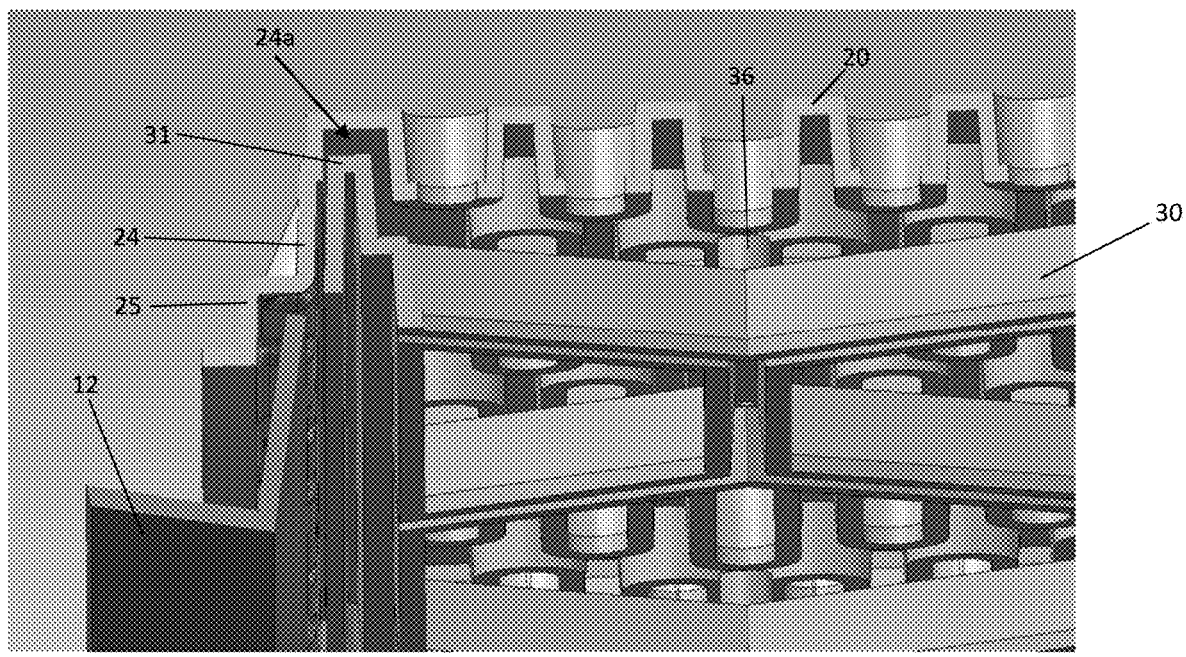
FIG. 3C provides a cross-sectional view of the embodiment of a grow board shown in FIGS. 1A, 1B, 3A, and 3B.

Referring now to FIGS. 2C & 2D, a lip 26 may extend from each slot 22 from the outer surface of the outer member 20 to the inner surface thereof. The lip 26 may extend around the entire periphery of each slot 22 or just a portion thereof. The optimal length by which a lip 26 extends from the slot 22 may depend at least upon the plant for which the outer member 20 is designed. It is contemplated that for many applications this length may be preferably between 0.1 and 2.1 inches, and more preferably between 0.25 and 1.5 inches, without limitation unless so indicated in the following claims. Generally, the lips 26 may provide support, rigidity, structural integrity, spacing, and/or any other consideration needed and/or beneficial for the specific application of the grow board 10.

Figure 4A:
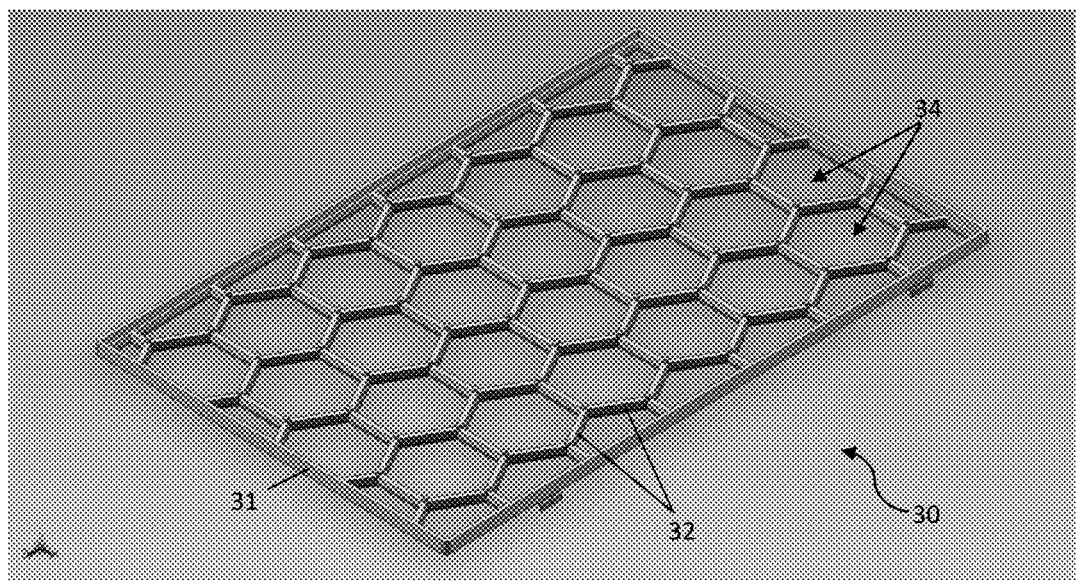
FIG. 4A provides a perspective view of the interior surface of an illustrative embodiment of an inner member that may be used with an illustrative embodiment of a grow board.

An inner member 30 may include a frame 31 around the periphery or a portion of the periphery of the inner member 30. FIGS. 4A and 4C provide perspective views of the inner and outer surfaces, respectively, of a first illustrative embodiment of an inner member 30. Generally, the inner member 30 may include one or more legs 32 engaged with one another and/or the frame 31 such that the legs 32, and/or legs 32 and frame 31 may form a type of grid. The legs 32 and/or legs 32 and frame 31 may cooperate to define one or more openings 34. It is contemplated that in an aspect of a grow board 10, the inner member 30 may generally serve to provide support, rigidity, structural integrity, and/or any other consideration needed and/or beneficial for the particular application of the grow board 10. The inner member 30 may be constructed of any suitable material, including but not limited to plastics (such as food-grade ABS plastic), polymers, metals and their alloys, natural materials, other synthetic materials, and/or combinations thereof. However, the scope of the present disclosure is in no way limited by the materials used to construct the inner member 30.

In the first illustrative embodiment of an inner member 30, the frame 31 may be rectangular in shape and the openings 34 may be configured as normal hexagons. However, the scope of the present disclosure is not so limited, and extends to any shape, dimensions, and/or configurations of a frame 31 and/or opening(s) 34 without limitation unless so indicated in the following claims. It is contemplated that for most applications it may be advantageous for the frame 31 of the inner member 30 to have a size and/or shape that is similar or nearly identical (or correlative on some other fashion), but again the scope of the present disclosure is not so limited.

Figure 4B:
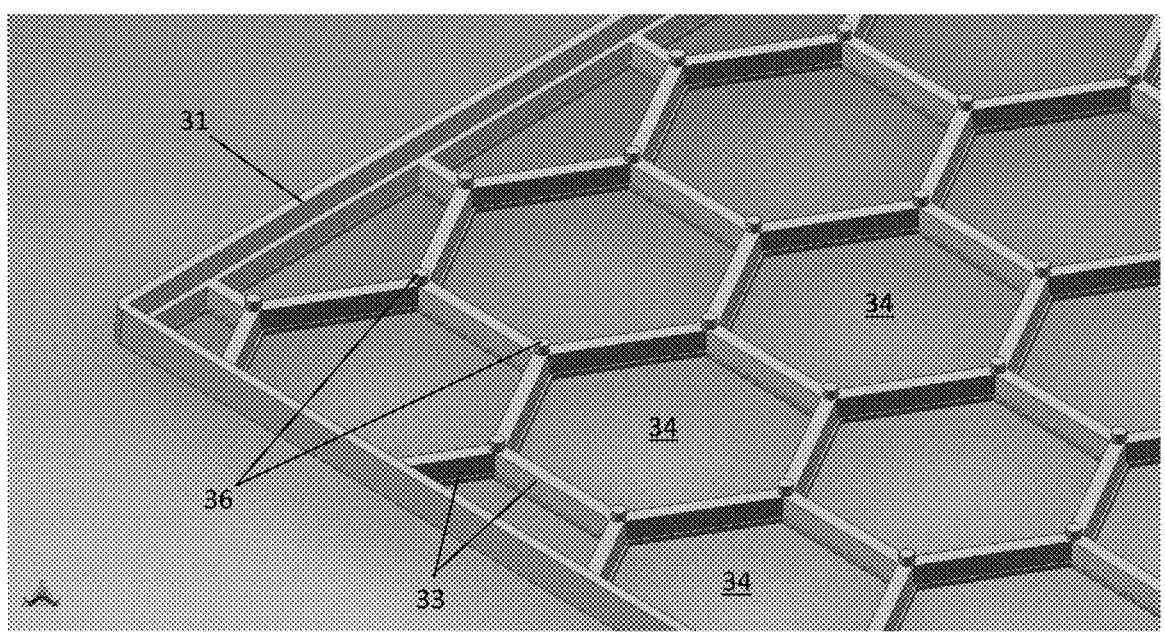
FIG. 4B provides a detailed view of a portion of the interior surface of an illustrative embodiment of an inner member shown in FIG. 4A.
Figure 4C:
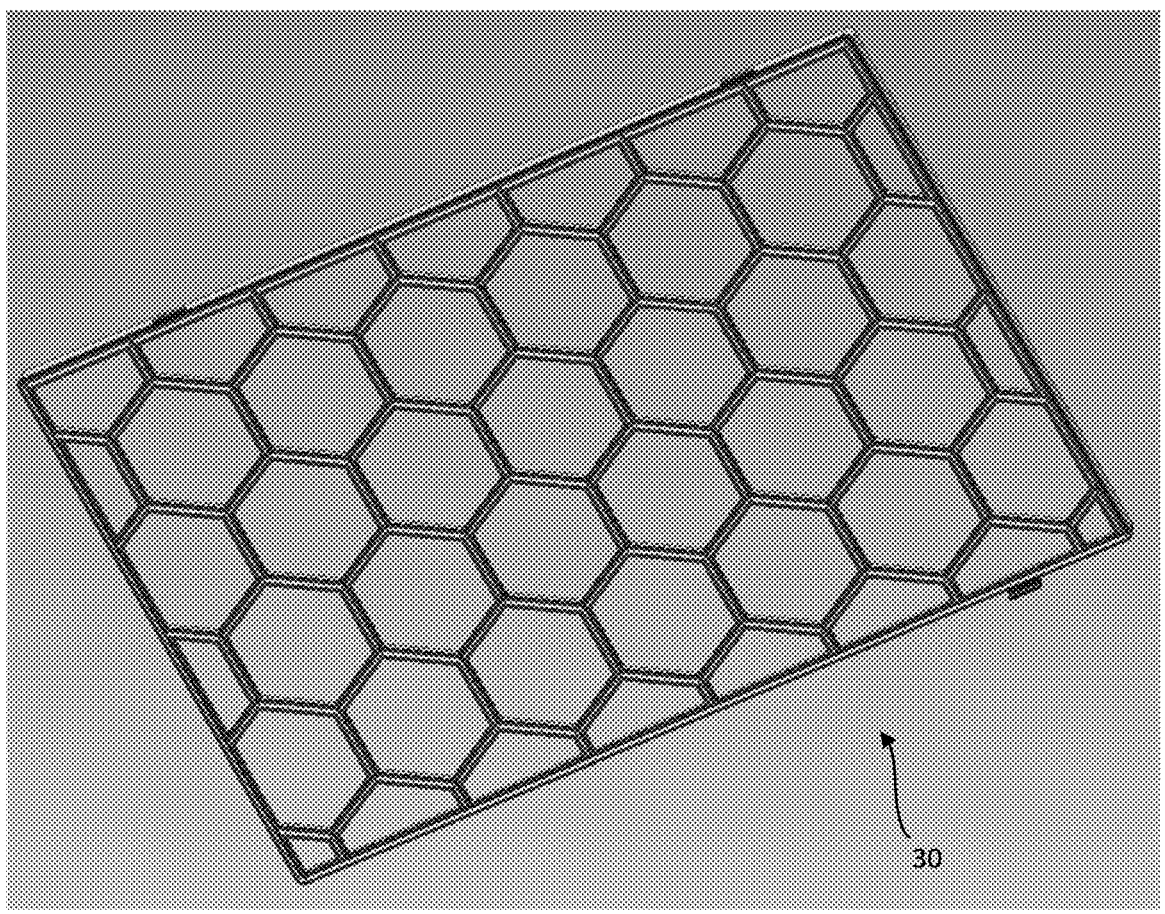
FIG. 4C provides a perspective view of the outer surface of an illustrative embodiment of an inner member shown in FIGS. 4A & 4B.
Figure 4D:
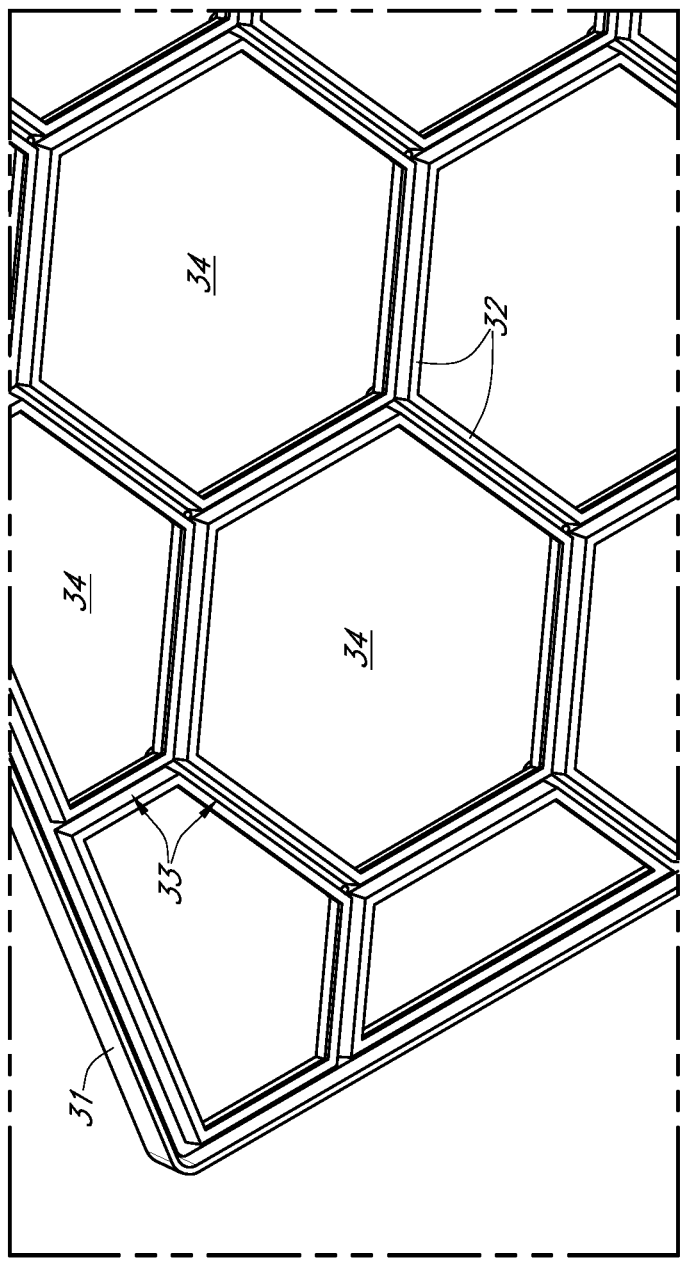
FIG. 4D provides a detailed view of a portion of the outer surface of an illustrative embodiment of the inner member shown in FIGS. 4A-4C.

Referring now to FIG. 4D, the inner surface of the legs 32 and/or frame 31 may be configured with a channel 33 therein to reduce weight, provide support, rigidity, structural integrity, spacing, and/or any other consideration needed and/or beneficial for the specific application of the grow board 10. One illustrative embodiment of such a channel 33 is shown in FIG. 4D, which provides a detailed view of a portion of the inner surface of the first illustrative embodiment of the inner member 30.

A detailed view of the inner surface of a first illustrative embodiment of an inner member 30 is shown in FIG. 4B, wherein the inner member 30 may be formed with one or more protrusions 36 extending from the inner surface thereof. In the first illustrative embodiment it is contemplated that the protrusions 36 may extend toward inner surface of the outer member 20 when the grow board 10 is assembled, as shown at least in FIGS. 3B and 3C, which provide cross-sectional views of the first illustrative embodiment of a grow board 10. As shown, the outer member 20 and inner member 30 may be configured such that grow media 16 may be secured therebetween. In the first illustrative embodiment, a portion of the frame 31 of the inner member 30 may engage the engagement channel 24a of the outer member 20 such that grow media 16 positioned between the outer and inner members 20, 30 may be positioned and/or secured therebetween. Each protrusion 36 on the inner member 30 may be configured such that when the outer member 20 and inner member 30 are assembled, a distal end of each protrusion 36 moves past the distal end of one or more lips 26, thereby pressing grow media toward the outer surface of the outer member 20 and into the void spaces between the lips 26. Such a configuration may provide a plurality of independently taught, secured, and/or tightened areas of grow media 16 at each opening 34, which may be hexagonal in shape.

Any shape, dimensions, and/or configuration of openings 34 may be employed in the inner member 30 to facilitate a plurality of independently taught, secured, and/or tightened areas of grow media 16, and the present disclosure extends to any method and/or structure designed to do so. For the first illustrative embodiment, a protrusion 36 may be positioned at or adjacent to each vertex of the grid formed by the legs 32 as shown clearly in FIG. 4B. However, in other embodiments of an inner member 30, the protrusions 36 may be differently positioned and/or configured to engage one or more surfaces of an outer member 20 to facilitate a plurality of independently taught, secured, and/or tightened areas of grow media 16 without limitation unless so indicated in the following claims.

One or more connectors 14 may be employed to ensure that the outer and inner members 20, 30 remain engaged with and/or do not move relative to one another. The connectors 14 may be integrally formed with the outer member 20 and/or inner member 30, and may be configured such that the inner member 30 snaps into the outer member 20 when appropriate force is applied in an appropriate direction. The scope of the present disclosure is in no way limited by the structure and/or method to engage and/or secure the outer member 20 and the inner member 30 to one another unless so indicated in the following claims.

Figure 5:
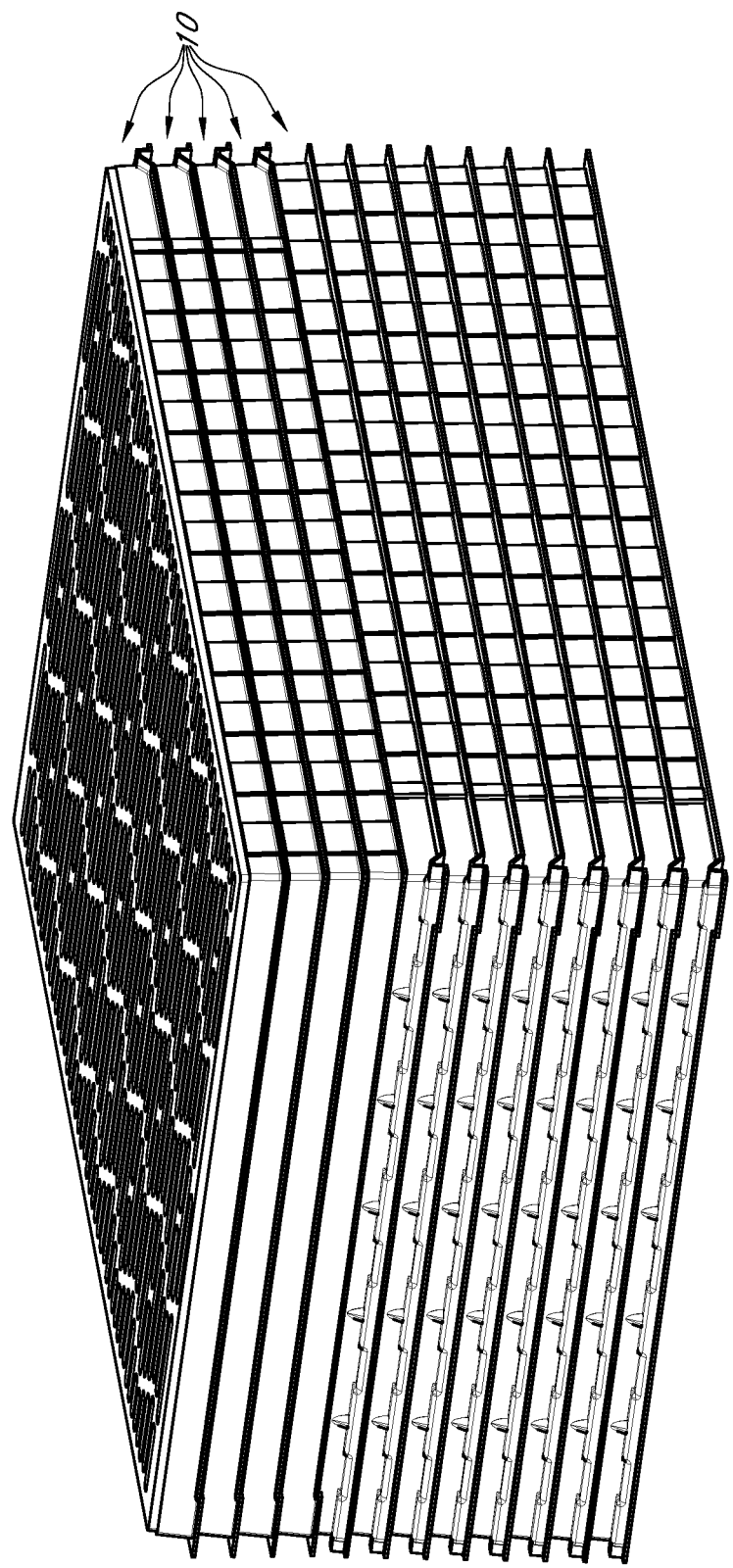
FIG. 5 provides a perspective view of a plurality of grow boards according to an illustrative embodiment in a stacked configuration with respect to one another.
Figure 6B:
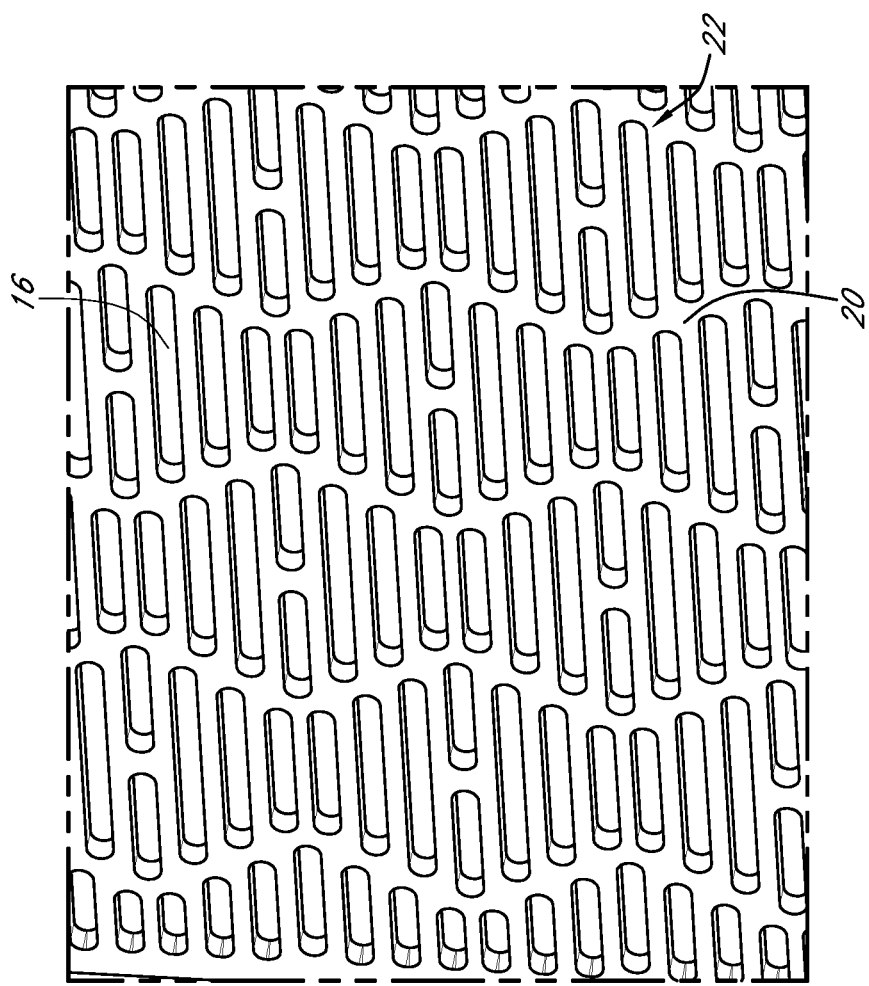
FIG. 6B provides a perspective view of an illustrative embodiment of a grow board with upper portions of a plurality of plants protruding through the slots.
Figure 6C:
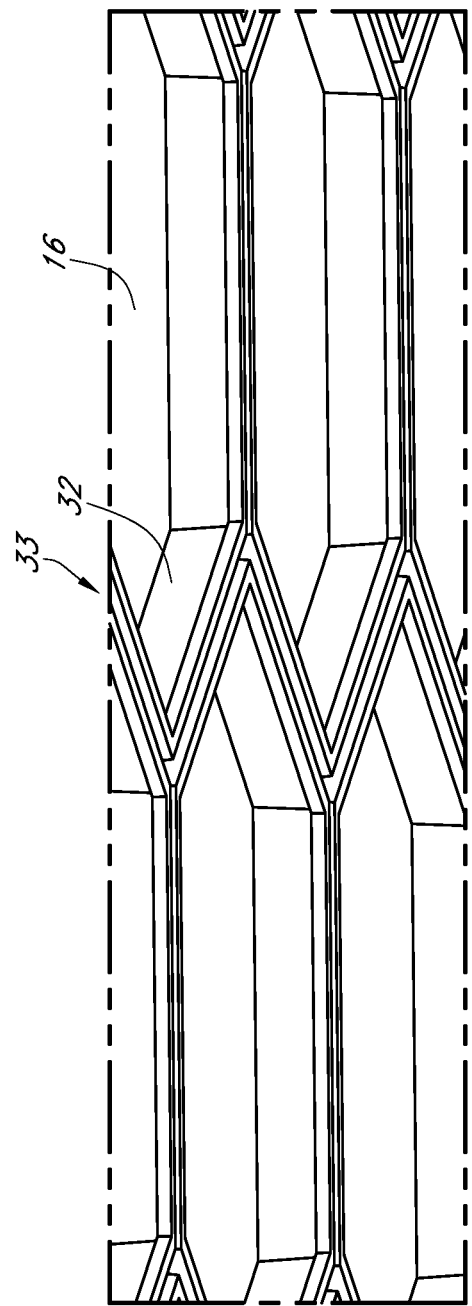
FIG. 6C provides a perspective view of an illustrative embodiment of a grow board with lower portions of a plurality of plants protruding through the openings.
Figure 7A:
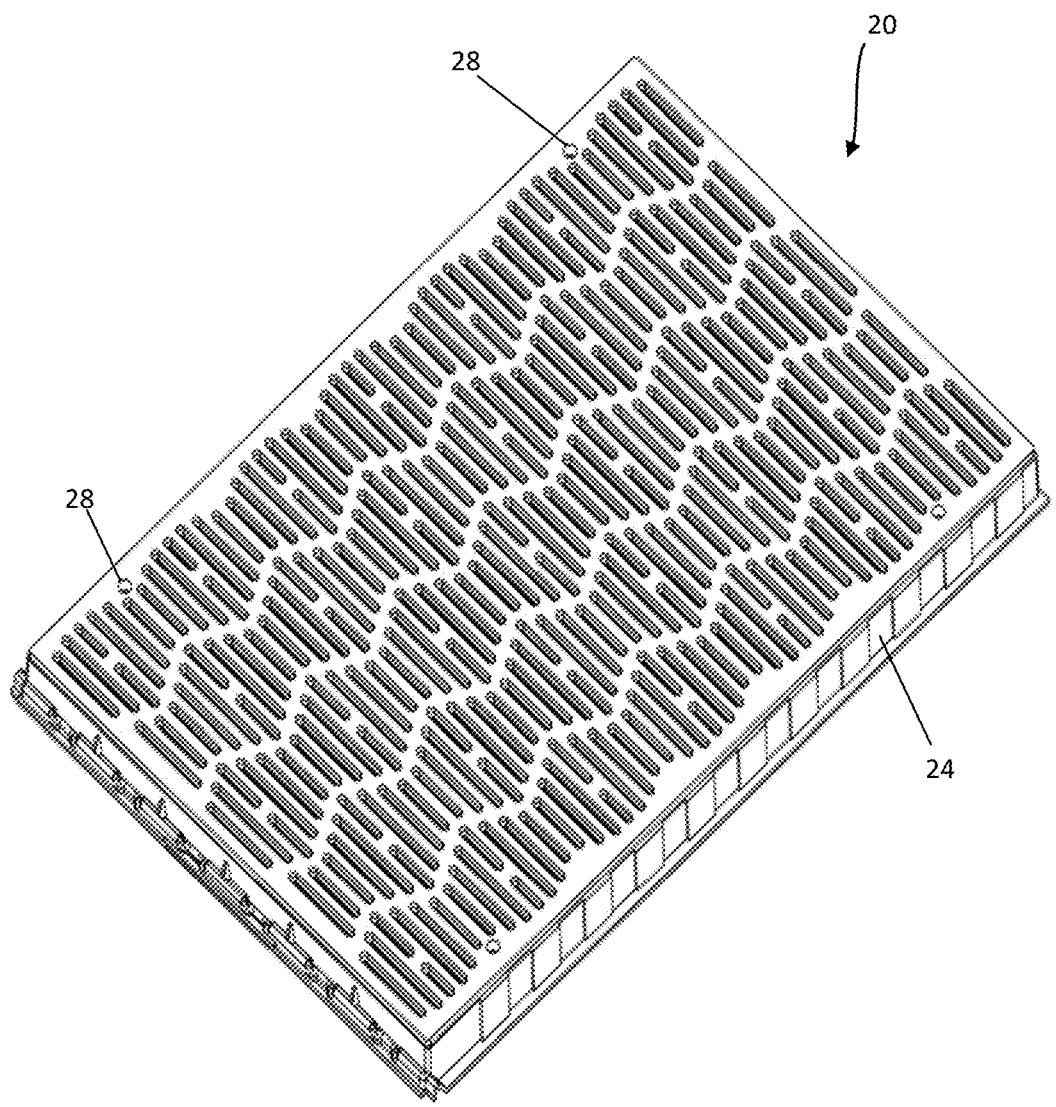
FIG. 7A provides an exterior perspective view of another illustrative embodiment of a grow board of FIGS. 1A, 2A, 2C and 2D without the rail.
Figure 7B:
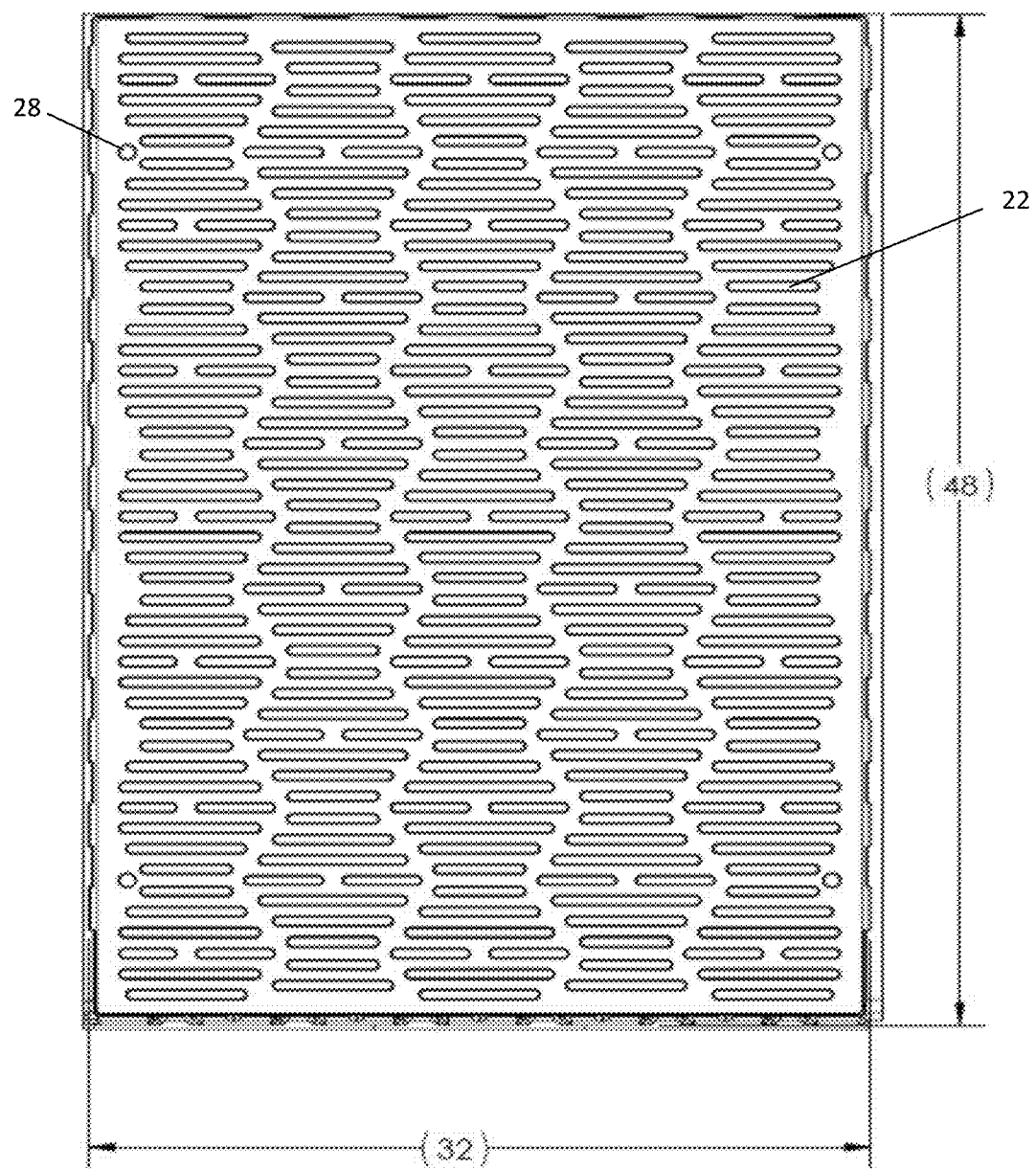
FIG. 7B provides a front view of the outer surface of an outer member that may be used with the illustrative embodiment of a grow board of 7A.
Figure 7C:
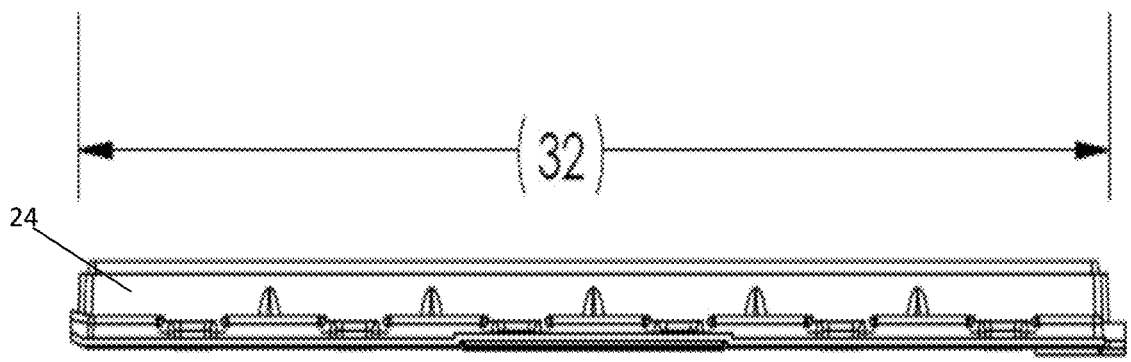
FIG. 7C provides a profile view of the outer surface of the embodiment of an outer member shown in FIGS. 7A-7B.
Figure 7D:
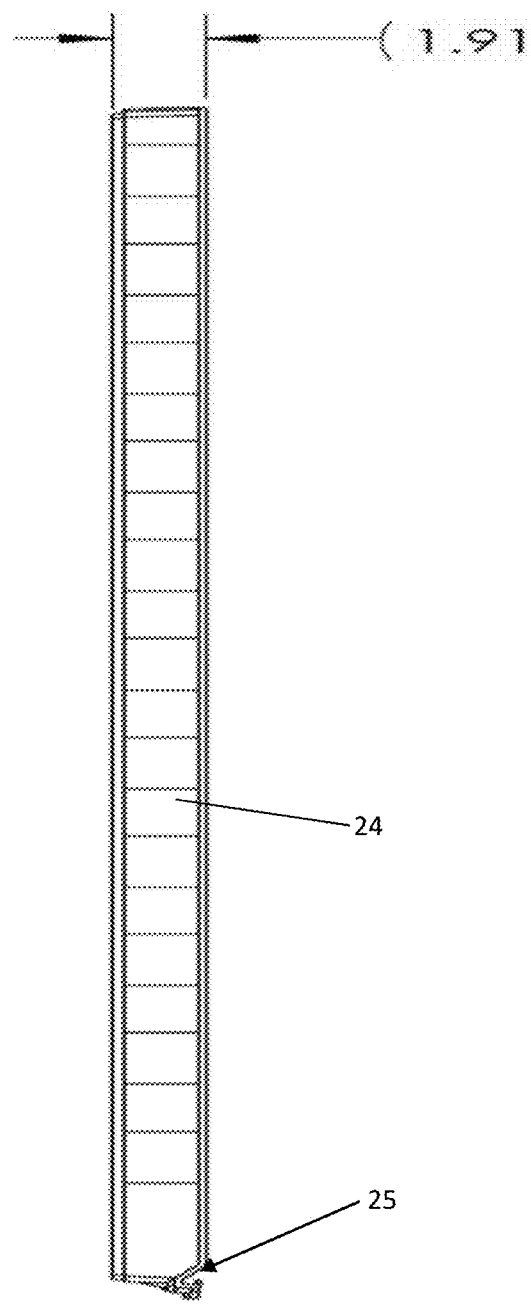
FIG. 7D provides a detailed side view of the illustrative embodiment of an outer member shown in FIGS. 7A-7C.
Figure 8A:
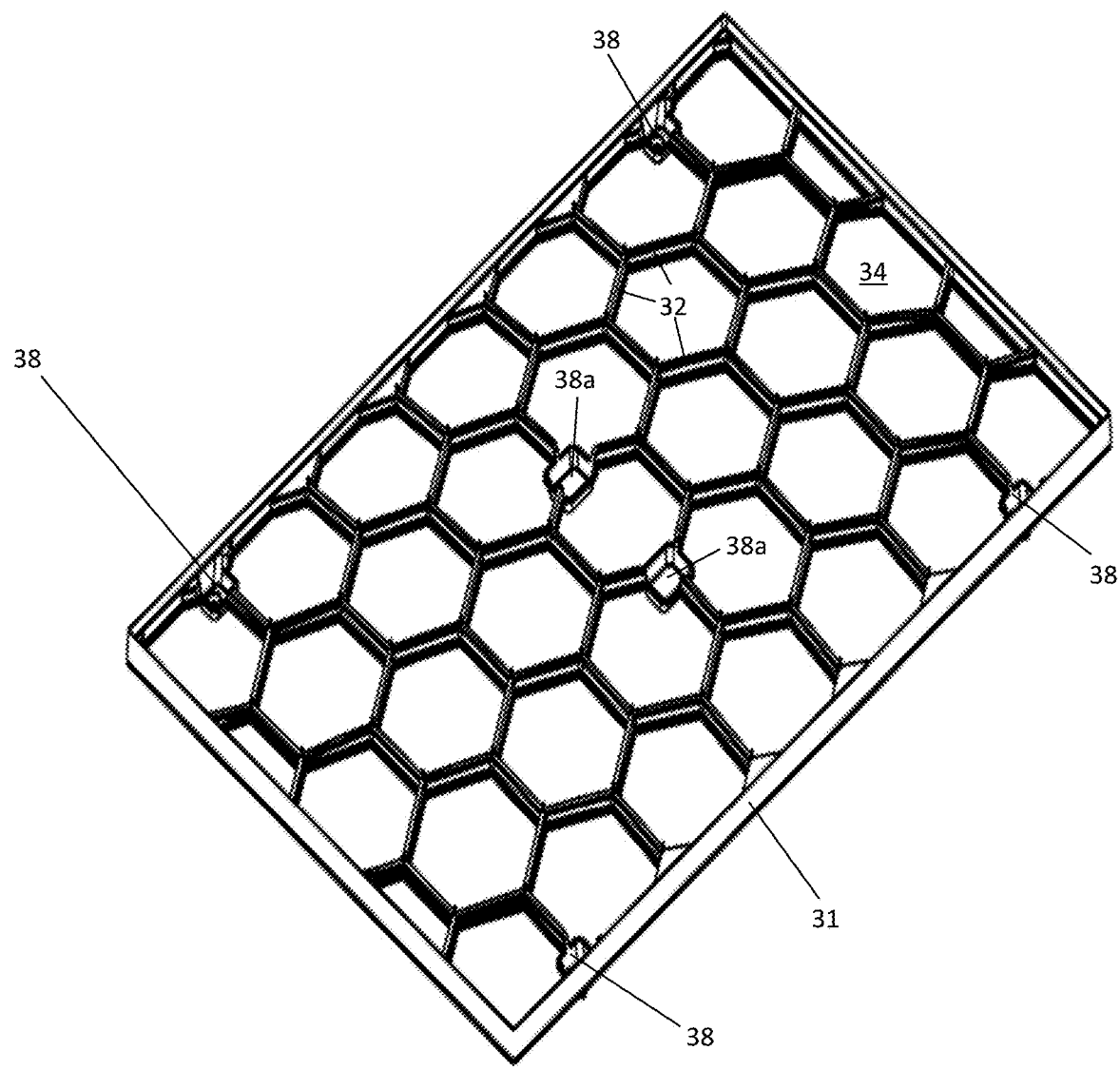
FIG. 8A provides an interior perspective view of another illustrative embodiment of a grow board inner member of FIGS. 4A-4D.
Figure 8B:
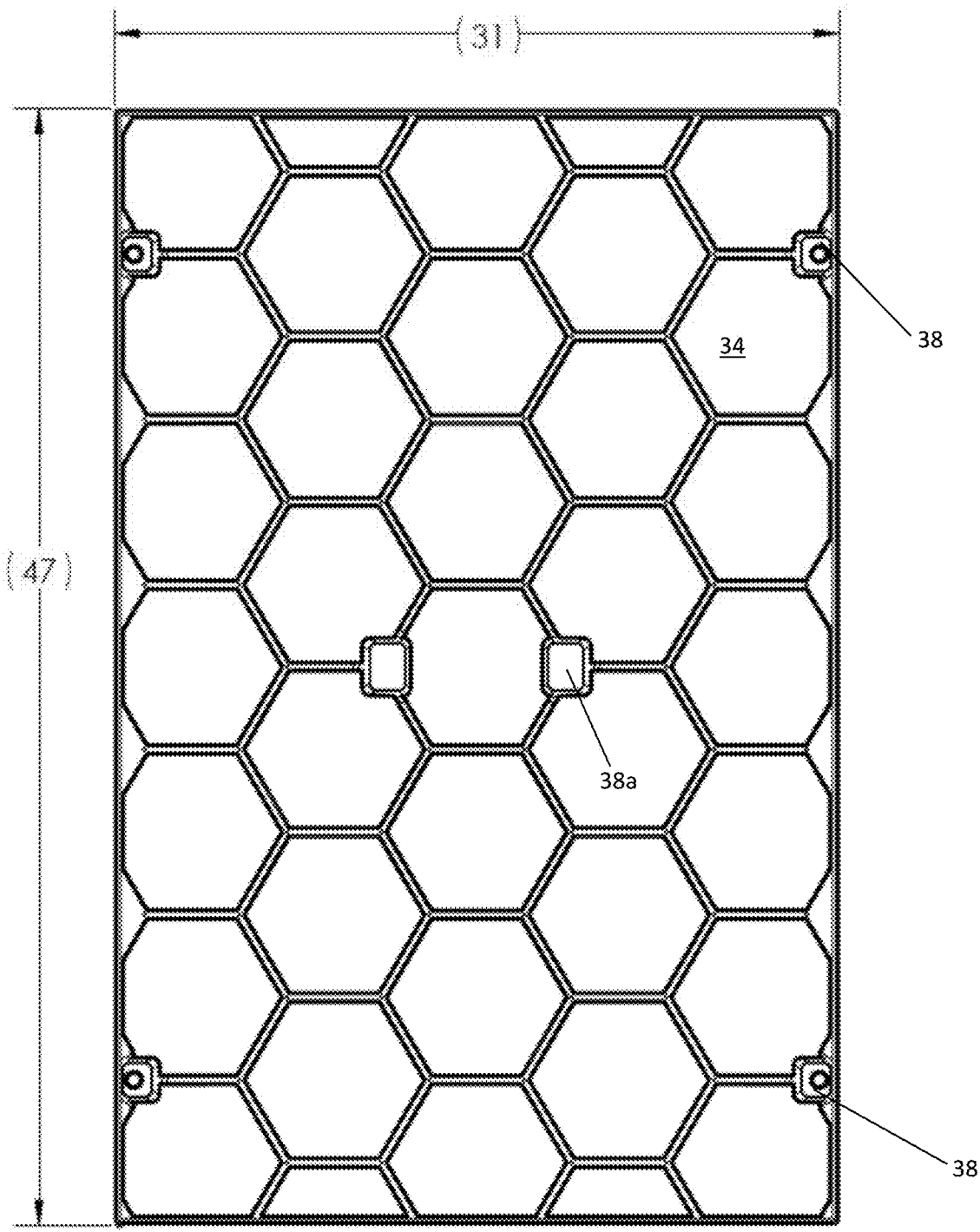
FIG. 8B provides a front view of the inner surface of an inner member that may be used with the illustrative embodiment of a grow board of FIG. 1A or 7A.
Figure 8C:
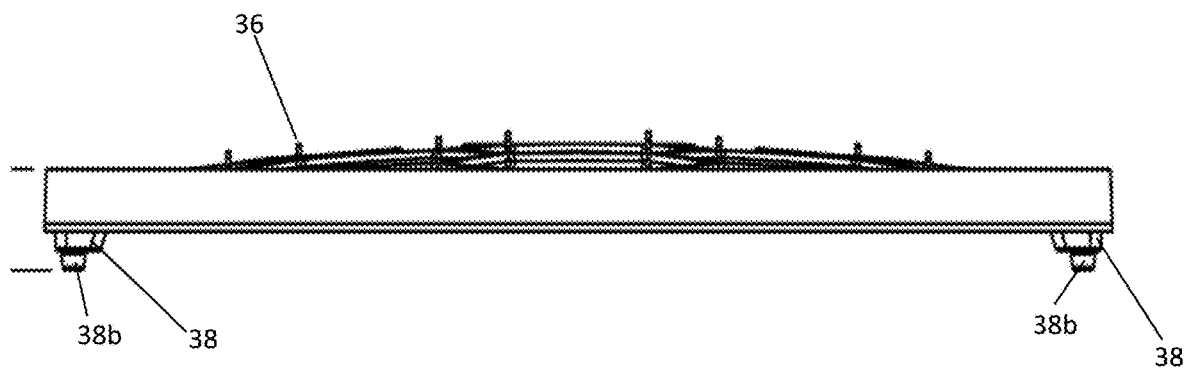
FIG. 8C provides an end view of the embodiment of an inner member shown in FIGS. 8A-8D.
Figure 8C:
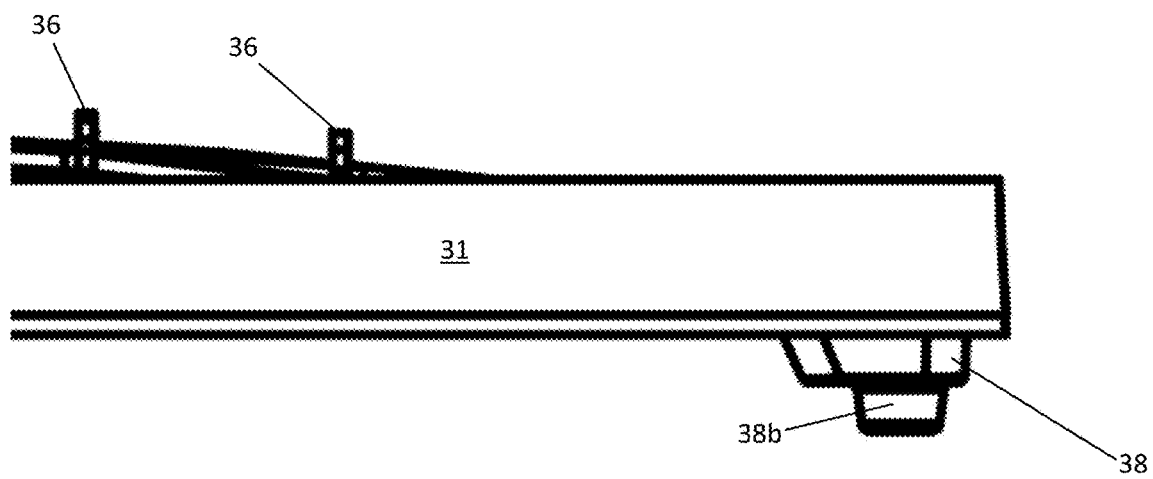
Figure 8D:
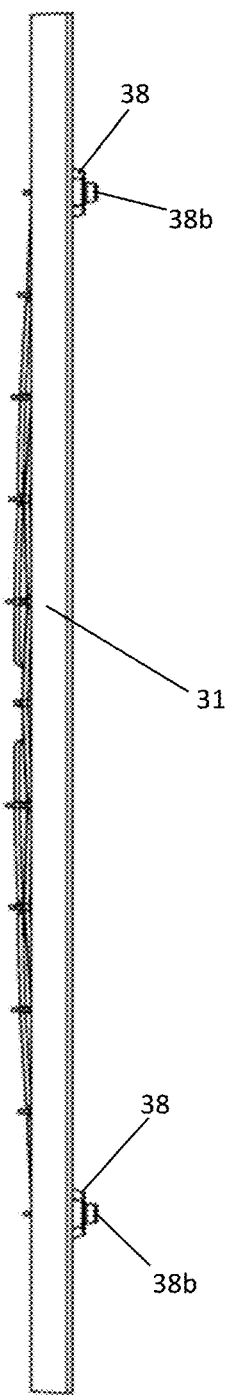
FIG. 8D provides a side view of the illustrative embodiment of an outer member shown in FIGS. 8A-8C.

The peripheral wall 24 of the outer member 20 may be flared outward such that one or more grow boards 10 may be stacked flat with respect to one another as shown in FIG. 5, wherein the grow boards 10 are shown in a nested configuration with respect to adjacent grow boards 10. This configuration may be especially useful during germination, wherein a plurality of grow boards 10 may be used to germinate a plurality of seeds while simultaneously requiring a relatively small amount of floor space. It is contemplated that the length of the peripheral wall 24 and/or thickness of the inner member 30 may be configured such that the spacing between adjacent grow boards 10 during germination provides adequate space such that plants on one grow board 10 do not interfere with those on an adjacent grow board 10, and such that plants on the interior area 19 of each grow board 10 receive adequate light and air. The optimal distance between adjacent grow boards 10 during germination will vary at least depending on the plants grow on the grow board 10, and is therefore in no way limiting to the scope of the present disclosure unless so indicated in the following claims.

It is contemplated that for germination and/or early stage plant growth, a plurality of grow boards 10 may be stacked horizontally atop one another in a manner similar to that shown in FIG. 5 after a plurality of seeds have been deposited on the grow media 16 and the grow media 16 is adequately positioned between the outer and inner members 20, 30. One method of depositing seeds on grow media 16 that may be used with a grow board 10 may comprise applying an adhesive to the grow media 16 (which adhesive may be comprised of any suitable material, such as synthetic materials, natural syrups, and/or combinations thereof) and then dropping seeds onto the grow media 16 having adhesive thereon. This method may be especially useful for grow media 16 comprised of wood chips.

After the grow boards 10 have been so arranged, a predetermined amount of water and/or nutrient supply may be introduced to the grow boards 10. This may be accomplished by simply placing the water and/or nutrient supply on the top grow board 10 and allowing gravity to cause the water and/or nutrient supply to move downward to lower grow boards 10. After a desired amount of water and/or nutrient supply has been introduced to the grow boards 10, a sealing member (not shown) may be placed over the entire stack of grow boards 10. The sealing member may be configured as a plastic sheet such that it is impermeable to air, water, and nutrient supply, but such that it is transparent. However, the scope of the present disclosure is not so limited, and any material with suitable porosity, flexibility, weight, and/or other characteristics may be used without limitation unless so indicated in the following claims.

Another illustrative embodiment of a grow board 10 that may comprise an outer member 20 (which is shown in FIGS. 7A-7D with some illustrative dimensions thereof shown), and an inner member 30 (which is shown in FIGS. 7C and 8A-8D with some illustrative dimensions thereof shown) may be configured to function in a manner similar to the first illustrative embodiment of a grow board 10 as previously described and shown in FIGS. 1-6 hereof during all phases of plant growth, including but not limited to germination.

In the illustrative embodiment of a grow board 10 shown in FIGS. 7A-8D, the inner member 30 may comprise one or more risers 38 protruding in an inward direction from the inner surface of the inner member 30, which are shown clearly in FIGS. 8A-8D. One or more risers 38 may be positioned at various positions around the frame 31. In an aspect, the frame 31 may comprise four risers 38, but it is contemplated that the optimal number, configuration, and/or spacing of the risers 38 will vary at least based upon the size and/or configuration of the grow board 10. Accordingly, the scope of the present disclosure is not limited by the number, configuration, spacing, and/or other aspect of the risers 38 unless so indicated in the following claims. Additionally or alternatively, one or more inner risers 38a may be positioned at one or more legs 32 of the inner member 30. In an aspect, an inner riser 38a may be positioned at or adjacent to the center of the inner member 30 and proximate a vertex or adjacent to a vertex of the grid formed by the legs 32. However, in other aspects of an inner member 30, the inner riser 38a may be differently positioned, spaced, and/or configured without limitation unless so indicated in the following claims.

Generally, the distance that a riser 38 and/or inner riser 38a may extend from the inner surface of the inner member 30 and may be sized to provide a gap between multiple stacked grow boards 10 sufficient to allow adequate penetration and/or circulation of light and/or air to support successful seed germination when multiple grow boards 10 are stacked horizontally as shown in FIG. 5. A riser 38 and/or inner riser 38a may be formed with a tip 38b at the distal end thereof having a relatively smaller cross-sectional area than the other portion of the riser 38 and/or inner riser 38a. In an aspect, the risers 38 and/or inner risers 38a may be hollow or open on the interior thereof and may be configured to align with a corresponding divot 28 formed in the outer surface of an outer member 30. It is contemplated that at least the tip 38b or a portion thereof may seat within a corresponding divot 28 of an adjacent outer member 20. Accordingly, the risers 38 and/or inner risers 38a may serve to provide adequate spacing between adjacent grow boards 10 when the grow boards 10 are horizontally stacked as shown in FIG. 5 (for example, during germination). If the outer members 20 are formed with corresponding divots 28, the risers 38 and/or inner risers 38a may cooperate with corresponding divots 28 to mitigate unwanted movement of adjacent grow boards 10 with respect to one another when the grow boards 10 are horizontally stacked.

Any shape, dimensions, and/or configuration of risers 38 and inner risers 38a may be employed in the inner member 30 to facilitate improved light penetration, circulation and/or air flow, and/or any other benefit and the present disclosure extends to any method and/or structure designed to do so unless so limited in the following claims.

In one aspect, the outer surface of the outer member 20 a grow board 10 may be generally planar. Such a configuration of a grow board 10 may be especially useful as an apparatus with a controlled environment for shipping and/or display of the plants grown in the grow board 10. That is, certain grow boards 10 may serve as a grow board 10 at a farm, as a shipping support during transportation of one or more plants from a farm to a location having a point of sale, and as a support for one or more plants at a point of sale. It is contemplated that a grow board 10 may be formed of as a recyclable plastic container.

In such an aspect, no harvest of the plants may be required at the farm. Instead, the customer and/or end consumer may perform the harvesting at the point of sale, wherein specific point-of-sale packaging may be available to the customer and/or end consumer. It is contemplated that the grow board 10 may be configured with a chamber adjacent to and/or encompassing a root portion of the plants (e.g., the portion of the grow board 10 adjacent the inner member 30) that may be climate controlled (e.g., humidity, temperature, light, nutrient supply, etc.). That is, this aspect may allow a consumer to harvest and purchase a living plant from a climate controlled point of sale. Such a grow board 10 would allow delivery of product with intact roots. The roots of the plants in the grow board 10 may be given a specific portion of nutrient supply, but cooled to suspend growth. This aspect may also allow the product to avoid required cooling space at stores and/or other point of sale locations. Additionally, the entire grow board 10 may be provided with display packaging and sold and/or distributed as a unit.

It is contemplated that during transportation and/or during display, a heat sink (e.g., dry ice, chilled liquid, etc.) and/or a heat exchanger may be employed to maintain the desired temperature for the root portion of the plants. Any plants that are not harvested and/or purchased by end consumers toward the end of the life of any plants on the grow board 10 may be harvested by a distributor and sold at a lower price.

In one aspect of the present disclosure, the grow boards 10 may be placed in a retail grocery store. Again, the grow boards 10 may be configured such that the root zone of the plants are positioned in a controlled environment. Customers of the grocery store may select a desired plant on the grow board 10 and harvest that specific plant manually, after which the customer may place the harvested plant in specific packaging provided adjacent the grow board 10. If any plants remain in the grow board 10 after and/or close to the time at which the plants are close to end of life, a produce manager may harvest the remaining plants and sell them at a reduced price. In such an embodiment, one grow board 10 may be used to germinate, grow, transport, display, and ultimately harvest and sell at least one plant.

If the plants on the grow board 10 are harvested at a farm and later transported to a point of sale, embodiments of a grow board 10 wherein the exterior surface of the outer member 20 is generally planar may increase the efficiency of harvesting the plants. Using a grow board 10 so configured, a sickle bar and/or other linear harvesting apparatus with a width approximately equal to that of the grow board 10 may be used to traverse the length of grow board 10, thereby harvesting all the plants on the grow board 10 in a single operation. However, other methods of harvesting may be used with various embodiments of the grow board 10 without limitation unless so indicated in the following claims, and the location of harvesting in no way limits the scope of the present disclosure. Additionally, any apparatus and/or methods suitable for the particular application may be used to harvest plants grow from the grow board 10 without limitation unless so indicated in the following claims, and the optimal apparatus will vary at least depending on the type of plant grown.

ALTERNATIVE EMBODIMENTS OF A GROW BOARD

Figure 9A:
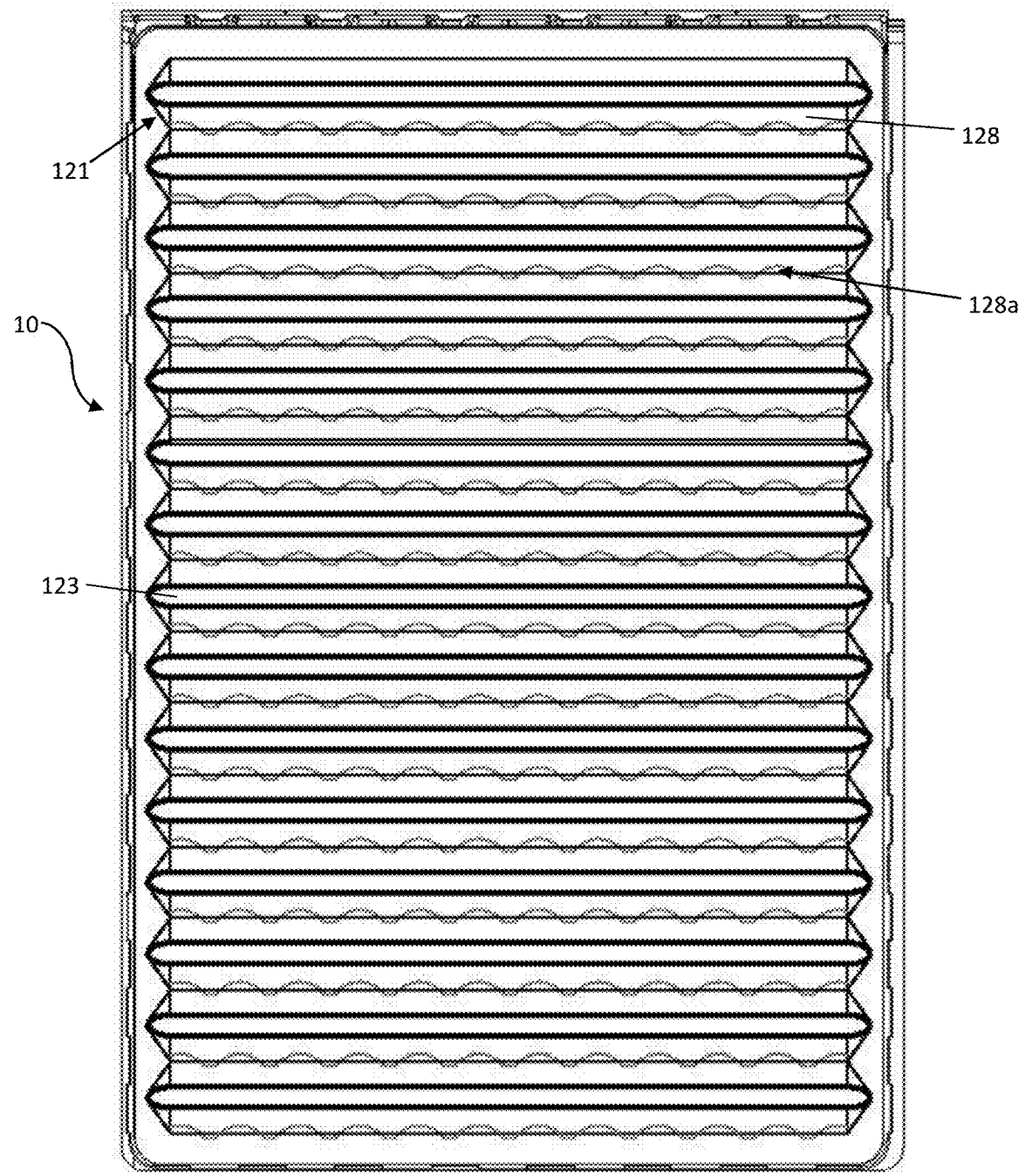
FIG. 9A provides a front view of the outer surface of another illustrative embodiment of an outer member.
Figure 9B:
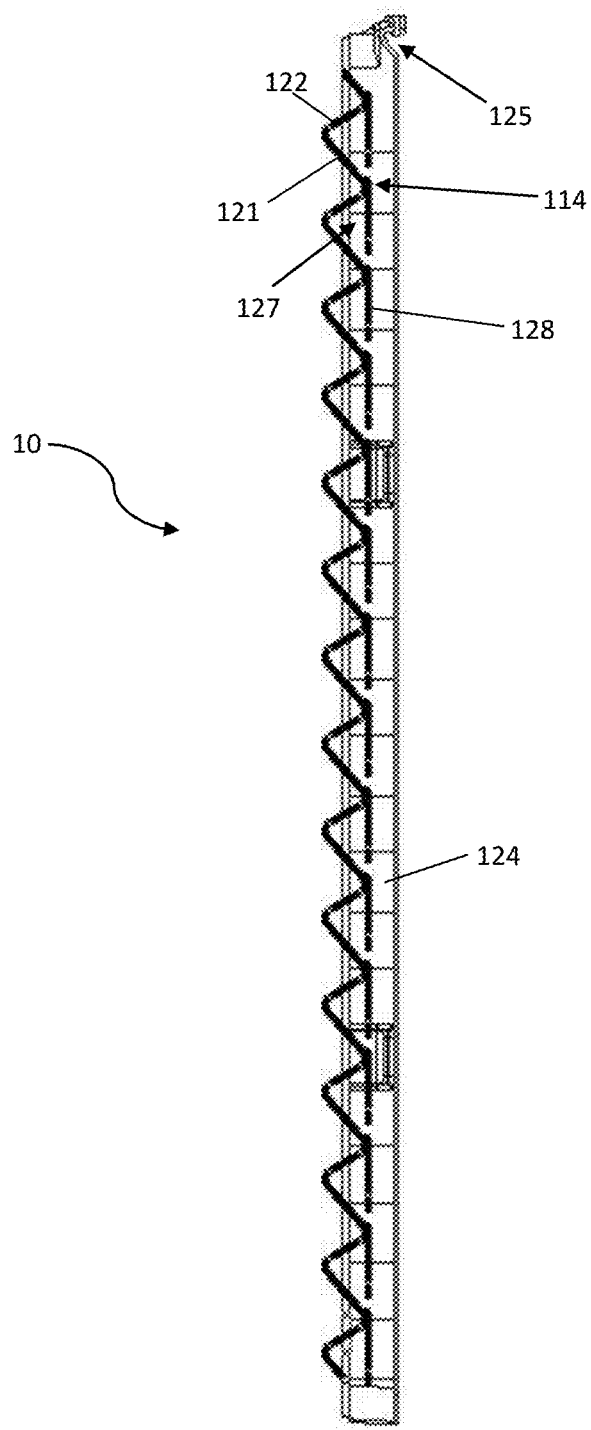
FIG. 9B provides a side view of the embodiment of an outer member shown in FIG. 9A.
Figure 9C:
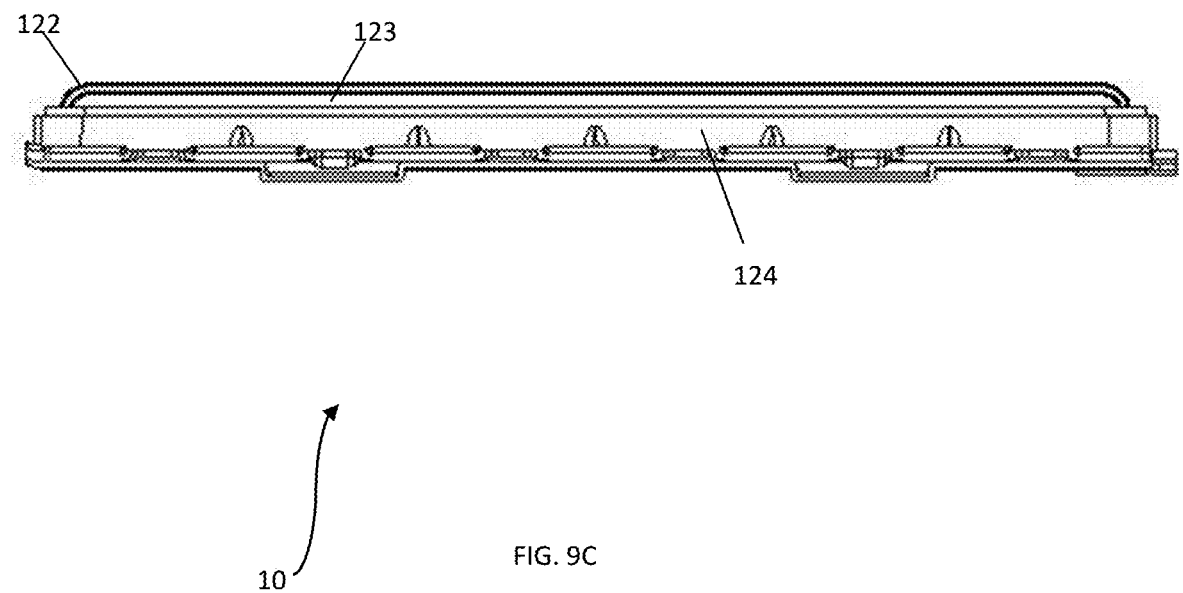
FIG. 9C provides an end view of the embodiment of an outer member shown in FIGS. 9A and 9B.
Figure 10A:
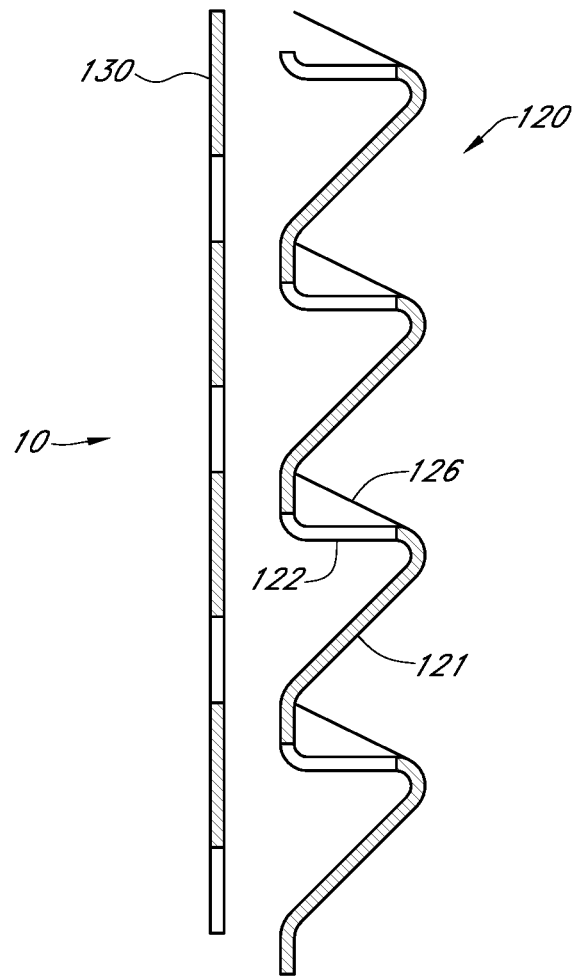
FIG. 10A provides a side view of another illustrative embodiment of a grow board.
Figure 10B:
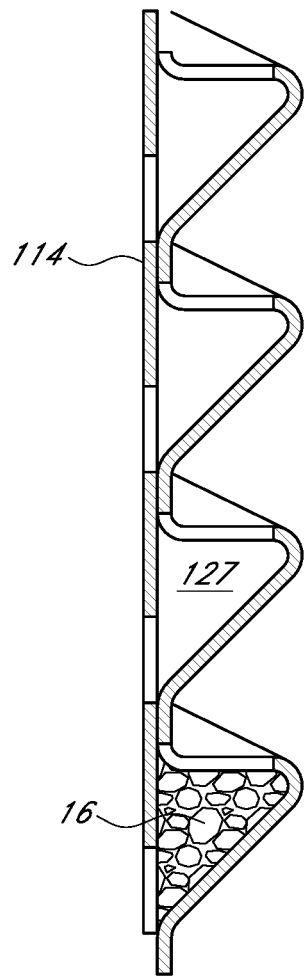
FIG. 10B provides another side view of the illustrative embodiment of a grow board shown in FIG. 10A.
Figure 11:
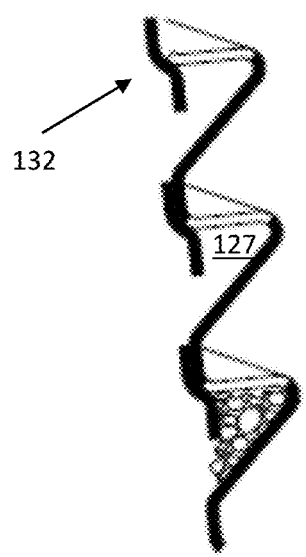
FIG. 11 provides a side view of another illustrative embodiment of a grow board.
Figure 12A:
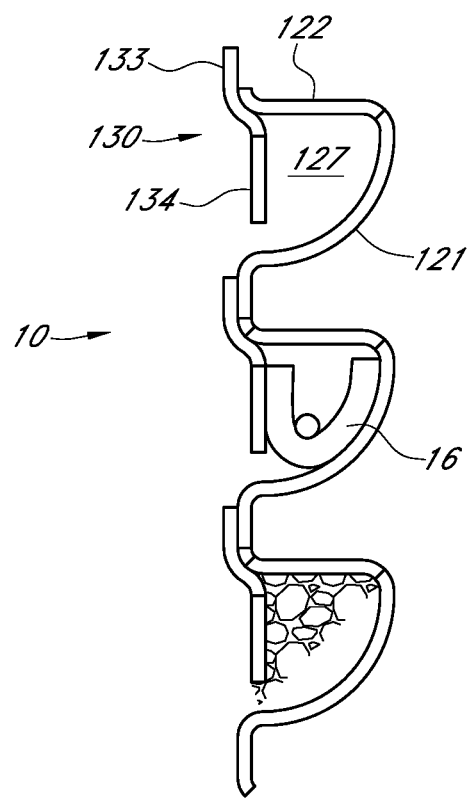
FIG. 12A provides side view of another illustrative embodiment of a grow board.
Figure 12B:
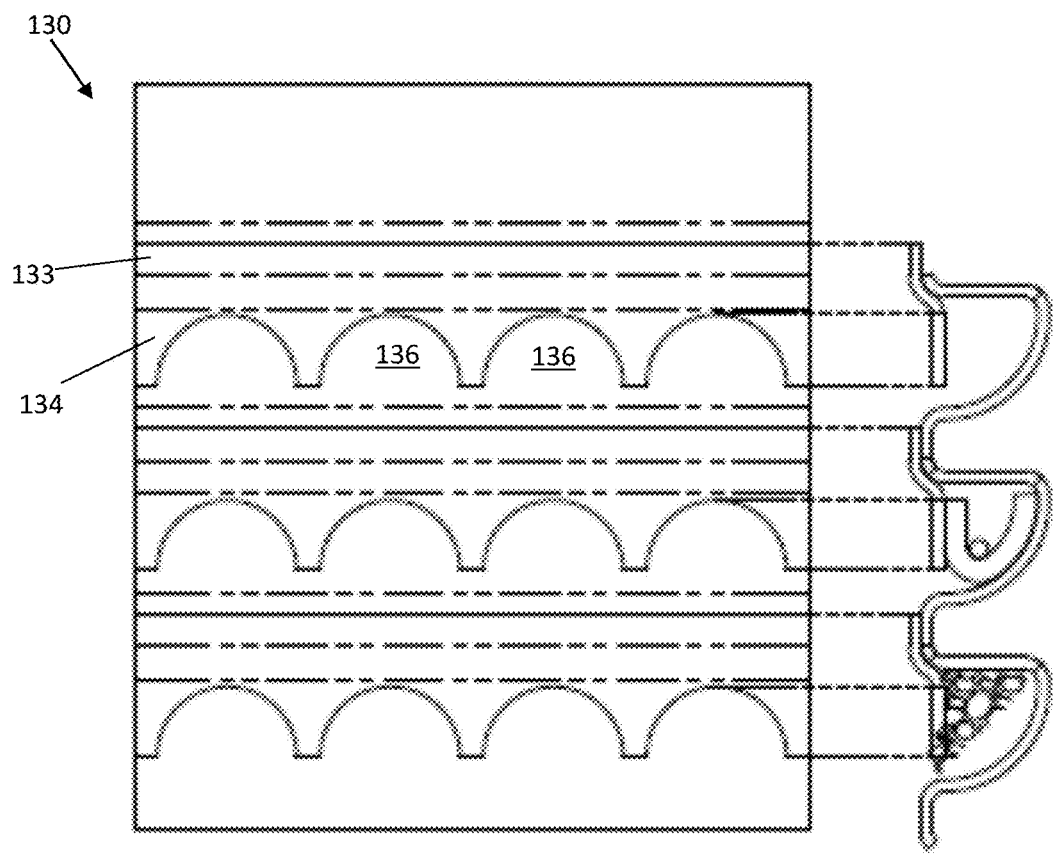
FIG. 12B provides a side and back view of the illustrative embodiment of a grow board shown in FIG. 12A.

Another illustrative embodiment of a grow board 10 is shown in FIGS. 9A-9C, wherein the outer surface thereof is shown in FIG. 9A. A cross-sectional view is provided in FIG. 9B and the grow board 10 is shown from the top in FIG. 9C. Two cross-sectional views of a grow board 10 that may have some corresponding aspects are provided in FIGS. 10A & 10B. Additional cross-sectional view of other grow boards 10 that may have corresponding aspects are shown in FIGS. 11 & 12A, respectively. FIG. 12B provides a front view of a portion of the grow board 10 shown in FIG. 12A. It is contemplated that these embodiments of a grow board 10 may be used in agriculture and in a modular manner as previously described for other embodiments of a grow board 10 without limitation unless so indicated in the following claims.

It is contemplated that for the embodiments of a grow board 10 shown in FIGS. 9A-12B, the portion of a plant (which plant is grown using the grow board 10) that would normally constitute the upper portion of the plant (i.e., the portion of a plant other than the roots) may protrude from the grow media 16 out from one or more slots 123 formed in a shelf 122. Similarly, it is contemplated that the portion of a plant that would normally constitute the lower portion of the plant (i.e., the root portion) may be positioned within and/or may protrude out from (in a generally downward direction) a chamber 127 (and/or outward from grow media 16 positioned adjacent thereto). It is further contemplated that these embodiments of a grow board 10 may be especially useful when used in conjunction with a nutrient delivery system that provides nutrient supply adjacent the root portion of the plants. Other orientations and/or configurations of plants, upper and/or lower portions thereof, and/or delivery of nutrient supply may be used with the grow board 10 without limitation. Generally, as used herein, the term "outer surface" of a grow board 10 or component thereof as shown in FIGS. 9A-12B may constitute the surface generally facing the direction from which a shelf 122 protrudes from the grow board and the "inner surface" of a grow board 10 or component thereof may constitute the surface opposite the inner surface. In many applications the inner surface of a grow board 10 or component thereof may be oriented toward a nutrient supply and an outer surface of a grow board 10 or component thereof may be oriented away from a nutrient supply.

It is contemplated that the embodiments of a grow board 10 shown in FIGS. 9A-12B may be configured with a periphery 18 that is at least similar enough to the periphery 18 of the embodiments of a grow board 10 shown in FIGS. 1-8D such that all of these various grow boards 10 may be engaged with a single rail 12 and/or support structure. As shown in FIGS. 9A-9C, the peripheral wall 124 of the outer member 120 in this embodiment may be configured in a manner that is similar or even identical to the peripheral wall 24 of the other embodiments of a grow board 10 disclosed herein and vice versa. Referring specifically to FIG. 9B, an indent 125 may be formed in the peripheral wall 124 as previously described for other embodiments of a grow board 10 to provide an engagement area between the outer member 120 (and/or grow board 10) and a rail 12 (and/or other support structure). Again, it is contemplated that the various grow boards 10 disclosed herein may be interchangeable on a single rail 12 and/or support structure.

Generally, in an aspect of a grow board 10 such as those shown in FIGS. 9A-12B, the grow board 10 may be configured such that a grow media 16 may be positioned in a chamber 127. The chamber 127 may be formed via cooperation between an outer member 120 and an inner member 130, or the chamber 127 may be formed via one or more backing members 128 engaged with an outer member 120 at various positions of the outer member 120 on the inner surface thereof. The optimal grow media 16 may vary from one plant to the next. Accordingly, any grow media 16 currently known or later developed may be used with the grow board 10 without limitation, including but not limited to burlap, cotton, wood chips (which may be engaged with a netting, such as a polymer net) polymer fabrics, synthetic foam, polymers, plastics, cloth, composite materials, rock wool, perlite, other natural materials, other synthetic materials, and/or combinations thereof.

For the embodiment shown in FIGS. 9A-9C, a backing member 128 may be engaged with a portion of the inner surface of one or more shelves 122. The backing member 128 and outer member 120 may be integrally formed with one another or separately formed and later engaged with one another at one or more connection points 114. In one aspect the connection point 114 may be configured as a type of living hinge if the material used for the outer member 120 and backing member 128 is suitable for such a configuration. In another embodiment mechanical hinges pivotally engage a portion of the outer member 120 with the backing member 128. The backing member 128 may be formed with one or more recesses 128a therein, which recesses 128a may be semi-circular in shape. However, the scope of the present disclosure is not so limited and extends to grow boards 10 having backing members 128 with any number, shape, dimensioned, and/or configuration of recesses 128a therein unless so limited by the following claims. It is contemplated that the optimal number, spacing, dimensions, and/or configuration of recesses 128a in the backing member 128 will vary from one application of the grow board 10 to the next and depend at least on the type of grow media 16 positioned in each chamber 127. For example, when smaller-sized grow media 16 is used, it is contemplated that the recesses 128a may generally be smaller, and vice versa. For one embodiment now shown herein, it is contemplated that backing member 128 may generally be configured as a comb, wherein the recesses 128a may be generally rectangular in shape and very closely spaced with respect to one another with flexible and/or semi-flexible elongate members positioned between adjacent recesses 128a.

It is contemplated that the upper portion of the plant may be positioned adjacent the outer surface of the shelf 122, whereas the lower portion of the plant may be positioned adjacent the inner surface of the shelf 122, such that at least some of the root portion of the plant may be positioned within the chamber 127. The shelf 122 may be engaged with a support 121 (which may constitute the underside of the shelf 122), to provide support, rigidity, structural integrity, and/or any other consideration needed and/or beneficial for the specific application of the grow board 10. In an aspect, the support 121 and shelf 122 may be generally linear and angled with respect to one another by an angle less than 90 degrees. Additionally, an arm 126 may be engaged with an adjacent shelf 122 and support 121 (as shown in FIGS. 10A-11), adjacent shelves 122, and/or adjacent supports 121 to provide support, rigidity, structural integrity, and/or any other consideration needed and/or beneficial for the specific application of the grow board 10. In an aspect of the grow board 10 shown in FIGS. 12A & 12B, the shelf 122 may be generally linear but the support 121 may be generally curved. Accordingly, the specific shape, dimensions, orientations, and/or configurations of the shelf 122 and/or support 121 alone or relative to one another in no way limits the scope of the present disclosure.

In an aspect of the grow boards 10 shown in FIGS. 10A-12B, the shelf 122 and support 121 may cooperate with an inner member 130 to form a chamber 127, into which grow media 16 may be positioned. The chamber 127 may be generally triangular in cross-sectional shape, whereas in other aspects the chamber 127 may be generally shaped as a sector (i.e., an arc connecting two radii). However, the specific shape, dimensions, and/or configuration of the chamber 127 in no way limits the scope of the present disclosure, and the optimal configuration of the chamber 127 will vary from one application of the grow board 10 to the next and be dependent at least on the plant for which the grow board 10 is designed.

The outer member 120 and inner member 130 may be integrally formed with one another or separately formed and later engaged with one another at one or more connection points 114. In an aspect the connection point 114 may be configured as a type of living hinge if the material used for the outer and inner members 120, 130 is suitable for such a configuration. In another embodiment mechanical hinges pivotally engage a portion of the outer member 120 with the inner member 130.

In an aspect, the inner member 130 in the illustrative embodiments may be comprised of one or more beams 132, as most clearly shown in FIGS. 11-12B. Each beam 132 may be comprised of a top portion 133 and a bottom portion 134, which may be generally linear but offset with respect to one another. The bottom portion 134 may include one or more voids 136 formed therein, as shown in FIG. 12B, the left-hand side of which provides a front view of an illustrative embodiment of an inner member 30. Although the voids 136 shown in FIG. 12B may be generally semi-circular in shape, the scope of the present disclosure is not so limited and extends to grow boards 10 having inner members 130 with any number, shape, dimensioned, and/or configuration of voids 136 therein unless so limited by the following claims. It is contemplated that the optimal number, spacing, dimensions, and/or configuration of voids 136 in the inner member 130 will vary from one application of the grow board 10 to the next and depend at least on the type of grow media 16 positioned in each chamber 127. For example, when smaller-sized grow media 16 is used, it is contemplated that the voids 136 may generally be smaller, and vice versa. For one embodiment now shown herein, it is contemplated that the bottom portion 134 of the inner member 130 may generally be configured as a comb, wherein the voids 136 may be generally rectangular in shape and very closely spaced with respect to one another with flexible and/or semi-flexible elongate members of the bottom portion 134 positioned between adjacent voids 136.

As shown, the outer surface of the shelf 122 may be configured such that it is generally smooth and planar, wherein one or more slots 123 may be formed in the shelf 122 and pass from the outer surface to the inner surface thereof. In some applications it is contemplated that plants may be positioned in one or more slots 123 during use of the grow board 10. In an aspect it is contemplated that the grow board 10 may be generally rectangular in shape. Further, the grow board 10 may be 32 inches wide and 48 inches high, without limitation unless so indicated in the following claims. The optimal number, spacing, dimensions, shape, and/or configuration of the slots 123, shelves 122, chambers 127, backing members 128, recesses 128a, beams 132, top portions 133, bottom portions 134, voids 136 and/or other components of the grow board 10 may vary from one application of the grow board 10 to the next, and those considerations are therefore in no way limiting to the scope of the present disclosure unless so indicated in the following claims. Furthermore, the optimal number, spacing, dimensions, and/or shape of the grow board(s) 10 may vary from one application of the grow board 10 to the next, and those considerations are therefore in no way limiting to the scope of the present disclosure.

It is contemplated that for some embodiments of a grow board 10, the inner member 130 may generally serve to provide support, rigidity, structural integrity, and/or any other consideration needed and/or beneficial for the particular application of the grow board 10. The inner member 130 may be constructed of any suitable material, including but not limited to plastics (such as food-grade ABS plastic), polymers (such as polyethylene), metals and their alloys, natural materials, other synthetic materials, and/or combinations thereof. However, the scope of the present disclosure is in no way limited by the materials used to construct the inner member 130.

In one aspect of a grow board 10, the outer member 120 may be comprised of a synthetic material that reflects a large portion of light to increase the efficiency of light absorbed by plants grown using the grow board 10 (such as white colored, food-grade ABS plastic). However, the scope of the present disclosure is in no way limited by the materials used to construct any portion of the grow board 10, including but not limited to the outer member 120 and inner member 130, unless so indicated in the following claims.

It is contemplated that for germination and/or early stage plant growth, a plurality of grow boards 10 may be stacked horizontally atop one another after a plurality of seeds have been deposited on the grow media 16 and the grow media 16 is adequately positioned in a respective chamber 127. One method of depositing seeds on grow media 16 that may be used with the illustrative embodiment of a grow board 10 may comprise applying an adhesive to the grow media 16 (which adhesive may be comprised of any suitable material, such as synthetic materials, natural syrups, and/or combinations thereof) and then dropping seeds onto the grow media 16 having adhesive thereon. This method may be especially useful for grow media 16 comprised of wood chips. A reorientation of the grow board 10 may cause a certain amount of seeds to dislodge from the grow media 16. The grow media 16 may then be stamped and/or otherwise configured into strips and inserted into respective chambers 127 (manually, robotically, or via a combination thereof) either before or after germination and/or early stage plant growth has occurred.

After the grow boards 10 have been so arranged, a predetermined amount of water and/or nutrient supply may be introduced to the grow boards 10. This may be accomplished by simply placing the water and/or nutrient supply on the top grow board 10 and allowing gravity to cause the water and/or nutrient supply to move downward to lower grow boards 10. After a desired amount of water and/or nutrient supply has been introduced to the grow boards 10, a sealing member (not shown) may be placed over the entire stack of grow boards 10. The sealing member may be configured as a plastic sheet, but the scope of the present disclosure is not so limited, and any material with suitable porosity, flexibility, weight, and/or other characteristics may be used without limitation unless so indicated in the following claims.

Because the exterior surface of the shelves 122 may be generally planar, this and/or similar configurations of grow boards 10 may be especially useful as an apparatus with a controlled environment for shipping and/or display of the plants grow in the grow board 10. That is, certain grow boards 10 may serve as a grow board 10 at a farm, as a shipping support during transportation of one or more plants from a farm to a location having a point of sale, and as a support for one or more plants at a point of sale. It is contemplated that in one illustrative embodiment such a grow board 10 may be formed of as a recyclable plastic container.

In such an aspect, no harvest of the plants may be required at the farm. Instead, the customer and/or end consumer may perform the harvesting at the point of sale, wherein specific point-of-sale packaging may be available to the customer and/or end consumer. It is contemplated that the grow board 10 may be configured with a chamber adjacent to and/or encompassing a root portion of the plants (e.g., the portion of the grow board 10 adjacent the inner member 30) that may be climate controlled (e.g., humidity, temperature, light, nutrient supply, etc.). That is, this aspect may allow a consumer to harvest and purchase a living plant from a climate controlled point of sale. Such a grow board 10 would allow delivery of product with intact roots. The roots of the plants in the grow board 10 may be given a specific portion of nutrient supply, but cooled to suspend growth. This aspect may also allow the product to avoid required cooling space at stores and/or other point of sale locations. Additionally, the entire grow board 10 may be provided with display packaging and sold and/or distributed as a unit.

It is contemplated that during transportation and/or during display, a heat sink (e.g., dry ice, chilled liquid, etc.) and/or a heat exchanger may be employed to maintain the desired temperature for the root portion of the plants. Any plants that are not harvested and/or purchased by end consumers toward the end of the life of any plants on the grow board 10 may be harvested by a distributor and sold at a lower price.

In one aspect of the present disclosure, the grow boards 10 may be placed in a retail grocery store. Again, the grow boards 10 may be configured such that the root zone of the plants are positioned in a controlled environment. Customers of the grocery store may select a desired plant on the grow board 10 and harvest that specific plant manually, after which the customer may place the harvested plant in specific packaging provided adjacent the grow board 10. If any plants remain in the grow board 10 after and/or close to the time at which the plants are close to end of life, a produce manager may harvest the remaining plants and sell them at a reduced price. In such an embodiment, one grow board 10 may be used to germinate, grow, transport, display, and ultimately harvest and sell at least one plant.

If the plants on the grow board 10 are harvested at a farm and later transported to a point of sale, embodiments of a grow board 10 wherein the exterior surface of the shelf 122 is generally planar may increase the efficiency of harvesting the plants. Using a grow board 10 so configured, a sickle bar and/or other linear harvesting apparatus with a width approximately equal to that of the shelf 122 may be used to traverse the width of grow board 10, thereby harvesting all the plants on a shelf 122 in a single operation. However, other methods of harvesting may be used with various embodiments of the grow board 10 without limitation unless so indicated in the following claims, and the location of harvesting in no way limits the scope of the present disclosure. Additionally, any apparatus and/or methods suitable for the particular application may be used to harvest plants grow from the grow board 10 without limitation unless so indicated in the following claims, and the optimal apparatus will vary at least depending on the type of plant grown.

It is contemplated that for certain plants, the type of grow board 10 shown in FIGS. 9A-12B may be especially advantageous due to the orientation of the slots 123, which may allow a plant to grow in a more vertical direction when compared with other grow boards 10. Additionally, it is contemplated that this type of grow board 10 may ease removal of residual plant material, grow media 16, and/or other material after harvest in preparation of reusing the grow board 10. In an aspect, a pressurized fluid may be applied to the grow board 10 in a direction from the outer surface to the inward surface with such flow characteristics that residual plant material, grow media 16, and/or other material positioned on the outer surface, inner surface, and/or within the chamber 27 may be expelled from the grow board 10, which expulsion may be accomplished via flexing and/or bending of one or more recesses 28a and/or areas of the bottom portion 134. However, the specific orientation of the plants and/or method for cleaning a grow board 10 in no way limit the scope of the present disclosure unless so indicated in the following claims.

Figure 13A:
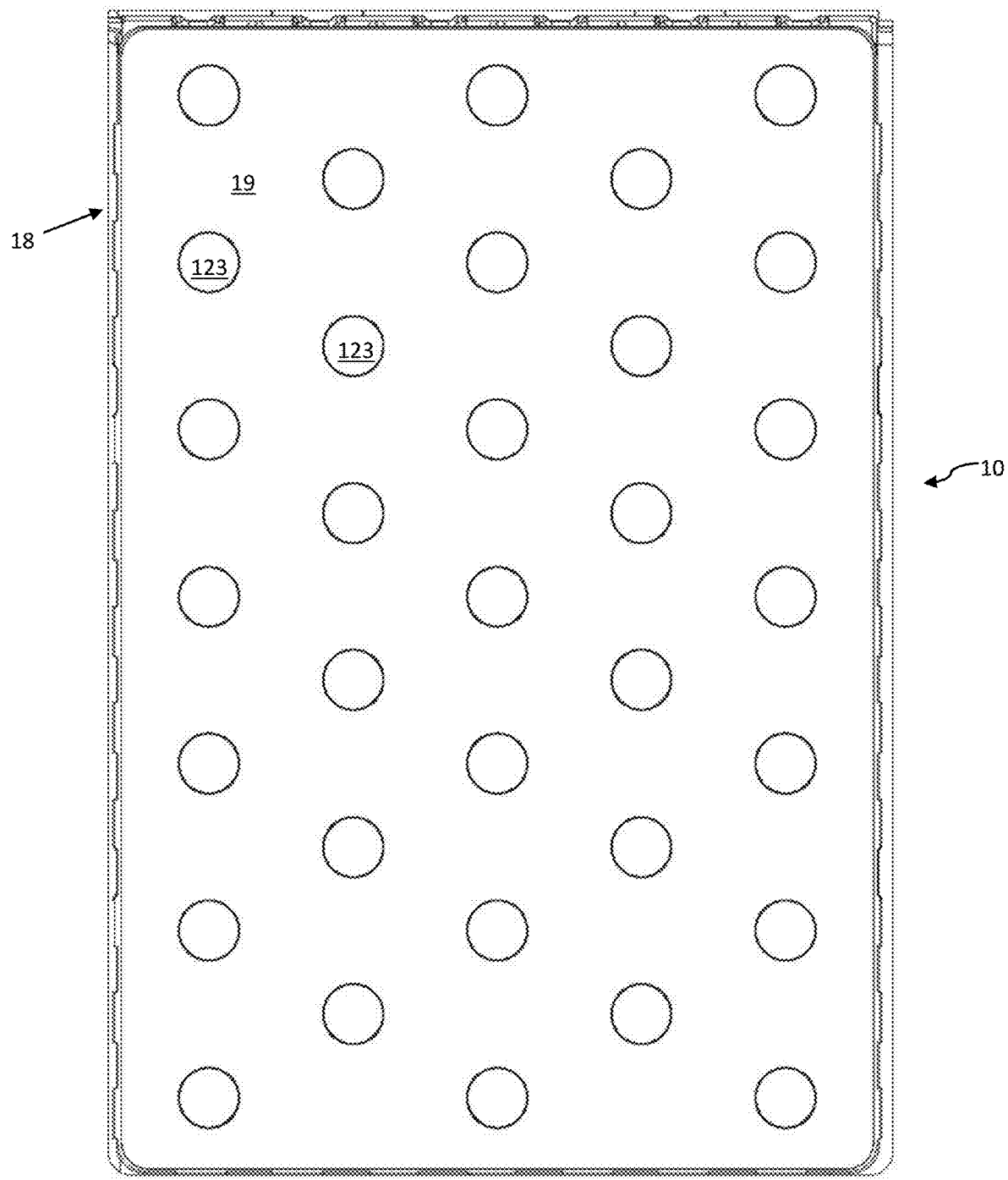
FIG. 13A provides a front view of the outer surface of another embodiment of an grow board.
Figure 13B:
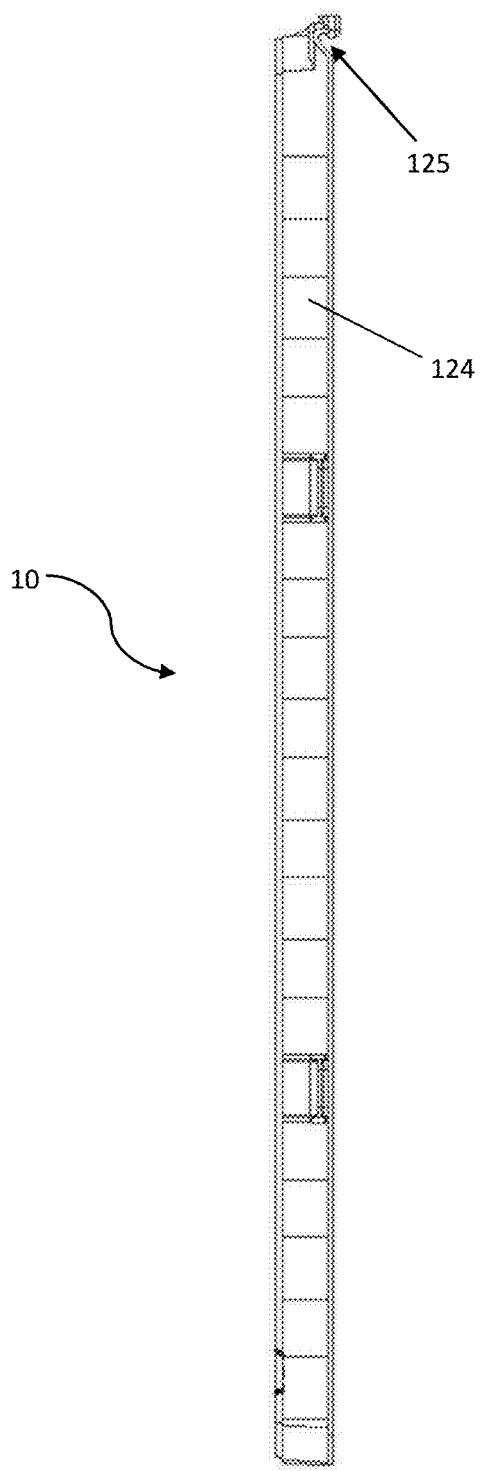
FIG. 13B provides a side view of the embodiment of the grow board shown in FIG. 13A.
Figure 13C:
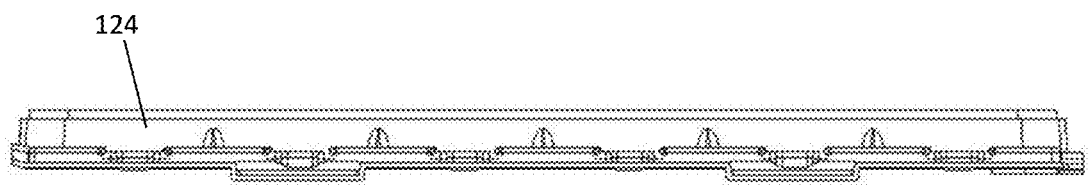
FIG. 13C provides an end view of the embodiment of a grow board shown in FIGS. 13A and 13B.

Another illustrative embodiment of a grow board 10 is shown in FIGS. 13A-13C, wherein FIG. 13A provides a front view of the outer surface 10 of the outer member 120, FIG. 13B provides a side view of the grow board 10, and FIG. 13C provides an end view thereof. It is contemplated that this embodiment of a grow board 10 may be used in agriculture and in a modular manner as previously described for other embodiments of a grow board 10 without limitation unless so indicated in the following claims. It is contemplated that the embodiments of a grow board 10 shown in FIGS. 13A-13C may be configured with a periphery 18 that is at least similar enough to the periphery 18 of other embodiments of a grow board 10 disclosed herein such that all of these various grow boards 10 may be engaged with a single rail 12 and/or support structure. Generally, as used herein, the "inner surface" of a grow board 10 or component thereof as shown in FIGS. 13A-13C may constitute the surface generally facing the root portion of a plant and the term "outer surface" of a grow board 10 or component thereof may constitute the surface generally facing the portion of the plant other than the roots thereof. In many applications the inner surface of a grow board 10 or component thereof may be oriented toward a nutrient supply and an outer surface of a grow board 10 or component thereof may be oriented away from a nutrient supply.

The peripheral wall 124 of the outer member 120 in the grow board 10 shown in FIGS. 13A-13C may be configured in a manner that is similar or even identical to the peripheral wall 24 of the other embodiments of a grow board 10 disclosed herein and vice versa. Referring specifically to FIG. 13B, an indent 125 may be formed in the peripheral wall 124 as previously described for other embodiments of a grow board 10 to provide an engagement area between the outer member 120 (and/or grow board 10) and a rail 12 (and/or other support structure). Again, it is contemplated that the various grow boards 10 disclosed herein may be interchangeable on a single rail 12 and/or support structure.

The grow board 10 may be configured with one or more slots 123 formed in the grow board 10 passing through the outer surface thereof to the inner surface thereof. A lip (not shown) may extend from a slot 123 around the periphery of the slot 123 or a portion thereof in either a direction toward the inner surface or in a direction toward the outer surface. However, it is contemplated that for certain applications of the grow board 10, a lip on a portion of the slot 123 may not be required due to an interference fit between the slot 123 and the grow media 16 positioned in the slot 123. In an aspect, relatively dry grow media 16 may be inserted into a slot 123 after which water and/or nutrient supply may be applied to the grow media 16 such that it expands by an amount adequate to secure the grow media 16 and/or any plant protruding therefrom within the slot 123. In another application, a net cup may be inserted into a slot 123 to adequately retain grow media 16.

The configuration of the outer surface of the grow board 10 shown in FIGS. 13A-13C may afford this grow board 10 identical and/or similar advantages related to germination, early plant grow, a controlled environment on a portion of the plant, harvesting, shipping, general transportation, retail display and/or general display, and/or other benefits and/or advantages previously described for other embodiments of a grow board 10 without limitation unless so indicated in the following claims.

Figure 14A:
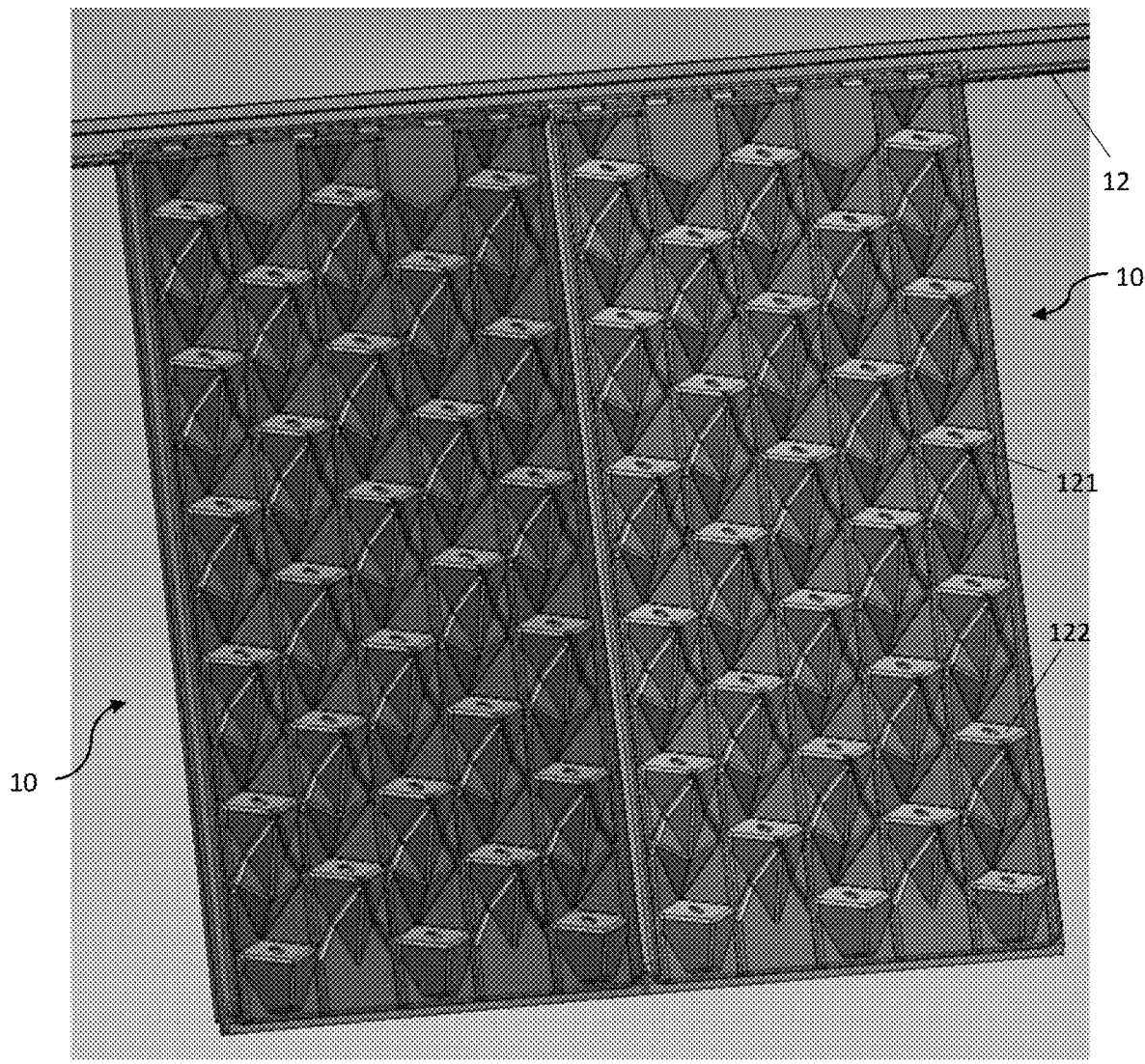
FIG. 14A provides a front view of the outer surface of another embodiment of a grow board, wherein two grow boards are positioned adjacent one another on a rail.
Figure 14B:
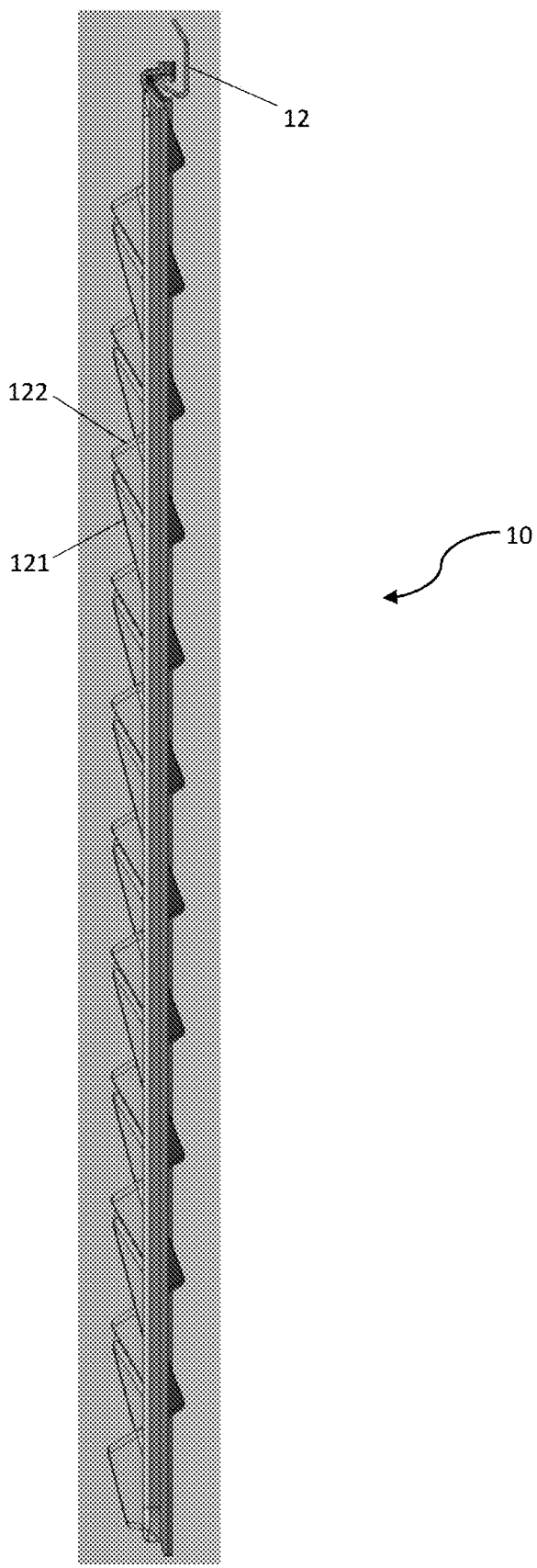
FIG. 14B provides a side view of the embodiment a grow board shown in FIG. 14A.
Figure 14C:
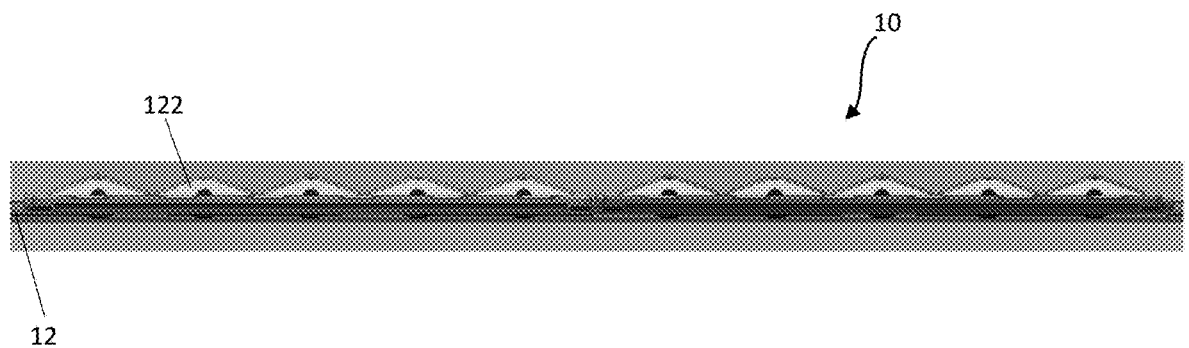
FIG. 14C provides an end view of the embodiment of a grow board shown in FIGS. 14A and 14B.

Another illustrative embodiment of a grow board 10 is shown in FIGS. 14A-15H, wherein FIG. 14A provides a perspective view of two such grow boards 10 positioned adjacent one another and engaged with a single rail 12. It is contemplated that this embodiment of a grow board 10 may be used in agriculture and in a modular manner as previously described for other embodiments of a grow board 10 without limitation unless so indicated in the following claims. It is contemplated that the embodiments of a grow board 10 shown in FIGS. 14A-15H may be configured with a periphery 18 that is at least similar enough to the periphery 18 of other embodiments of a grow board 10 disclosed herein (and vice versa) such that all of these various grow boards 10 may be engaged with a single rail 12 and/or support structure. The peripheral wall 124 of the outer member 120 in the grow board 10 shown in FIGS. 14A-15H may be configured in a manner that is similar or even identical to the peripheral wall 24 of the other embodiments of a grow board 10 disclosed herein and vice versa. Referring specifically to FIG. 14B, an indent 125 may be formed in the peripheral wall 124 as previously described for other embodiments of a grow board 10 to provide an engagement area between the outer member 120 (and/or grow board 10) and a rail 12 (and/or other support structure). Again, it is contemplated that the various grow boards 10 disclosed herein may be interchangeable on a single rail 12 and/or support structure.

It is contemplated that for the embodiments of a grow board 10 shown in FIGS. 14A-15H, the portion of a plant (which plant is grown using the grow board 10) that would normally constitute the upper portion of the plant (i.e., the portion of a plant other than the roots) may protrude from the grow media 16 out from one or more slots 123 formed in a shelf 122. A portion of the grow media 16 associated with each plant may be positioned within a slot 123. A lip (not shown) may extend from a slot 123 around the periphery of the slot 123 or a portion thereof in either a direction toward the inner surface or in a direction toward the outer surface. However, it is contemplated that for certain applications of the grow board 10, a lip on a portion of the slot 123 may not be required due to an interference fit between the slot 123 and the grow media 16 positioned in the slot 123. In an aspect, relatively dry grow media 16 may be inserted into a slot 123 after which water and/or nutrient supply may be applied to the grow media 16 such that it expands by an amount adequate to secure the grow media 16 and/or any plant protruding therefrom within the slot 123. In another application, a net cup may be inserted into a slot 123 to adequately retain grow media 16. The optimal grow media 16 may vary from one plant to the next. Accordingly, any grow media 16 currently known or later developed may be used with the grow board 10 without limitation, including but not limited to burlap, cotton, wood chips (which may be engaged with a netting, such as a polymer net) polymer fabrics, synthetic foam, polymers, plastics, cloth, composite materials, rock wool, perlite, other natural materials, other synthetic materials, and/or combinations thereof.

It is further contemplated that the portion of a plant that would normally constitute the lower portion of the plant (i.e., the root portion) may be positioned below a shelf 122 and may extend in a generally downward direction and/or outward from grow media 16 positioned adjacent thereto. It is further contemplated that these embodiments of a grow board 10 may be especially useful when used in conjunction with a nutrient delivery system that provides nutrient supply adjacent the root portion of the plants. Other orientations and/or configurations of plants, upper and/or lower portions thereof, and/or delivery of nutrient supply may be used with the grow board 10 without limitation. Generally, as used herein, the term "outer surface" of a grow board 10 or component thereof may constitute the surface generally facing the direction from which a shelf 122 protrudes from the grow board and the "inner surface" of a grow board 10 or component thereof may constitute the surface opposite the inner surface. In many applications the inner surface of a grow board 10 or component thereof may be oriented toward a nutrient supply and an outer surface of a grow board 10 or component thereof may be oriented away from a nutrient supply.

Figure 14D:
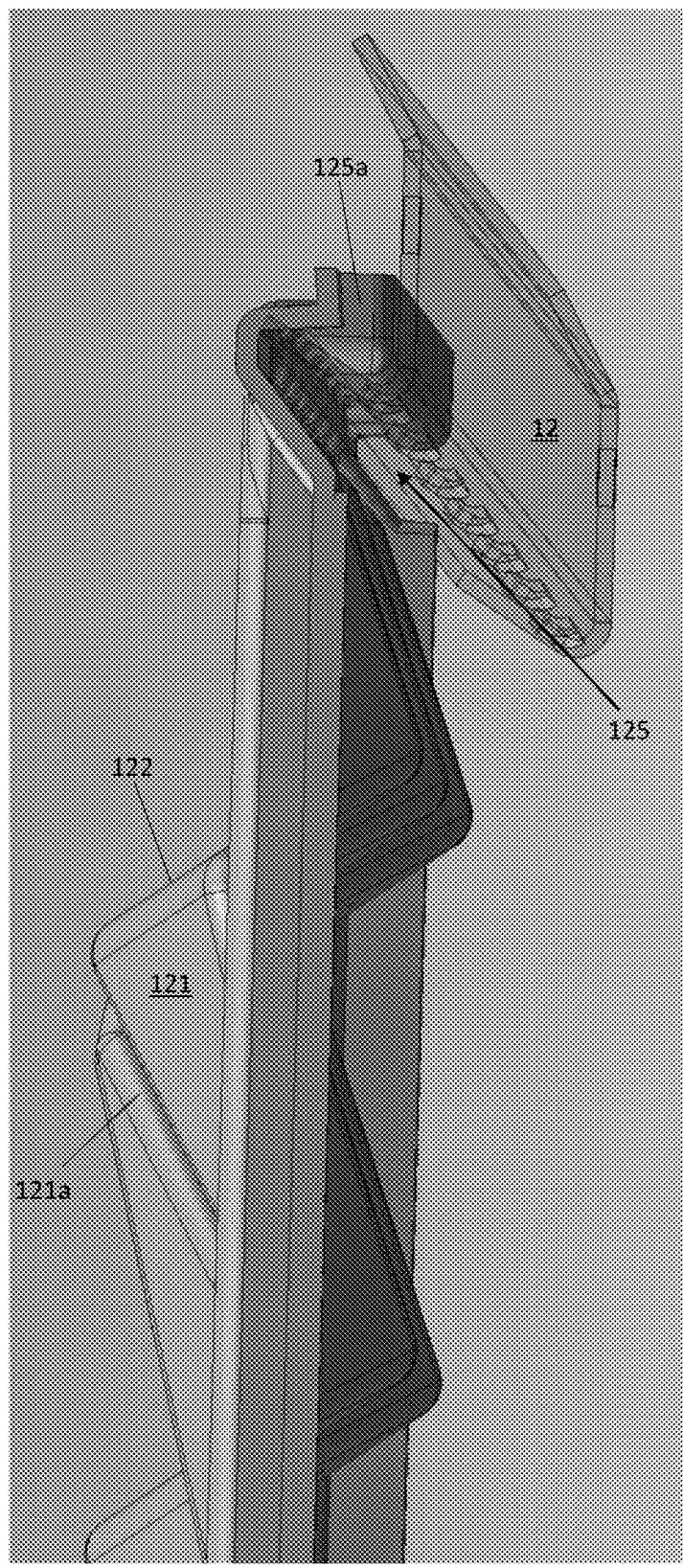
FIG. 14D provides a detailed view of a top edge of the periphery of the embodiment of a grow board shown in FIGS. 14A-14C.
Figure 14E:
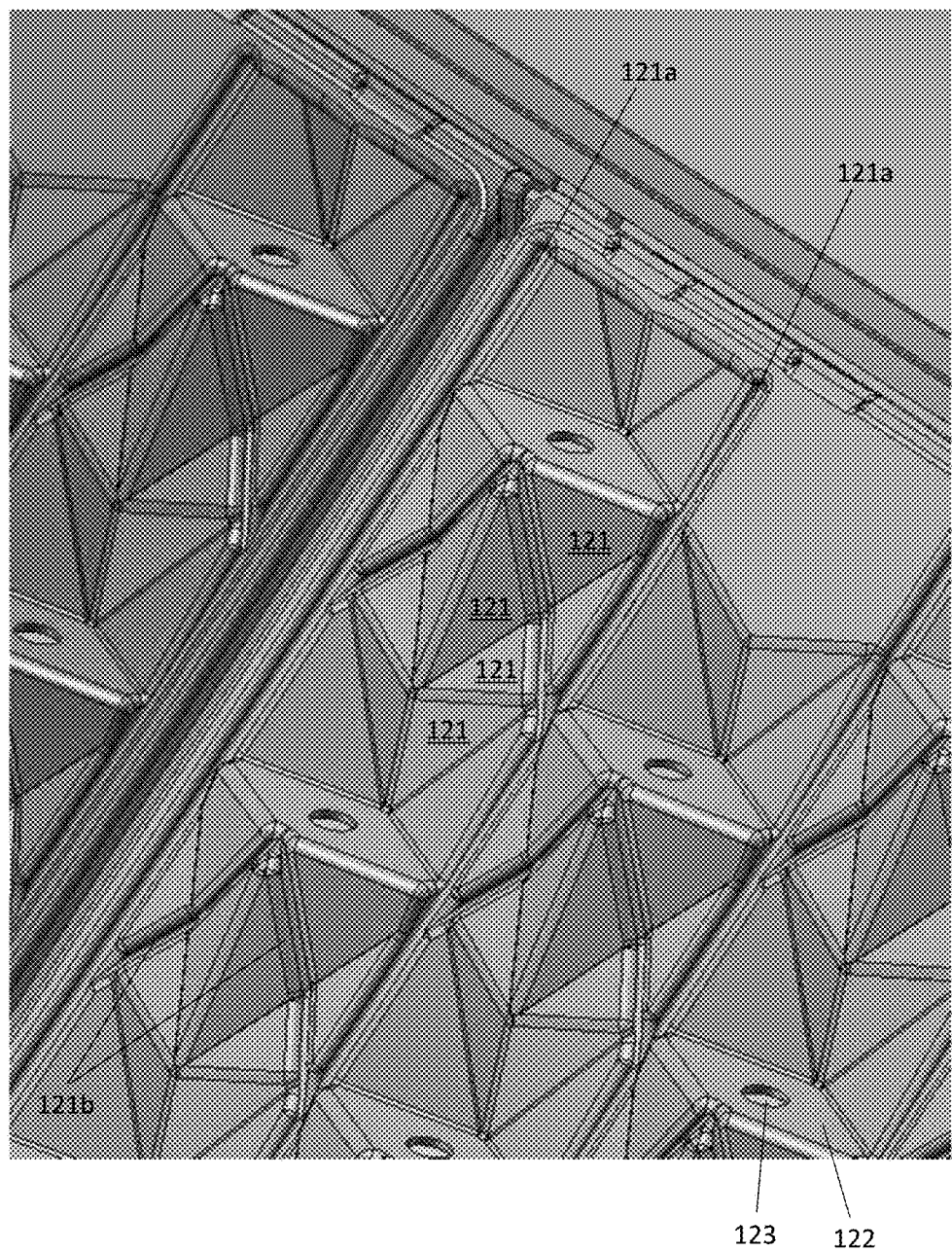
FIG. 14E provides a detailed view of a portion of the outer surface adjacent a top edge of the periphery of the embodiment of a grow board shown in FIGS. 14A-14D.

Referring specifically to FIG. 14D, a filler 125a may be engaged with the grow board 10 within the indent 125 for engagement with a portion of a rail 12 and/or other support structure. It is contemplated that a filler 125a may mitigate and/or prevent water and/or nutrient supply passing from the inner surface of the grow board 10 to the outer surface thereof (from the right to the left in the orientation shown in FIG. 14D) along the top edge of the grow board 10. Any grow board 10 may employ a filler 125a adjacent the indent 125 without limitation unless so indicated in the following claims.

The outer surface of the grow board 10 shown in FIGS. 14A-15H may comprise a plurality of shelves 122 that generally may be arranged in columns and rows, wherein a shelf 122 may include one or more slots 123 formed therein. Rows may include two or three shelves 122 and columns may include five or six shelves 122. The slots 123 may have any shape and/or configuration without limitation unless so indicated in the following claims. The shelf 122 may be engaged with one or more supports 121 (which may constitute the underside of the shelf 122), to provide support, rigidity, structural integrity, and/or any other consideration needed and/or beneficial for the specific application of the grow board 10. In an aspect, one support 121 and a corresponding shelf 122 may be generally linear and angled with respect to one another by an angle less than 90 degrees, while a second support 121 and the same corresponding shelf 122 may be generally linear and angled with respect to one another by an angle greater than 90 degrees. As shown, a plurality of supports 121 having various orientations, shapes, and/or configurations may be associated with one or more shelves 122.

One or more main troughs 121a may extend from an area adjacent a top edge of the periphery 18 of a grow board to an area adjacent a bottom edge of the periphery 18 thereof. The main trough 121a may be positioned between adjacent rows of shelves 122, or along the side of a terminal row of shelves 122. One or more side troughs 121b may be formed in a portion of a support 121 and/or a portion of a shelf 122. The side troughs 121b may intersect one or more main troughs 121a. Generally, the main troughs 121a and/or side troughs 121b may serve to channel nutrient supply and/or water that is positioned on the outer surface of the grow board away from the plant and/or grow media 16 (via gravity). This may prevent and/or mitigate unwanted contact between plants and nutrient supply and/or water, which contact may have negative impacts on the plants, such as burning of leaves.

As shown, the grow board 10 may comprise twenty eight shelves 122 and twenty eight corresponding slots 123. However, the optimal shape, number, orientation, arrangement, dimensions, and/or configuration of supports 121, main troughs 121a, side troughs 121b, shelves 122, slots 123, and/or other components of the grow board 10 will vary from one application thereof to the next, and may be at least dependent on the species of plant used with the grow board 10. Accordingly, the shape, number, orientation, arrangement, dimensions, and/or configuration of those components alone or relative to one another in no way limits the scope of the present disclosure unless so indicated in the following claims.

Referring now to FIGS. 15A-15H, which provide various views of two grow boards 10 positioned adjacent one another, the grow board 10 may be configured with a right side 140 and a corresponding left side 150. The right side 140 and left side 150 may be configured to cooperate with one another in such a manner as to mitigate and/or prevent water and/or nutrient supply passing from the inner surface of the grow board 10 to the outer surface thereof (from the bottom to the top of the drawing in the orientation shown in FIG. 15A) along the side edges of the grow board 10.

Figure 15A:
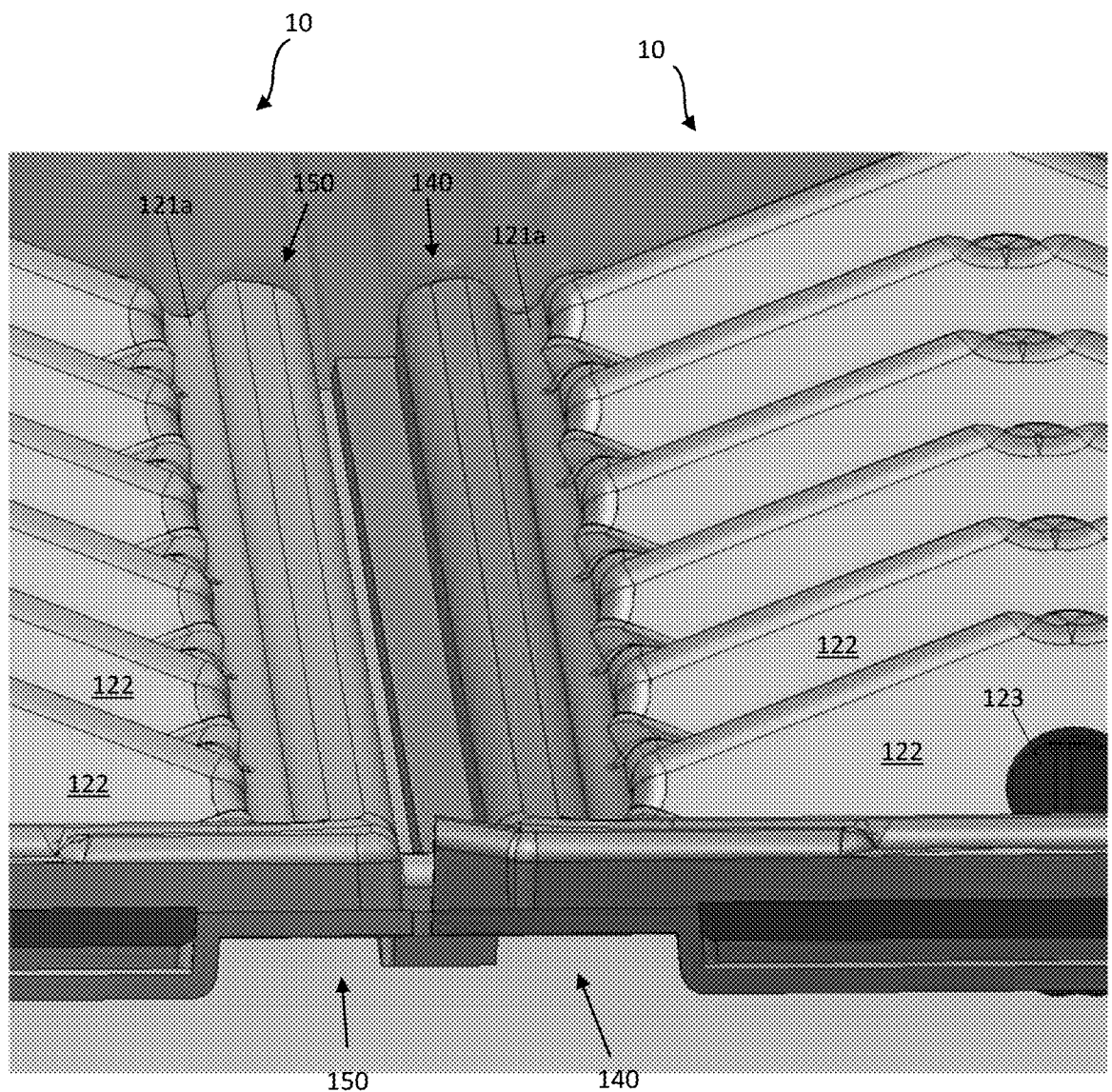
FIG. 15A provides a detailed view of a top edge of the periphery of the embodiment of a grow board shown in FIGS. 14A-14E at an intersection between the right side of one grow board and the left side of the adjacent grow board.
Figure 15B:
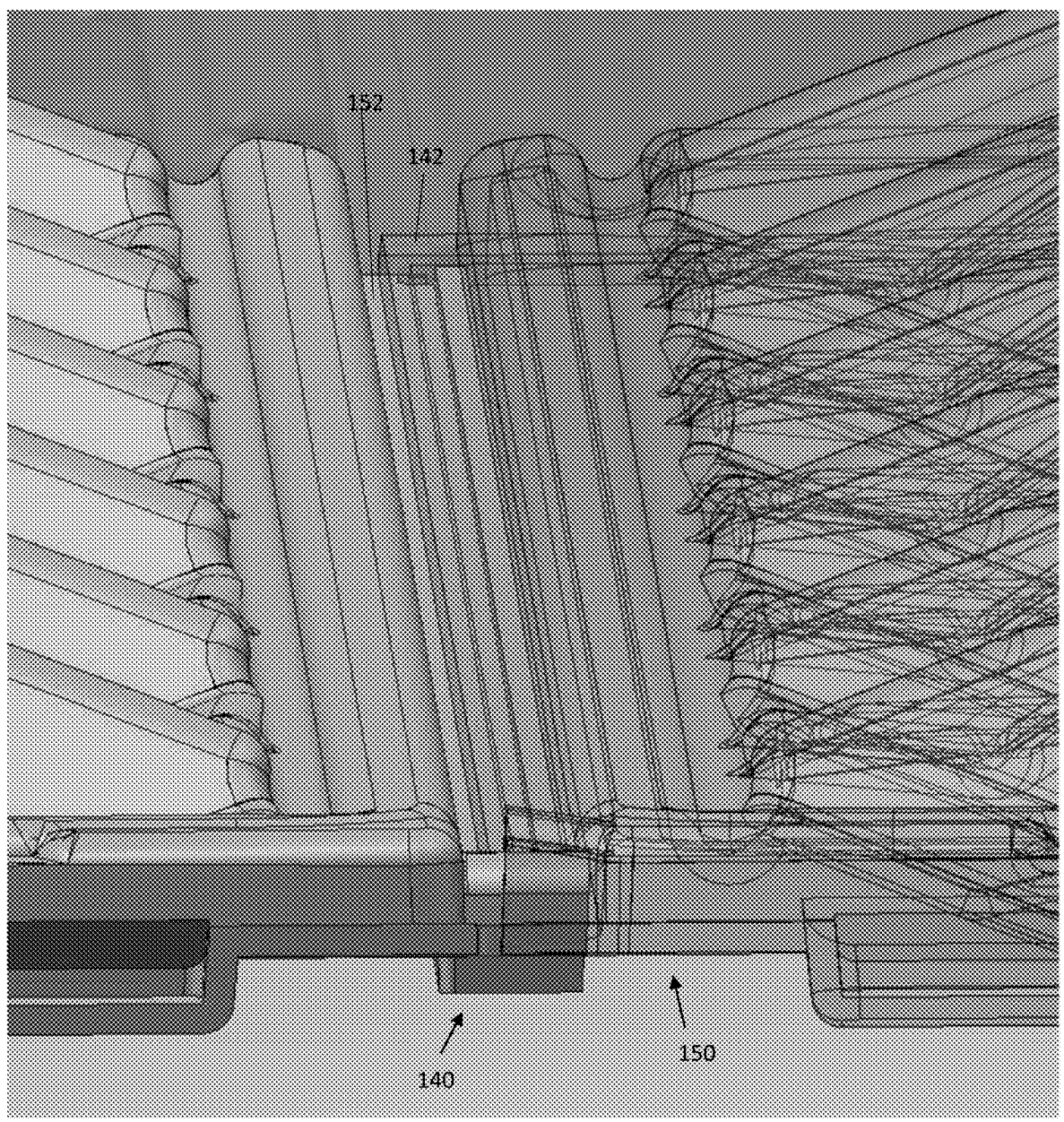
FIG. 15B provides a detailed view of a top edge of the periphery of the embodiment of a grow board shown in FIGS. 14A-14E at an intersection between the right side of one grow board and the left side of the adjacent grow board wherein the right side of one grow board is transparent.
Figure 15C:
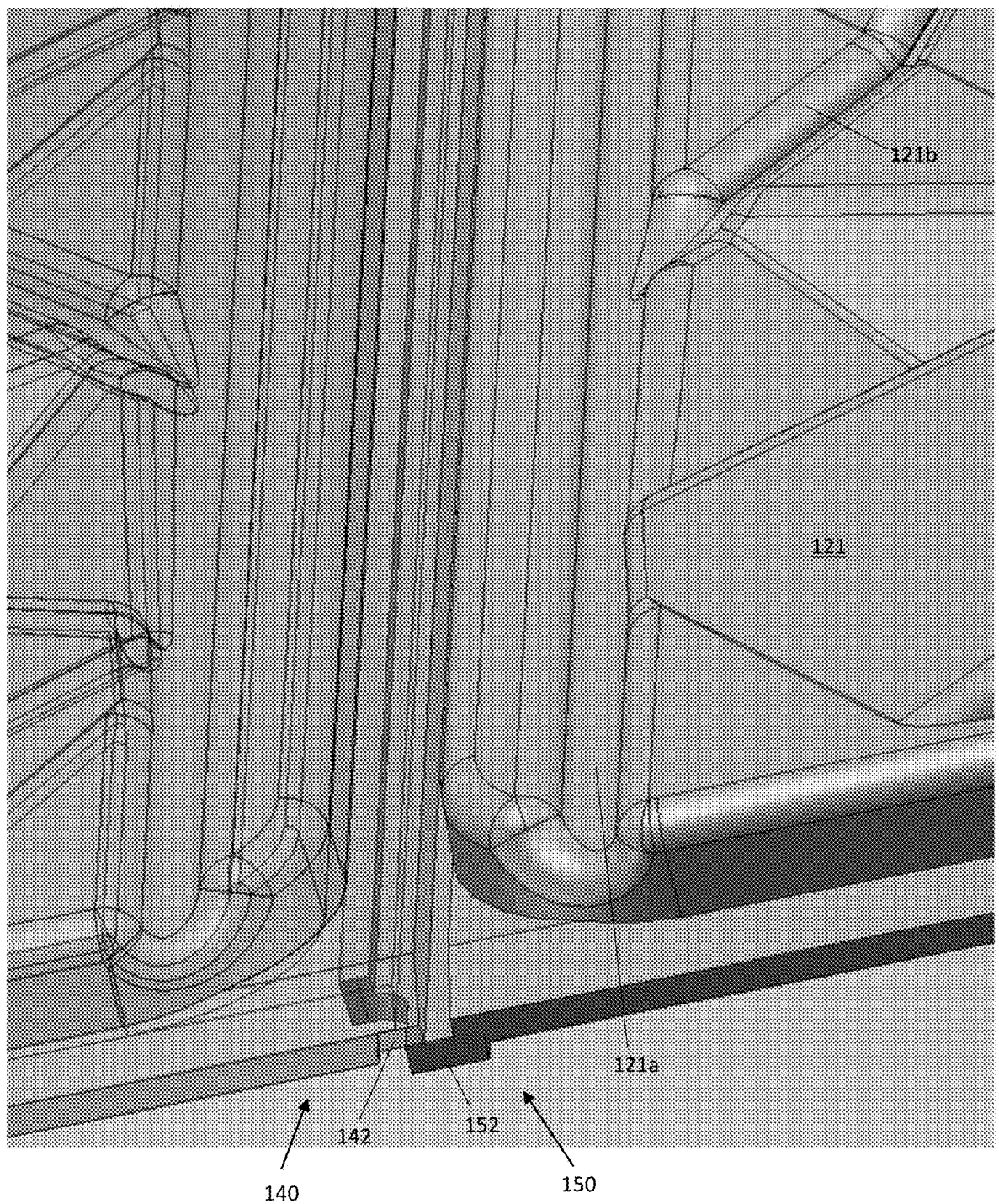
FIG. 15C provides a detailed view of a bottom edge of the periphery of the embodiment of a grow board shown in FIGS. 14A-14E at an intersection between the right side of one grow board and the left side of the adjacent grow board wherein the right side of one grow board is transparent.
Figure 15D:
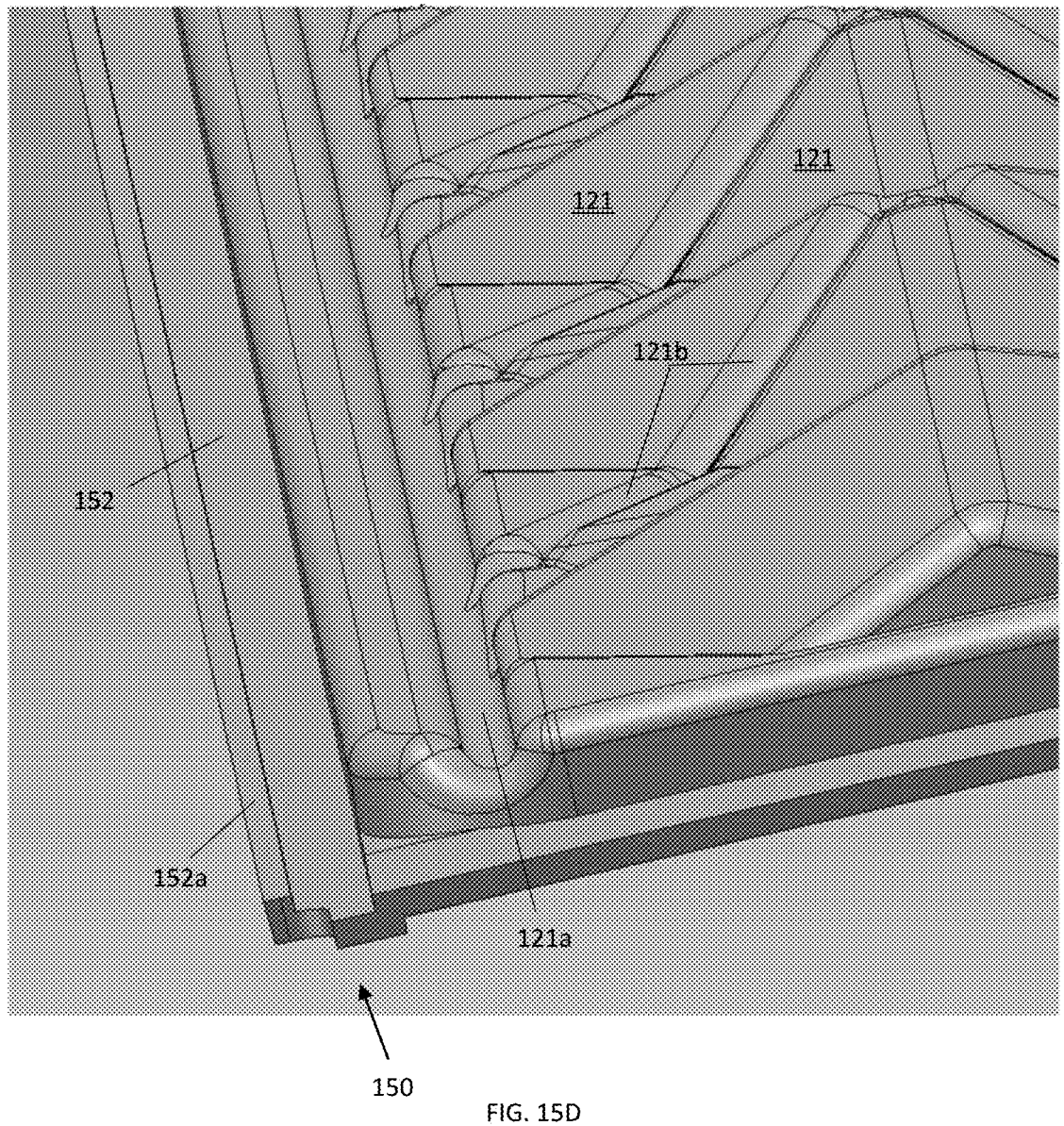
FIG. 15D provides a detailed view of a bottom edge of the periphery of the embodiment of a grow board shown in FIGS. 14A-14E at the left side and on an outer surface thereof.
Figure 15E:
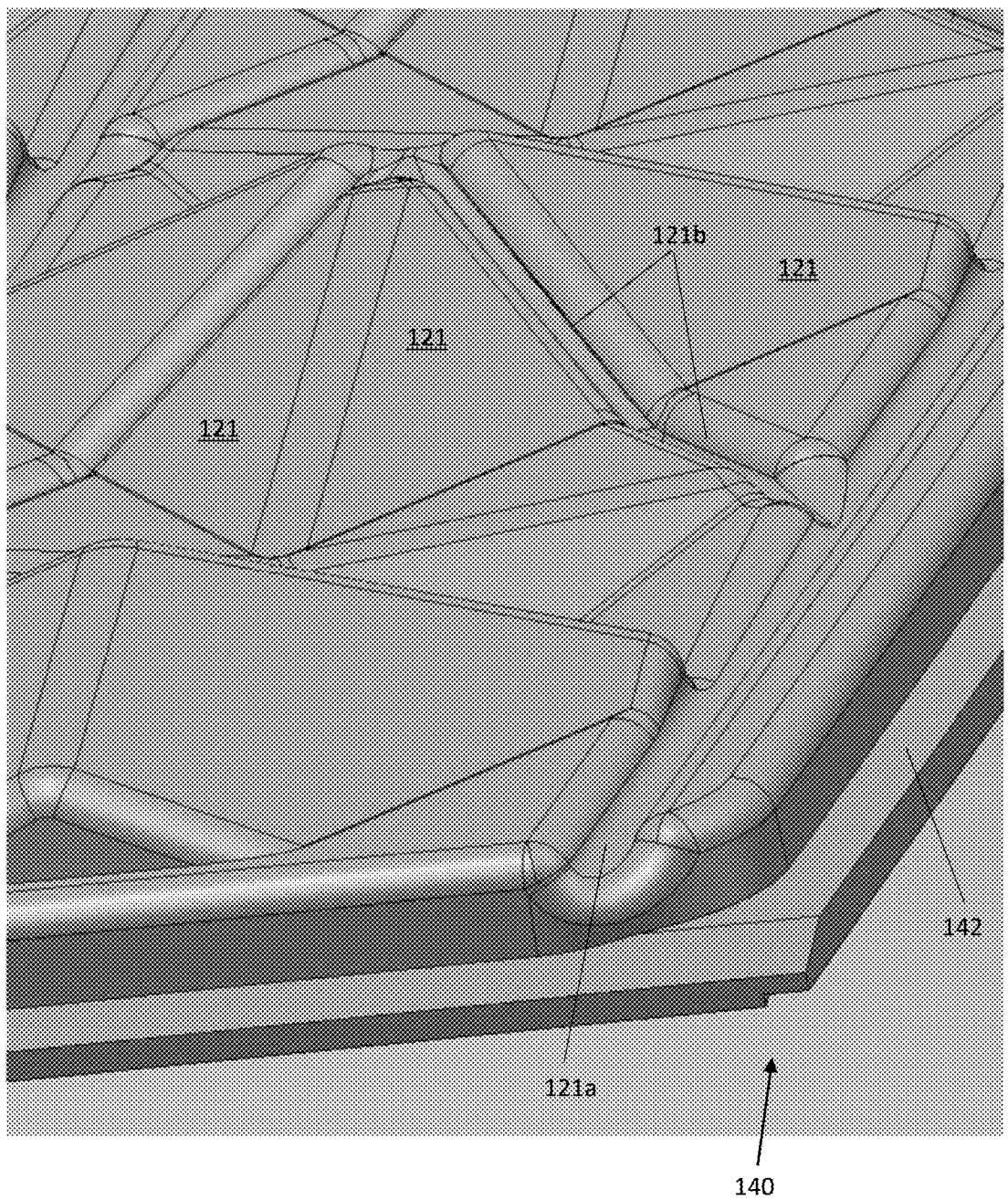
FIG. 15E provides a detailed view of a bottom edge of the periphery of the embodiment of a grow board shown in FIGS. 14A-14E at the right side and one an outer surface thereof.
Figure 15F:
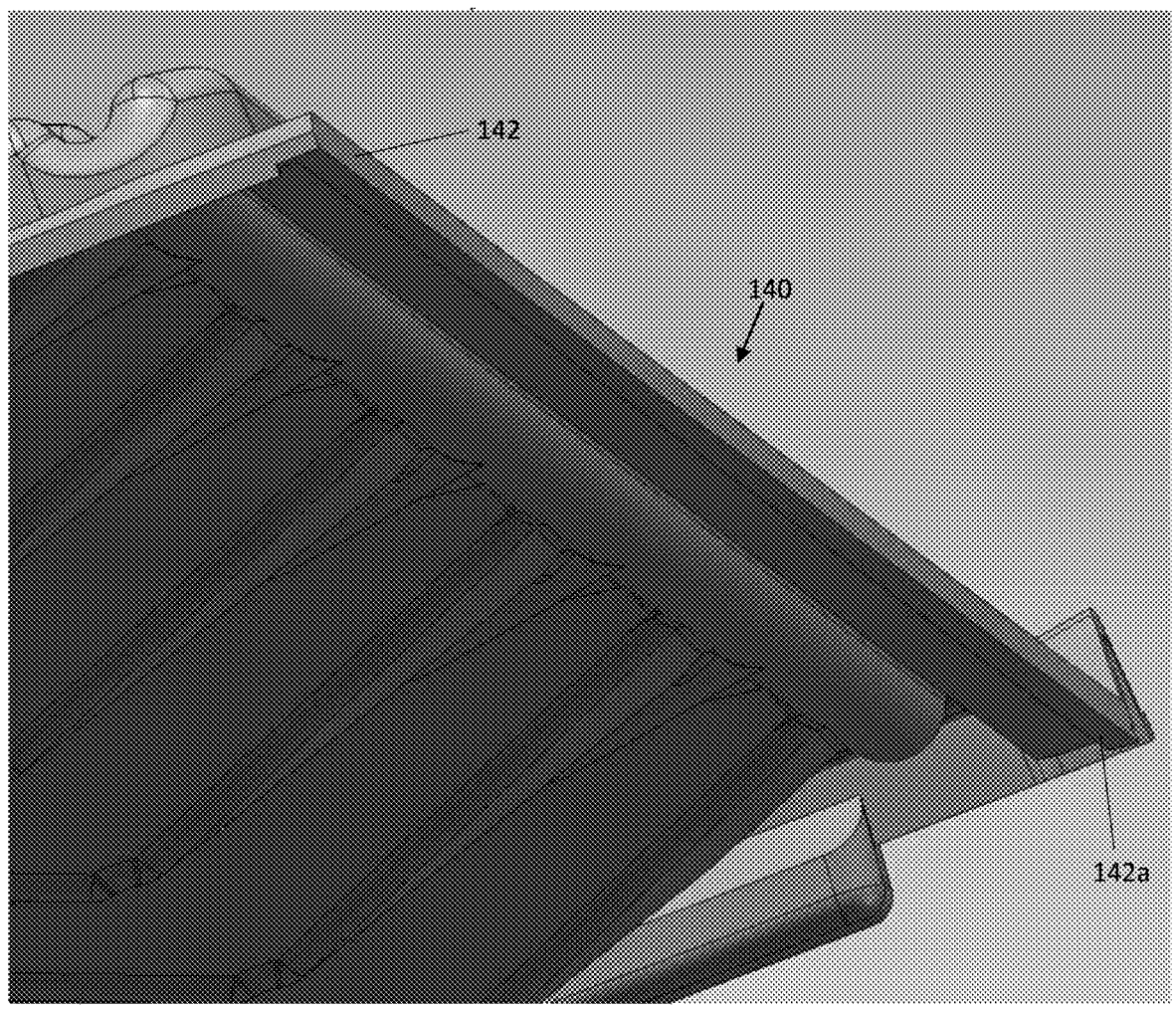
FIG. 15F provides a detailed view of a bottom edge of the periphery of the embodiment of a grow board shown in FIGS. 14A-14E at the right side and one an inner surface thereof.
Figure 15G:
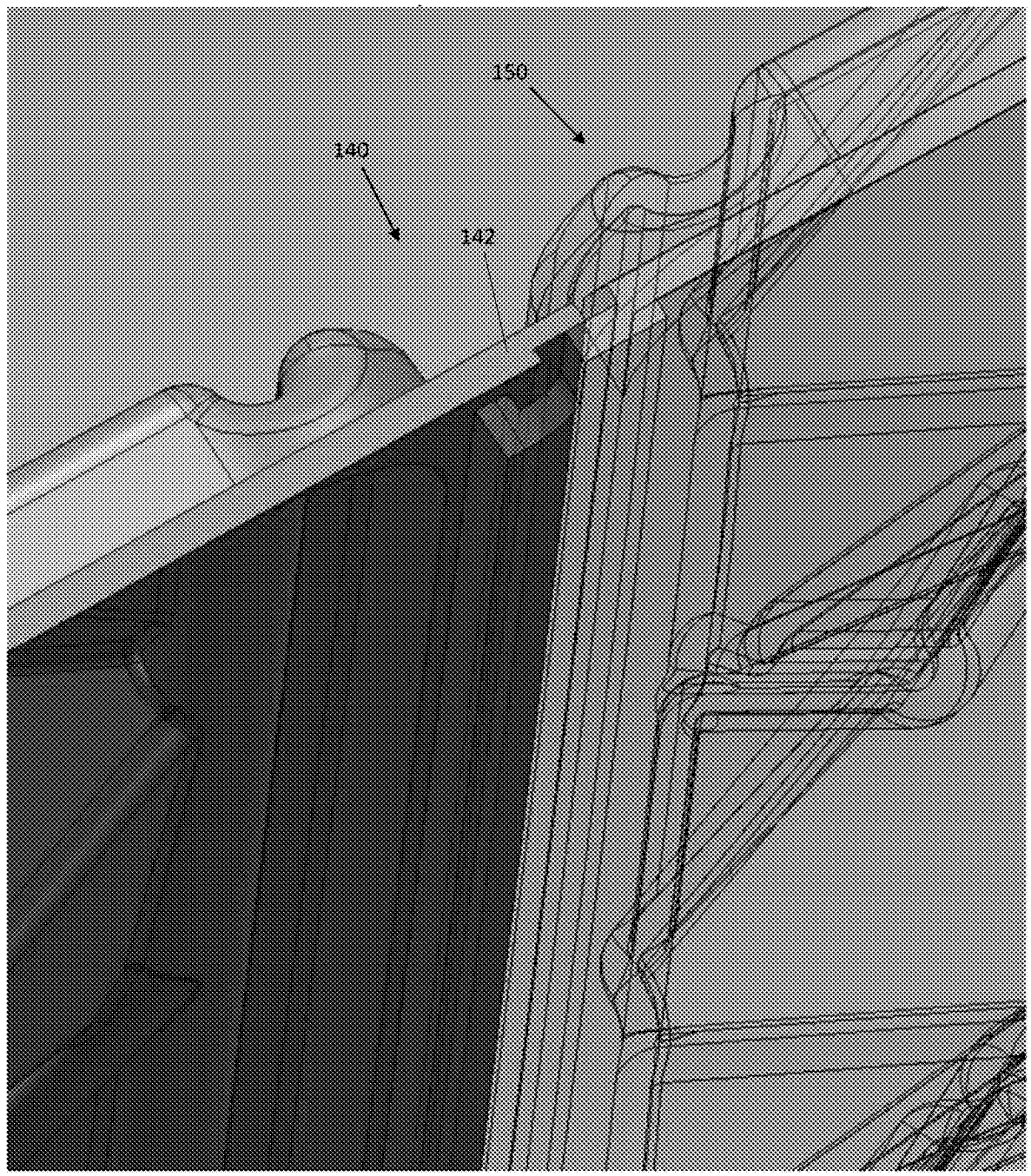
FIG. 15G provides a detailed view of a bottom edge of the periphery of the embodiment of a grow board shown in FIGS. 14A-14E at an intersection between the right side of one grow board and the left side of the adjacent grow board wherein the left side of one grow board is transparent.
Figure 15H:
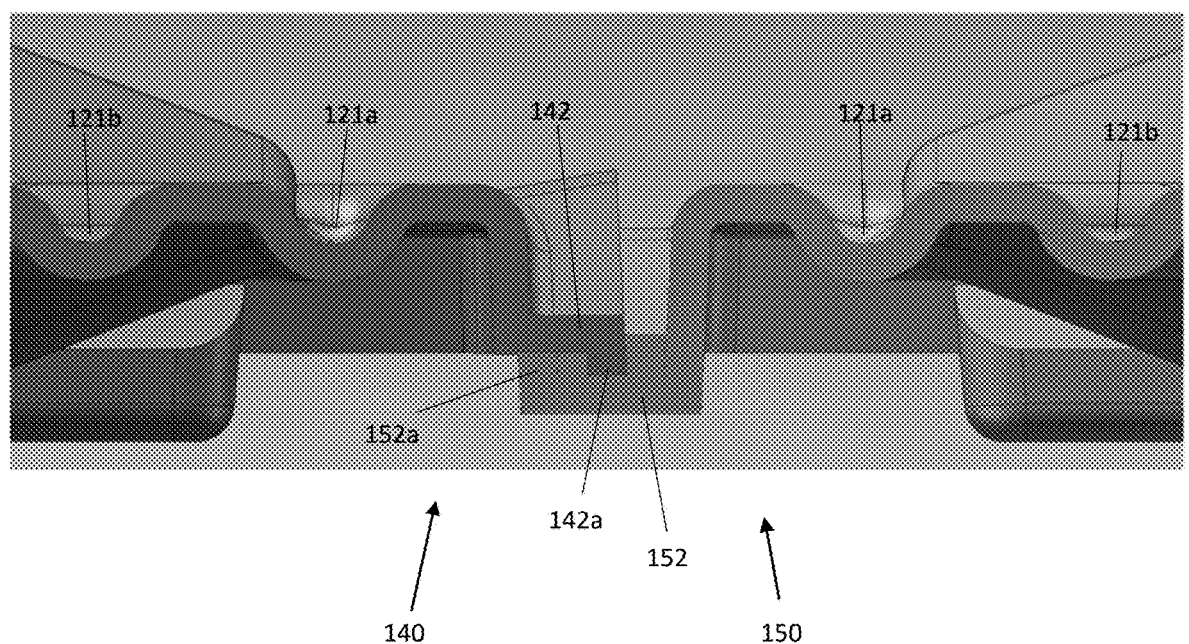
FIG. 15H provides a cross-sectional view of the periphery of the embodiment of a grow board shown in FIGS. 14A-14E at an intersection between the right side of one grow board and the left side of the adjacent grow board.

The right side 140 may comprise a right flange 142 extending laterally from the grow board 10. The right flange 142 may be formed with a ridge 142a thereon extending in a direction that may be generally perpendicular to that which the right flange 142 extends from the grow board 10. The left side 150 may comprise a left flange 152 extending laterally from the grow board 10. The left flange 152 may be formed with a lip 152a thereon extending in a direction that may be generally perpendicular to that which the left flange 152 extends from the grow board 10. Referring specifically to FIG. 15H, the lip 152a and ridge 142a may be generally parallel with respect to one another, but extend from their respective flanges 142, 152 in opposite directions such that the right and left flanges 142, 152 cooperate to interlock with one another in a type of tongue-and-groove arrangement.

In one aspect of a grow board 10, the outer member 120 may be comprised of a synthetic material that reflects a large portion of light to increase the efficiency of light absorbed by plants grown using the grow board 10 (such as white colored, food-grade ABS plastic). However, the scope of the present disclosure is in no way limited by the materials used to construct any portion of the grow board 10, including but not limited to the outer member 120 and inner member 130, unless so indicated in the following claims.

The configuration of the outer surface of the grow board 10 shown in FIGS. 14A-15H may afford this grow board 10 identical and/or similar advantages related to germination, early plant grow, a controlled environment on a portion of the plant, harvesting, shipping, general transportation, retail display and/or general display, and/or other benefits and/or advantages previously described for other embodiments of a grow board 10 without limitation unless so indicated in the following claims.

It is contemplated that for certain plants, the type of grow board 10 shown in FIGS. 14A-15H may be especially advantageous due to the orientation of the slots 123, which may allow a plant to grow in a more vertical direction when compared with other grow boards 10. Additionally, it is contemplated that this type of grow board 10 may ease removal of residual plant material, grow media 16, and/or other material after harvest in preparation of reusing the grow board 10. In an aspect, a pressurized fluid may be applied to the grow board 10 in a direction from the outer surface to the inward surface with such flow characteristics that residual plant material, grow media 16, and/or other material positioned on the outer surface, inner surface, and/or other position of the grow board 10 may be expelled from the grow board 10. However, the specific orientation of the plants and/or method for cleaning a grow board 10 in no way limit the scope of the present disclosure unless so indicated in the following claims.

It will be apparent from the present disclosure that the grow boards 10 shown in FIGS. 9A-12B may have an interior area 18 that is configured differently than the interior area 18 of the grow boards 10 shown in FIGS. 1-8D, the grow boards 10 shown in FIGS. 13A-13C have still another differently configured interior area 18, and the grow boards 10 shown in FIGS. 14A-15H have yet another differently configured interior area 18, but the periphery 18 of any grow board 19 may be similar enough such that any of the grow boards 10 may be engaged with a specific rail 12 and/or other support structure. In an aspect of the grow board 10, grow boards 10 having interior areas 19 that are differently configured may have the peripheries 18 that are identical, similar, substantially similar, and/or correlative, without limitation unless so indicated in the following claims.

It will be apparent that some grow boards 10 may be comprised of a single piece of material, rather than an outer member 20 engaged with an inner member 30, an outer member 120 engaged with a backing member 128, and/or an outer member 120 engaged with an inner member 130. In such grow boards 10, the grow board 10 itself may be considered the outer member 20, 120. Accordingly, the scope of the present disclosure is not limited to grow boards 10 having only an outer member 20, 120 and/or those having an outer member 20, 120, backing member 128, and/or outer member 30, 130 unless so indicated in the following claims.

Other Aspects of the Grow Board 10 May Include, but are not Limited to:

1. A grow board for hydroponic and aeroponic cultivation, comprising of a plurality of chutes and/or chambers with open slots upper and lower angled (i.e. 70 degrees) solid rectangle panels of similar dimensions.
2. A living hinge comb on the back side.
3. The comb back board is partially in a solid state extending the entire horizontal length of the opening prior to converting to the prongs of the comb extending down to the lower chute panel (and/or outer member). This to provide a more rigid support to the grow media.
4. The comb back will open forward towards the front of board.
5. The strip below have an overlap with the teeth to prevent the plants and grow media from sliding out the back side.
6. Where vertically stacked nozzles apply a nutrient mist to the back side of the grow board. The outside edging of each board is molded to create a watertight seal as a plurality of grow boards are placed adjacent to the next.
7. The chambers are filled with a grow media such as perlite, hydroton pellets or other loose fill such as fiber strands (i.e. rock wool or coconut fiber).
8. Where the living hinge is strong enough to hold grow media and plants in place during the growing phase, but, then has flexibility to be pushed open during the sanitation process.
9. Where the opening of chute panels (and/or outer member) is angled to allow the mouth to easily be filled with loose fill grow media from the front side.
10. A grow board where the outside frame can be made from plastic or non-corrosive metals such as stainless steel or aluminum.
11. Where the living hinge comb back board is made by stamping a polyethylene sheet of sufficient mm thickness (e.g., 20 to 60 mm) to accomplish the goals of being both flexible and maintain shape memory attributes.
12. Where the roots tangle into the rocks and teeth of the comb to provide solid support to the plant as it grows.
13. Where the top and bottom of the board and contain wheels or self-lubricating plastics to allow low friction loading and unloading of the trays into customized plant stand.
14. Where the grow board depth allows the grow board to be stacked for germination horizontally or placed into a frame for rack for vertical germination
15. Where the back comb board may be flat or indented to improve the root zone free fall
16. Where chutes and/or chambers will periodically have a connecting support running the vertical height of the board in the center.

The materials used to construct the grow board 10 and various elements thereof will vary depending on the specific application thereof, but it is contemplated that polymers, metals, metal alloys, natural materials, fibrous materials, and/or combinations thereof may be especially useful for the grow board 10 in some applications. Accordingly, the above-referenced elements may be constructed of any material known to those skilled in the art or later developed, which material is appropriate for the specific application of the present disclosure without departing from the spirit and scope of the present disclosure unless so indicated in the following claims.

Having described the preferred embodiments, other features of the present disclosure will undoubtedly occur to those versed in the art, as will numerous modifications and alterations in the embodiments as illustrated herein, all of which may be achieved without departing from the spirit and scope of the present disclosure. Accordingly, the methods and embodiments pictured and described herein are for illustrative purposes only.

Any of the various features for the grow board 10, inner member 20, 120, outer member 30, 130, and/or components thereof may be used alone or in combination with one another (depending on the compatibility of the features) from one embodiment to the next. Accordingly, an infinite number of variations of the grow board 10 exists. All of these different combinations constitute various alternative aspects of the grow board 10. The embodiments described herein explain the best modes known for practicing the grow board 10 and will enable others skilled in the art to utilize the same. The claims are to be construed to include alternative embodiments to the extent permitted by the prior art. Modifications and/or substitutions of one feature for another in no way limit the scope of the grow board 10 and/or component thereof unless so indicated in the following claims.

It should be noted that the present disclosure is not limited to the specific embodiments pictured and described herein, but are intended to apply to all similar apparatuses and methods for germinating and/or growing seeds and/or plants, harvesting same, transporting and/or providing at least one plant to a point-of-sale location at which a customer and/or end consumer may receive the plant, and which apparatuses and/or methods may reduce the costs for providing fresh plants and/or increase the amount of time plants remain fresh, and/or methods for any of the proceeding. Modifications and alterations from the described embodiments will occur to those skilled in the art without departure from the spirit and scope of the present disclosure.

The invention claimed is:

1. A method of growing a plant, said method comprising the steps of:
  a. germinating a plant in a first grow board, wherein said first grow board comprises:
    i. an outer member having a length, a width, and a depth;
    ii. a plurality of shelves extending outward from said outer member in a first direction parallel to said depth of said outer member, wherein each said shelf of said plurality is formed with a slot therein, wherein each said shelf extends along said width of said outer member, and wherein said slot extends along substantially an entire length of said shelf;
    iii. a support positioned below each said shelf of said plurality, wherein said support extends outward from said outer member in said first direction, wherein said support is integrally formed with said shelf, and wherein said shelf and said support cooperate to form a chamber;
    iv. a grow media positioned in said chamber, wherein a seed for said plant is positioned in said grow media;
  b. removing a portion of said grow media from said first grow board;
  c. transplanting said portion of said grow media to a second grow board, wherein said second grow board comprises:
    i. an outer member having a length, a width, and a depth, wherein said outer member includes peripheral wall, wherein a top edge of said peripheral wall is formed with an indent therein;
    ii. a plurality of shelves extending outward from said outer member in a first direction parallel to said depth of said outer member, wherein each said shelf of said plurality is formed with a slot therein;
    iii. a support positioned below each said shelf of said plurality, wherein said support extends outward from said outer member in said first direction, wherein said support is integrally formed with said shelf, and wherein said shelf and said support cooperate to form a chamber;
  d. placing said portion of said grow media into said slot;
  e. engaging said second grow board with a rail at said indent;
  f. allowing a second portion of said second grow board positioned below said top edge to rest on a filler engaged with said rail such that said second grow board hangs from said rail; and,
  g. allowing said plant to grow outward from said slot.

2. The method according to claim 1 further comprising the step of arranging said first grow board in a horizontal orientation.

3. The method according to claim 2 further comprising the step of arranging said second grow board in a primarily vertical orientation.

4. The method according to claim 3 wherein said grow media is further defined as comprising rock wool.

5. The method according to claim 4 further comprising the step of configuring said second grow board with
  a. a first main trough extending from an area adjacent a top edge of said outer member to an area adjacent a bottom edge of said outer member, wherein said first main trough defines a boundary of a first column of said shelves;
  b. a second main trough extending from said from an area adjacent said top edge of said outer member to said area adjacent said bottom edge of said outer member, wherein said second main trough defines a second boundary of said first column of said shelves, wherein a width of said first column is defined by a distance between said first and second main troughs.

* * * * *